United States Patent
Xue et al.

(10) Patent No.: US 6,316,144 B1
(45) Date of Patent: *Nov. 13, 2001

(54) PRE-GRAPHITIC CARBONACEOUS INSERTION COMPOUNDS AND USE AS ANODES IN RECHARGEABLE BATTERIES

(75) Inventors: Jiayu Simon Xue, Coquitlam; Alfred MacDonald Wilson, Vancouver; Jeffrey Raymond Dahn, Surrey; Yinghu Liu, Burnaby; Ulrich von Sacken, Coquitlam; Qiming Zhong, Coquitlam; Tao Zheng, Coquitlam, all of (CA)

(73) Assignee: Moli Energy (1990) Limited, Maple Ridge (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/572,851

(22) Filed: Dec. 14, 1995

(30) Foreign Application Priority Data

Dec. 16, 1994 (CA) .................................................. 2138360
Apr. 5, 1995 (CA) .................................................. 2146426
May 19, 1995 (CA) .................................................. 2149853

(51) Int. Cl.⁷ ...................................................... H01M 4/60
(52) U.S. Cl. ...................................... 429/231.4; 429/231.8; 429/324; 423/445 R; 423/275
(58) Field of Search .................................... 429/218, 199, 429/231.8, 231.4, 324; 423/445 R

(56) References Cited

U.S. PATENT DOCUMENTS

| | | |
|---|---|---|
| 4,615,959 | 10/1986 | Hayashi et al. . |
| 4,702,977 | 10/1987 | Hiratsuka et al. . |
| 5,451,477 * | 9/1995 | Omaru et al. ................. 429/218 |
| 5,498,492 | 3/1996 | Hara et al. . |
| 5,587,256 * | 12/1996 | Wilson et al. ................. 429/218 |

FOREIGN PATENT DOCUMENTS

| | | |
|---|---|---|
| 2098248 | 6/1993 | (CA) . |
| 2116424 | 2/1994 | (CA) . |
| 2122770 | 5/1994 | (CA) . |
| 0 409 192 A1 | 1/1991 | (EP) . |
| 0 460 617 A2 | 12/1991 | (EP) . |
| 0 567 658 A1 | 11/1993 | (EP) . |
| 0 627 777 A2 | 12/1994 | (EP) . |
| 0 685 896 A1 | 12/1995 | (EP) . |
| 06-189721 | 3/1994 | (JP) . |
| 06-132031 | 5/1994 | (JP) . |
| 7-230803 | 8/1995 | (JP) . |
| 7-254412 | 10/1995 | (JP) . |
| 7-288136 | 10/1995 | (JP) . |
| WO 96/27911 | 9/1996 | (WO) . |

OTHER PUBLICATIONS

J.R. Dahn, et al., "Carbons and Graphites as Substitutes for the LIthium Anode", from Lithum Batteries—New Materials, Developments and Perspectives, ed. G. Pistoia, Elsevier (No date).
J. Yamaura, et al., "High voltage, rechargeable lithium batteries using newly–developed carbon for negative electrode material", Journal of Power Sources, 43–44 (1993), p. 233–239 (No month).
A. Mabuchi, et al., "Charge–Discharge Characteristics of Mesocarbon Microbeads Heat–Treated at Different Temperatures", 7th International Meeting on Lithium Batteries, Extended Abstracts, p. 556–558 (No month).
K. Sato, et al., "A Mechanism of Lithium Storage in Disordered Carbons", Science, vol. 264, Apr. 22, 1994, p. 556–558.
S. Yata, et al., "Structure and properties of deeply Li–doped polyacenic semiconductor materials beyond $C_6Li$ stage", Synthetic Metals, 62 (1994), p. 153–158 (No month).
J.R. Dahn, et al., "Dependence of the Electrochemical Intercalation of Lithium in Carbons on the Crystal Structure of the Carbon", Electrochimica Acta, vol. 38, No. 9, p. 1179–1191, 1993 (No month).
A. Omaru, et al., "Study of Phosphorus Containing Carbonaceous Materials for am Anode of Lithium Secondary Batteries", Extended Abstract for Paper No. 25, p. 34, Electrochemical Society, Toronto, 1992 (No month).
A. Mabuchi, et al., "Charge–Discharge Characteristics of the Mesocarbon Microbeads Heat–Treated at Different Temperatures", J. Electrochem. Soc., vol. 142, No. 4, Apr. 1995, p. 1041.
Paper 2805 of the 35th Battery Symposium, Nagoya, Japan, Nov. 14–16, 1994.
Paper 2809 of the 35th Battery Symposium, Nagoya, Japan, Nov. 14–16, 1994.

* cited by examiner

*Primary Examiner*—John S. Maples
(74) *Attorney, Agent, or Firm*—Synnestvedt & Lechner LLP

(57) ABSTRACT

Carbonaceous insertion compounds and methods for preparation are described wherein the compounds comprise a highly disordered, impurity free, hard pre-graphitic carbonaceous host. Carbonaceous insertion compounds can be prepared which have large reversible capacity for lithium yet low irreversible capacity and voltage hysteresis. Such insertion compounds can be prepared by simple pyrolysis of suitable epoxy, phenolic resin, or carbohydrate precursors at an appropriate temperature. These insertion compounds may be suitable for use as high capacity anodes in lithium ion batteries.

42 Claims, 34 Drawing Sheets

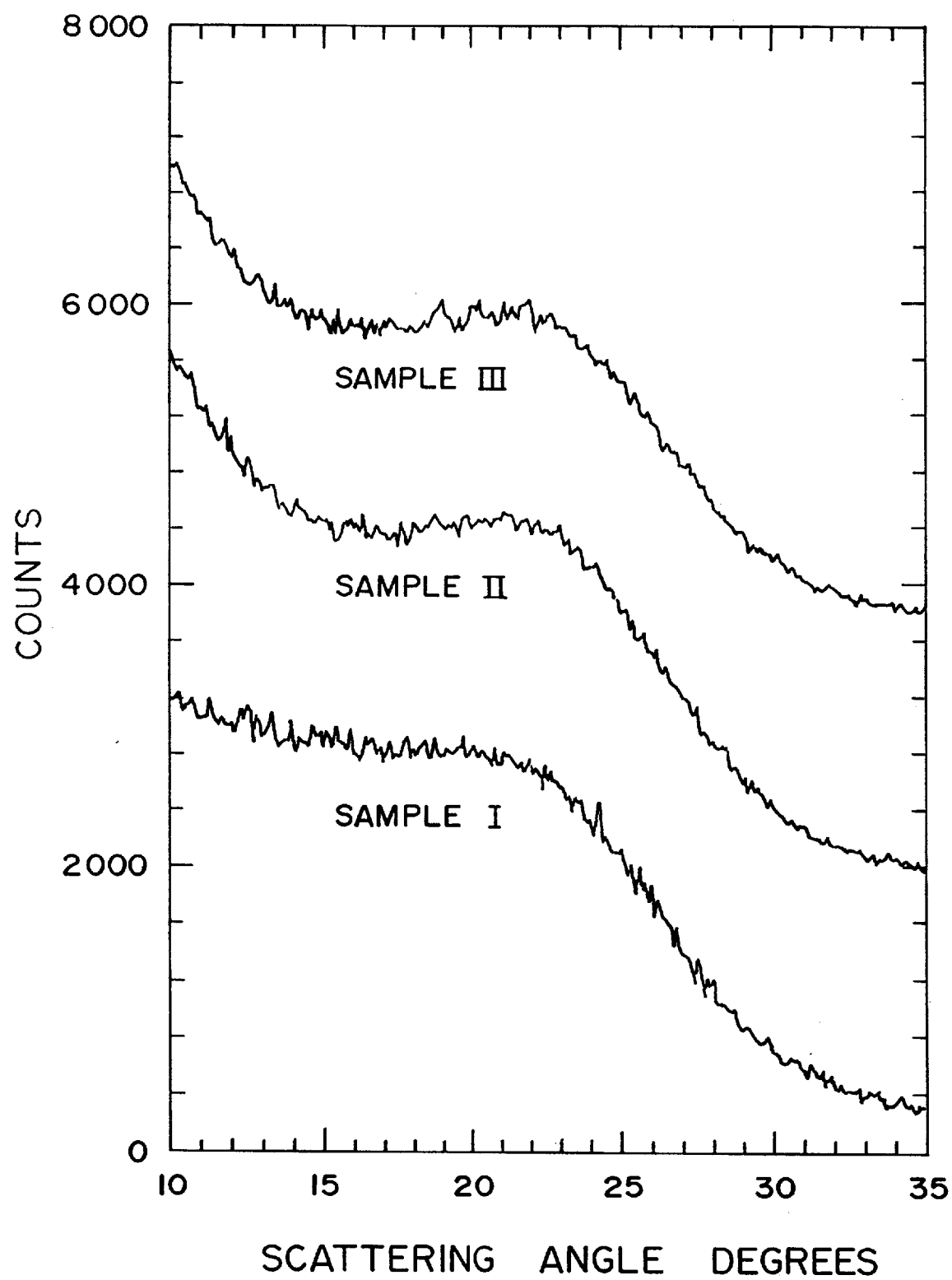
FIG. II

PRE-GRAPHITIC CARBONACEOUS INSERTION COMPOUNDS AND USE AS ANODES IN RECHARGEABLE BATTERIES

FIELD OF THE INVENTION

The invention pertains to the field of carbonaceous materials and, in particular, to pre-graphitic carbonaceous insertion materials. Additionally, the invention pertains to the field of rechargeable batteries and, in particular, to rechargeable batteries comprising carbonaceous anode materials.

BACKGROUND OF THE INVENTION

The group of pre-graphitic compounds includes carbonaceous materials that are generally prepared at low temperatures (eg: less than about 2000° C.) from various organic sources and that tend to graphitize when annealed at higher temperatures. There are however both hard and soft pre-graphitic carbon compounds, the former being difficult to graphitize substantially even at temperatures of order of 3000° C., and the latter, on the other hand, being virtually completely graphitized around 3000° C.

The aforementioned set of compounds has been of great interest for use as anode materials in lithium-ion or rocking chair type batteries. These batteries represent the state of the art in small rechargeable power sources for consumer electronics applications. These batteries have the greatest energy density (Wh/L) of conventional rechargeable systems (ie. NiCd, NiMH, or lead acid batteries). Additionally, lithium ion batteries operate around 3½ volts which is often sufficiently high such that a single cell can suffice for many electronics applications.

Lithium ion batteries use two different insertion compounds for the active cathode and anode materials. Insertion compounds are those that act as a host solid for the reversible insertion of guest atoms (in this case, lithium atoms). The structure of the insertion compound host is not significantly altered by the insertion. In a lithium ion battery, lithium is extracted from the anode material while lithium is concurrently inserted into the cathode on discharge of the battery. The reverse processes occur on recharge of the battery. Lithium atoms travel or "rock" from one electrode to the other as ions dissolved in a non-aqueous electrolyte with the associated electrons travelling in the circuit external to the battery.

The two electrode materials for lithium ion batteries are chosen such that the chemical potential of the inserted lithium within each material differs by about 3 to 4 electron volts thus leading to a 3 to 4 volt battery. It is also important to select insertion compounds that reversibly insert lithium over a wide stoichiometry range thus leading to a high capacity battery.

A 3.6 V lithium ion battery based on a $LiCoO_2$/pre-graphitic carbon electrochemistry is commercially available (produced by Sony Energy Tec.) wherein the carbonaceous anode can reversibly insert about 0.65 Li per six carbon atoms. (The pre-graphitic carbon employed is a disordered form of carbon which appears to be similar to coke.) However, the reversible capacity of lithium ion battery anodes can be increased by using a variety of alternatives mentioned in the literature. For example, the crystal structure of the carbonaceous material affects its ability to reversibly insert lithium (as described in J. R. Dahn et al., "Lithium Batteries, New Materials and New Perspectives", edited by G. Pistoia, Elsevier North-Holland, p1–47, (1993)). Graphite for instance can reversibly incorporate one lithium per six carbon atoms which corresponds electrochemically to 372 mAh/g. This electrochemical capacity per unit weight of material is denoted as the specific capacity for that material. Graphitized carbons and/or graphite itself can be employed under certain conditions (as for example in the presentation by Matsushita, 6th International Lithium Battery Conference, Muenster, Germany, May 13, 1992, or in U.S. Pat. No. 5,130,211).

Other alternatives for increasing the specific capacity of carbonaceous anode materials have included the addition of other elements to the carbonaceous compound. For example, Canadian Patent Application Serial No. 2,098,248, Jeffrey R. Dahn et al., 'Electron Acceptor Substituted Carbons for Use as Anodes in Rechargeable Lithium Batteries', filed Jun. 11, 1993, discloses a means for enhancing anode capacity by substituting electron acceptors (such as boron, aluminum, and the like) for carbon atoms in the structure of the carbonaceous compound. Therein, reversible specific capacities as high as 440 mAh/g were obtained with boron substituted carbons. Canadian Patent Application Serial No. 2,122,770, Alfred M. Wilson et al., 'Carbonaceous Compounds and Use as Anodes in Rechargeable Batteries', filed May 3, 1994, discloses pre-graphitic carbonaceous insertion compounds comprising nanodispersed silicon atoms wherein specific capacities of 550 mAh/g were obtained. Similarly, specific capacities of about 600 mAh/g could be obtained by pyrolyzing siloxane precursors to make pre-graphitic carbonaceous compounds containing silicon as disclosed in Canadian Patent Application Serial No. 2,127,621, Alfred M. Wilson et al., 'Carbonaceous Insertion Compounds and Use as Anodes in Rechargeable Batteries', filed Jul. 8, 1994.

Recently, practitioners in the art have prepared carbonaceous materials with very high reversible capacity by pyrolysis of suitable starting materials. At the Seventh International Meeting on Lithium Batteries, Extended Abstracts Page 212, Boston, Mass. (1994), A. Mabuchi et al. have demonstrated that pyrolyzed coal tar pitch can have reversible specific capacities as high as 750 mAh/g at pyrolysis temperatures about 700° C. K. Sato et al. in Science 264, 556, (1994) disclosed a similar carbonaceous material prepared by heating polyparaphenylene at 700° C. which has a reversible capacity of 680 mAh/g. S. Yata et al., Synthetic Metals 62, 153 (1994) also disclose a similar material made in a similar way. These values are much greater than that of pure graphite. The aforementioned materials can have a very large irreversible capacity as evidenced by first discharge capacities that can exceed 1000 mAh/g. Additionally, the voltage versus lithium of all the aforementioned materials has a significant hysteresis (ie. about 1 volt) between discharge and charge (or between insertion and extraction of lithium). In a lithium ion battery using such a material as an anode, this would result in a similar significant hysteresis in battery voltage between discharge and charge with a resulting undesirable energy inefficiency.

It is not understood why the aforementioned carbonaceous materials have very high specific capacity. (However, J. Dahn et al., Electrochimica Acta, Vol. 3, No.9, p. 1179–1191, 1993 speculated on the possibility of certain unorganized carbons exceeding the capacity of graphite via lithium adsorption on single graphite layers contained within. Also, in the aforementioned reference by K. Sato et al., Li dimer formation was proposed as an explanation for the very high specific capacity of their carbonaceous material.) All these materials were prepared at temperatures of about 700° C. and are crystalline enough to exhibit x-ray patterns from which the parameters $d_{002}$, $L_c$, a, and $L_a$ can be determined. (The definition and determination of these parameters can be found in K. Kinoshita, "Carbon—Electrochemical and Physicochemical Properties", John Wiley & Sons 1988.) Also, all have substantial amounts of incorporated hydrogen as evidenced by H/C atomic ratios that are greater than 0.1, and often near 0.2. Finally, it appears that pyrolyzing at higher temperature degrades the specific capacity substantially with a concurrent reduction in the hydrogen content. (In the aforementioned reference by Mabuchi et al., pyrolyzing the pitch above about 8000° C. results in a specific capacity decrease to under 450 mAh/g with a large reduction in H/C. Similar results were found in the aforementioned reference by Yata et al.)

The prior art also discloses carbonaceous compounds with specific capacities higher than that of pure graphite made from precursors that form hard carbons on pyrolysis. However, the very high specific capacities of the aforementioned materials pyrolyzed at about 700° C. were apparently not attained. A. Omaru et al, Paper #25, Extended Abstracts of Battery Division, p34, Meeting of the Electrochemical Society, Toronto, Canada (1992), disclose the preparation of a hard carbonaceous compound containing phosphorus with a specific capacity of about 450 mAh/g by pyrolyzing polyfurfuryl alcohol. The polyfurfuryl alcohol in turn had been prepared from the monomer polymerized in the presence of phosphoric acid. In Japanese Patent Application Laid Open number 06-132031, Mitsubishi Gas Chemical disclose a hard carbonaceous compound comprising 2.4% sulfur with a specific capacity of about 500 mAh/g. These hard carbonaceous compounds have additional elements incorporated therein and have all been pyrolyzed at sufficient temperature such that they contain little hydrogen (ie. the H/C atomic ratio is substantially less than 0.1). These hard carbonaceous compounds neither exhibited the very high specific capacities nor the same serious hysteresis in voltage of the aforementioned materials pyrolyzed at about 700° C.

Additionally, other high capacity carbonaceous materials have recently been prepared which show high capacity for lithium and little or no voltage hysteresis. In Paper 2B05 at the 35th Battery Symposium in Nagoya, Japan, Nov. 14–16, 1994, Y. Takahashi et al. describe materials with reversible capacities of about 480 mAh/g, but do not give the details of their preparation. In paper 2B09 at the same Symposium, N. Sonobe et al. describe hard carbon materials made from petroleum pitch with reversible capacities near 500 mAh/g. The synthesis procedure therein was not given.

Japanese patent application laid open number 06-089721 discusses the high capacity advantages of hard disordered carbons in terms of the parameters $P_s$ (the fraction of stacked carbon), $n_{ave}$ (the number of graphene sheets per stack), and SI (the stacking index). Therein, SI is defined by the height of the {002} peak relative to the local background. Therein, carbonaceous compounds having values of SI below 0.76 were claimed and the examples provided had a minimum SI of 0.67. Reversible capacities for lithium up to 460 mAh/g were obtained. However, voltage curves (and hence hysteresis characteristics) and irreversible capacities were not reported. Additionally, discussion and data regarding hydrogen contents after pyrolysis and surface area accessible to non-aqueous electrolyte were not provided.

SUMMARY OF THE INVENTION

This invention comprises novel carbonaceous insertion compounds with a high reversible capacity for alkali metal insertion, methods of preparing said insertion compounds, and the use of said insertion compounds as electrode materials in electrochemical devices in general. The alkali metal can be lithium and, in such a case, the insertion compound can have a low irreversible capacity and a small voltage hysteresis between insertion and extraction.

Carbonaceous insertion compounds of the invention comprise a pre-graphitic carbonaceous host and atoms of an alkali metal inserted therein. The alkali metal inserted can be lithium as would be the case for use in lithium ion batteries. The empirical parameter R, as determined from an x-ray diffraction pattern of the host and defined as the {002} peak height divided by the background level, is less than about 2.2. To achieve a large stoichiometry range for reversible insertion of alkali metal, R is preferably less than about 2, and most preferably less than about 1.5. The H/C atomic ratio of the host is less than about 0.1. The pre-graphitic host has a surface area accessible to non-aqueous electrolyte that is sufficiently small such that the irreversible capacity is less than about a half that of the reversible capacity, and preferably less than about a third that of the reversible capacity. The non-aqueous electrolyte can be a solution comprising ethylene carbonate and diethyl carbonate.

Electrochemical methods are preferably used to determine reversible and irreversible capacities after which an accessible surface area can be deduced. However, other physical characteristics can be used to estimate the accessible surface area. For example, methylene blue absorption capacity and BET (a standard nitrogen adsorption test) surface area provide such estimates. When the methylene blue absorption capacity of the carbonaceous host is less than about 4 micromoles per gram of host or when the surface area of the carbonaceous host as determined by BET is less than about 300 m²/gram, the accessible surface area can be sufficiently small to meet the capacity requirements.

Suitable carbonaceous hosts can be rendered unsuitable by relatively mild oxidation without overly dramatic effects on methylene blue absorption. On the other hand, the BET surface area may increase substantially but still be in a range considered acceptable in principle. It has been found that a mildly oxidized carbonaceous host can comprise enough surface oxygen such that more than 5% by weight is lost after pyrolyzing at about 1000° C. under inert gas. Thus, suitable carbonaceous hosts preferably have not been oxidized after preparation. Suitable carbonaceous hosts typically lose less than about 5% by weight under such inert pyrolysis conditions.

The pre-graphitic carbonaceous host can generally be prepared by pyrolyzing an epoxy precursor, phenolic resin precursor, carbohydrate precursor or a carbohydrate containing precursor at a temperature above about 700° C., thereby predominantly removing hydrogen from the precursor. However, the pyrolysis temperature cannot be too high in order that the empirical parameter R, determined from an x-ray diffraction pattern of the host and defined as the {002} peak height divided by the background level, remains less than about 2.2. Alkali metal atoms can be inserted into the host thereafter by conventional chemical or electrochemical means to make insertion compounds of the invention.

If an epoxy precursor is used, the epoxy precursor can be an epoxy novolac resin and can comprise a hardener in a range from zero to about 40% by weight. The hardener can be phthallic anhydride and the epoxy can be cured at about 120° C. before pyrolysis. The maximum pyrolysis temperature can be attained by ramping at from about 1° C./min to about 20° C./min. A possible embodiment of the invention can be prepared by pyrolyzing an epoxy novolac resin having the formula

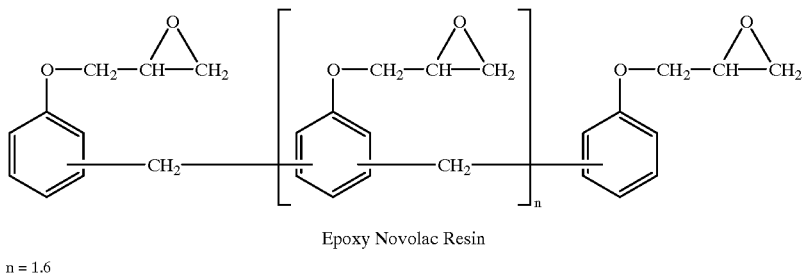

Epoxy Novolac Resin n = 1.6 at a maximum temperature below about 1100° C.

Alternatively, the epoxy precursor can be a bisphenol A epoxy resin. The maximum pyrolysis temperature can be attained by ramping at about 30° C./min. A possible embodiment of the invention can be prepared by pyrolyzing a bisphenol A epoxy resin having the formula

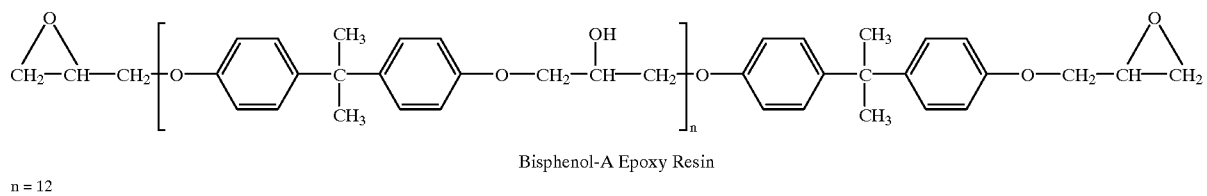

Bisphenol-A Epoxy Resin n = 12 at a temperature about 800° C.

If a phenolic resin precursor is used, the pyrolysis temperature can preferably be above about 800° C. and the empirical parameter R is preferably less than about 1.6 in order to achieve a large stoichiometry range for reversible insertion of alkali metal.

The phenolic resin precursor can be of the novolac or the resole type. The latter can be preferably pyrolyzed at a temperature in the range from about 900° C. to about 1100° C. Both types can be cured at about 150° C. before pyrolysis. The pyrolysis temperature for both types can be maintained for about one hour.

If a carbohydrate precursor or carbohydrate containing precursor is used, the pyrolysis temperature can be preferably above about 8000° C. and the empirical parameter R is preferably less than about 2. Along with other previously mentioned advantages, such hosts can have relatively large tap density, often exceeding 0.7 g/ml.

Such a carbohydrate precursor or carbohydrate containing precursor can be selected from the group consisting of sugar, starch, and cellulose or substances containing these materials. Specifically, the carbohydrate precursor can be sucrose, starch, or the cellulose in red oak, maple, walnut shell, filbert shell, almond shell, cotton or straw.

The pyrolysis can be performed at a temperature in the range from about 900° C. to about 1100° C. for about an hour. It can be advantageous to attain the pyrolysis temperature quickly, for example by ramping at a rate of about 25° C. per minute.

It can be advantageous to precarbonize the carbohydrate by washing with an acid (such as concentrated sulfuric acid) before pyrolysis.

Compounds of the invention can be used as a portion of an electrode in various electrochemical devices based on insertion materials (eg. supercapacitors, electrochromic devices, etc.). A preferred application for these compounds is use thereof as an electrode material in a battery, in particular a non-aqueous lithium ion battery comprising a lithium insertion compound cathode; a non-aqueous electrolyte comprising a lithium salt dissolved in a mixture of non-aqueous solvents; and an anode comprising the carbonaceous insertion compound of the invention.

BRIEF DESCRIPTION OF THE DRAWINGS

FIG. 6a is an expanded version of FIG. 6b in the region near zero volts. The points at which lithium plating and stripping occur are indicated by arrows for the battery comprising the 550° C. pyrolyzed sample. The plots in each Figure are offset sequentially by 0.05 volts and 0.1 volts respectively for clarity.

FIG. 11 shows the x-ray diffraction patterns in the vicinity of the {002} peak for samples I, II, and III of Epoxy Example 1. The patterns have been offset vertically by 1600 counts for clarity.

FIG. 12a is an expanded version of FIG. 12b in the region near zero volts. The points at which lithium plating and stripping occur are indicated by arrows for the battery comprising sample IV. The plots in each Figure are offset sequentially by 0.05 volts and 0.1 volts respectively for clarity.

FIG. 13a is an expanded version of FIG. 13b in the region near zero volts. The points at which lithium plating and stripping occur are indicated by arrows for the battery comprising sample VII. The plots in each Figure are offset sequentially by 0.05 volts and 0.1 volts respectively for clarity.

FIG. 17a is an expanded version of FIG. 17b in the region near zero volts.

(In FIG. 19a, the shifts are 0.0, 0.1, 0.25, 0.3, and 0.4 volts for sample B700, B800, B900, B1000, and B1100 respectively. In FIG. 19b, the shifts are 0.0, 0.1, 0.3, 0.5, and 0.8 volts for sample B700, B800, B900, B1000, and B1100 respectively).

FIG. 25a is a magnified view of a portion of FIG. 25b. The onset of lithium plating during discharge and the termination of lithium stripping during charge is indicated by the vertical lines for sample 8 in FIG. 25a. The data has been offset sequentially for clarity by 0.05V in FIG. 5a and by 0.1V in 25b.

FIG. 26a is a magnified view of a portion of FIG. 26b. The data has been offset sequentially for clarity by 0.05V in FIG. 26a and by 0.1V in 26b.

DETAILED DESCRIPTION OF THE SPECIFIC EMBODIMENTS OF THE INVENTION

Insertion compounds of the invention comprise hard pre-graphitic carbonaceous hosts having very poorly stacked graphene layers, little hydrogen content, and a small surface area accessible to common non-aqueous electrolyte solutions.

The carbonaceous hosts of said compounds can be derived from pyrolysis products of suitable precursors. Suitable precursors are those that can be pyrolyzed such that little hydrogen remains (ie. such that the H/C atomic ratio is less than about 0.1) and yet such that the host does not graphitize to such an extent that the empirical parameter R as determined by x-ray diffraction pattern exceeds about 2.2.

Figure 1:
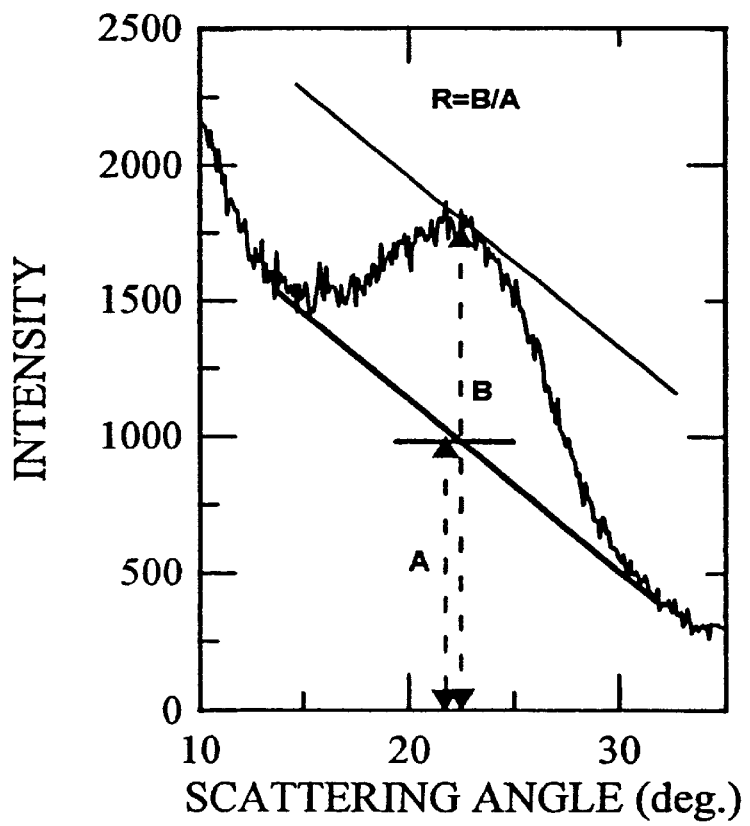
FIG. 1 shows the definition of R on an almost featureless x-ray diffraction pattern of a pre-graphitic carbon in the region around the {002} peak.

Herein, the empirical parameter R is used for purposes of describing such disorganized structures and is determined by dividing the {002} peak height by an estimate of the background level at the Bragg angle corresponding to the position of the {002} peak. R provides a convenient empirical means of quantifying the degree of graphitization of these compounds which have almost featureless x-ray diffraction patterns. FIG. 1 illustrates the definition of R on a representative, almost featureless x-ray diffraction pattern of a pre-graphitic carbon in the region around the {002} peak. A tangential line is drawn below, but in the immediate vicinity of, the {002} peak to exclude the background. The point where a parallel line just intersects the peak defines the position of the maximum peak height. The value B in FIG. 1 thus indicates the {002} peak height and the value A indicates the background estimate. R can thus be used to distinguish the stacking order in very disorganized materials. To quantitatively measure R reproducibly, all of the x-ray beam of the diffractometer must be confined to the carbon sample in the angular range of interest (ie. from 10° to 35° when a copper target x-ray tube is used).

R is related to the aforementioned parameter SI of the prior art. When the local background is relatively flat and/or if the {002} peak is relatively large compared to the background, SI is approximately equal to 1-(1/R). The prior art claimed SI values below 0.76 and showed carbonaceous examples having a minimum SI value of 0.67. Using the approximate conversion formula, these values correspond to R of 4.2 and 3.0 respectively.

This type of insertion compound can have a high reversible capacity for alkali metal insertion. When the alkali metal is lithium, the insertion compounds additionally can have a low irreversible capacity and a small voltage hysteresis between insertion and extraction. It appears necessary for the carbonaceous host to have a small surface area accessible to common non-aqueous electrolyte solutions in order to obtain these additional advantages. This is especially important for application in lithium ion batteries. Electrolyte reactions that consume lithium occur at the anode surface in such batteries. Thus, use of an anode having a large surface area accessible to electrolyte results in substantial irreversible capacity loss and electrolyte loss. These losses are avoided if the anode surface is not accessible to the electrolyte. The surface area of the carbonaceous hosts accessible to common non-aqueous electrolytes is not directly measurable though. However, it can be inferred to a certain extent by the observed irreversible capacity of the lithium-carbon insertion compound. Desirably, the accessible surface area is such that the irreversible capacity is less than about half that of the reversible capacity for practical application in lithium ion batteries. Preferably, the irreversible capacity is smaller still, being less than about a third that of the reversible capacity.

A method for estimating the accessible surface area can be employed that is based on the absorption of methylene blue (commonly used for activated carbons). In the literature (see for example, *Active Carbon* by H. Jankowska, A. Swiatkowski, J. Choma, translated by T. J. Kemp, published by Ellis Horwood, New York, 1991), methylene blue (MB) is considered to have an equivalent minimum linear dimension of 1.5 nm. That is, MB is expected to penetrate into pores having diameters greater than 1.5 nm. Although non-aqueous electrolyte solutions can have equivalent linear dimensions smaller than this, generally those of interest for commercial applications might be of that order in size. Thus, it was estimated that if certain areas of a sample were not accessible to MB, then these same areas would also not be accessible to electrolyte.

The electrolyte-accessible surface area was often sufficiently small if the methylene blue absorption capacity of the carbonaceous host was found to be less than about 4 micromoles per gram of host. However, compounds have been synthesized that meet the methylene blue criterion yet still appear to have unacceptably large electrolyte-accessible surface area. This is demonstrated in the Illustrative examples to follow.

The BET method is a conventional way of measuring surface area accessible to nitrogen. This too provides a means of estimating the electrolyte-accessible surface area of the carbonaceous host. The electrolyte-accessible surface area can be sufficently small when corresponding BET surface area values are as high as about 300 $m^2$/gram of host. However, hosts might conceivably have larger BET surface areas and still have sufficently small electrolyte-accessible surface area.

It has been discovered that carbonaceous hosts of the invention which have been slightly oxidized can have significantly increased electrolyte-accessible surface area without exceeding or significantly exceeding the aforementioned methylene blue absorption or the BET criteria. Thus, oxidizing represents a means of ruining otherwise suitable carbonaceous hosts. Also, oxidizing represents a means for fine tuning the characteristics of the hosts such that the electrolyte-accessible surface area of the host cannot be adequately distinguished by the aforementioned methods of estimating. Such oxidation results in the formation of surface oxides which can be subsequently removed by pyrolyzing at high temperature (eg. 1000° C.) under inert gas. Under these circumstances, a weight loss of 5% or more can be indicative of a host ruined by oxidation. Conversely, a weight loss of less than about 5% after oxidation can be indicative of a suitable carbonaceous host. This is demonstrated in the Illustrative examples to follow.

As is known to those skilled in the art, the capacity values of lithium carbonaceous insertion compounds can vary depending on the choice of non-aqueous electrolyte employed. Certain choices might always result in large irreversible capacity values. A solvent mixture known in the art to be associated with low irreversible capacities comprises ethylene carbonate and diethyl carbonate. Electrolytes based on this solvent mixture can be suitable for evaluating the electrolyte-accessible surface area.

Various precursors can be pyrolyzed to provide the aforementioned type of carbonaceous hosts that have a high reversible capacity for alkali metal insertion. Certain epoxies, phenolic resins, carbohydrates and/or carbohydrate containing compounds have all been found to be suitable precursors. Suitable precursors include those that, when pyrolyzed at temperatures above about 700° C., do not graphitize to such an extent that the empirical parameter R as determined by x-ray diffraction pattern exceeds about 2.2.

Herein, the term epoxy refers to that group of thermosetting resins based on the reactivity of the epoxide group (as per the definition in *The Condensed Chemical Dictionary*, Ninth Ed., Van Nostrand Reinhold, 1977). Common members of this group include bisphenol A-based epoxies and epoxy novolac resins. These are particularly suitable epoxies that, when pyrolyzed above 700° C., provide pre-graphitic carbonaceous hosts that do not exhibit severe hysteresis in voltage upon insertion or extraction of lithium. When pyrolyzed at temperatures such that R is below 2.2, these hosts exhibit very high specific capacities for lithium. The specific capacity for lithium increases as R decreases. Thus, smaller values of R appear preferable in general. This is illustrated in the epoxy precursor examples to follow wherein R appears to be preferably less than about 2 and most preferably less than about 1.5.

Phenolic resins can also be suitable precursors and can offer some advantages over epoxies in this application. The pyrolysis of epoxy novolac resins (eg. DEN 438, trademark of DOW) gives product yields near 30%. It is well known however that phenolic resins (or phenol-formaldehyde resins) can also be pyrolysed to give hard carbons with high yield (as for example mentioned in E. Fitzer et al., *Carbon* 7, 643 (1969). Since the former can cost about $5 per pound versus about $1.00 per pound for the latter at the time of this writing, a cost advantage might be expected for phenolic resin precursors.

Suitable phenolic resin precursors include those of the novolac or resole type. Based on the phenolic resin precursor examples to follow, it appears preferable to pyrolyze these precursors at temperatures above about 800° C. in order to provide pre-graphitic carbonaceous hosts that do not exhibit severe hysteresis in voltage upon insertion or extraction of lithium and that are are also characterized by low H/C atomic ratios. Smaller values of R appear preferable as illustrated in these examples wherein R appears to be preferably less than about 1.6.

The McGraw-Hill Dictionary of Scientific and Technical Terms, McGraw-Hill, Inc., New York, defines a carbohydrate as any of the group of organic compounds composed of carbon, hydrogen, and oxygen, including sugars, starches and celluloses. The carbohydrate precursors of the subject invention encompass all carbohydrates composed of carbon, hydrogen and oxygen.

The sugars can comprise monosaccharides (simple sugars), disaccharides (more complex sugars including sucrose, the common table sugar), and polysaccharides, the latter comprising the entire starch and cellulose families. Starch is a polymer of $\alpha$-D-glucose while cellulose is a polymer of $\beta$-D-glucose. The glucose rings in cellulose have a different relative orientation than in starch. Isomers or compounds with such orientation differences can behave radically differently in biochemical processes. However, in inorganic processes, such differences may not matter. For example, the physical characteristics and electrochemical behaviour of insertion compounds prepared by pyrolyzing different isomers would likely be the same.

The use of carbohydrates as a precursor offers certain advantages over epoxy and/or phenolic resin precursor options. While phenolic resins can be relatively inexpensive compared to epoxies and can give higher yields when pyrolyzed (near 60%), the pyrolysis process generates substantial amounts of tarry residue which is difficult to dispose of and may be carcinogenic.

Naturally occurring carbohydrates are attractive precursors because they are plentiful and relatively inexpensive. For example, oak (predominantly consisting of cellulose) can cost about $0.08 per pound. Even with a pyrolysis yield of 20%, this can result in a cost for the product that is about 5 times less than the corresponding cost for phenolic resin derived product. Additionally, carbohydrate precursors can lead to product with a high tap density which is needed for high volumetric energy density in lithium ion batteries. Finally, carbohydrate precursors can result in less tarry residue per gram of carbon produced than do phenolic resin precursors.

We have discovered that pyrolyzing suitable carbohydrate precursors, and carbohydrate containing precursors, above 800° C. can provide pre-graphitic carbonaceous hosts which have low H/C atomic ratios (<0.1). Additionally, pyrolyzing at temperatures such that R is below 2.2 provides for hosts with very high specific capacities for lithium. The specific capacity for lithium increases as R decreases. As shown in the carbohydrate precursor examples to follow, pyrolysis products can be prepared with R values less than about 2 that have large reversible capacities. These products also have methylene blue absorption values less than 4 micromoles per gram and BET values less than 300 $m^2$/gram and do not exhibit large irreversible capacities nor severe hysteresis in voltage upon insertion or extraction of lithium. Tap densities as high as 0.7 g/ml can also be achieved.

Regardless of precursor(s) employed, the pyrolysis should be performed under a controlled atmosphere to prevent formation of undesired oxides of carbon. A suitable reaction system could consist of a reaction tube (quartz for example) installed in a conventional tube furnace wherein the tube has sealed inlet and outlet connections for purposes of controlling the atmosphere therein. The precursor(s) could thus be pyrolyzed in the reaction tube under an inert gas flow or even under reduced or elevated pressure.

The electrolyte-accessible surface area of the pyrolyzed product should be relatively small. In general therefore, it is undesirable to oxidize the precursor during pyrolysis as this would be expected to result in an increase in this area. Since the by-product gases of pyrolysis include unwanted oxidizing gases, it is desirable to remove these quickly.

Ramping the furnace temperature relatively quickly to the pyrolysis temperature and minimizing the pyrolysis period can also be generally desirable in order to minimize graphitization of the product. In the case of epoxy or phenolic resin precursor(s), to ensure good product yields, both should ideally substantially pyrolyze rather than simply evaporate. This issue must be considered in the selection of preferred precursor(s). It can therefore be advantageous to cure, or cross-link, the precursor before pyrolysis. The extent of such curing may be a significant variable affecting the desired ultimate properties of the pyrolyzed precursor(s). It may therefore be advantageous to consider incorporating soaking periods at several temperatures as part of the heat treatment. For example, a low temperature soak might be used for curing the precursor(s) prior to a final heating to the pyrolysis temperature. Alternately, the heating rate might be varied to control the extent of the curing prior to pyrolysis.

In the case of carbohydrate precursors, it can be advantageous to precarbonize the carbohydrate prior to pyrolysis at a low temperature. A means for so doing is to wash the carbohydrate with a strong acid which is subsequently rinsed away.

The aforementioned product has no alkali metal inserted as prepared. Alkali metal atoms, in particular Li, can be inserted thereafter via conventional chemical or electrochemical means (such as in a lithium or lithium ion battery).

Generally, powdered forms of such compounds are used in electrode applications and thus a grinding of the pyrolyzed product is usually required. A variety of embodiments, in particular various battery configurations, are possible using electrode material prepared by the method of the invention. Miniature laboratory batteries employing a lithium metal anode are described in the examples to follow. However, a preferred construction for a lithium ion type product is that depicted for a conventional spiral-wound type battery in the cross-sectional view of FIG. 2. A jelly roll 4 is created by spirally winding a cathode foil 1, an anode foil 2, and two microporous polyolefin sheets 3 that act as separators.

Cathode foils are prepared by applying a mixture of a suitable powdered (about 10 micron size typically) cathode material, such as a lithiated transition metal oxide, possibly other powdered cathode material if desired, a binder, and a conductive dilutant onto a thin aluminum foil. Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered. Anode foils are prepared in a like manner except that a powdered (also typically about 10 micron size) carbonaceous insertion compound of the invention is used instead of the cathode material and thin copper foil is usually used instead of aluminum. Anode foils are typically slightly wider than the cathode foils in order to ensure that anode foil is always opposite cathode foil.

Figure 2:
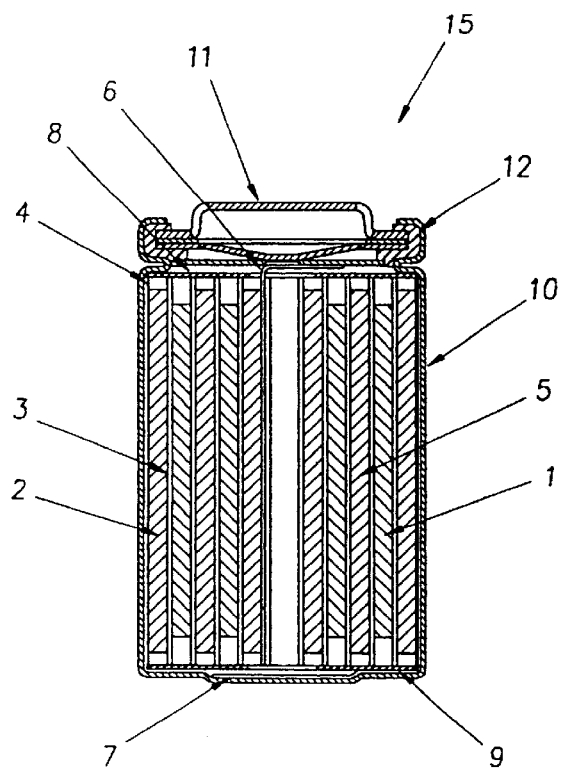
FIG. 2 shows a cross-sectional view of a conventional lithium ion spiral-wound type battery.

The jelly roll 4 is inserted into a conventional battery can 10. A header 11 and gasket 12 are used to seal the battery 15. The header may include safety devices if desired. A combination safety vent and pressure operated disconnect device may be employed. FIG. 2 shows one such combination that is described in detail in Canadian Patent Application No. 2,099,657, Alexander H. Rivers-Bowerman, 'Electrochemical Cell and Method of Manufacturing Same', filed Jun. 25, 1993. Additionally, a positive thermal coefficient device (PTC) may be incorporated into the header to limit the short circuit current capability of the battery. The external surface of the header 11 is used as the positive terminal, while the external surface of the can 10 serves as the negative terminal.

Appropriate cathode tab 6 and anode tab 7 connections are made to connect the internal electrodes to the external terminals. Appropriate insulating pieces 8 and 9 may be inserted to prevent the possibility of internal shorting. Prior to crimping the header 11 to the can 10 in order to seal the battery, electrolyte 5 is added to fill the porous spaces in the jelly roll 4.

Those skilled in the art will understand that the types of and amounts of the component materials must be chosen based on component material properties and the desired performance and safety requirements. The compounds prepared in the examples to follow can have somewhat increased irreversible capacity for lithium along with an increased reversible capacity over that of many typical commercial carbonaceous anode materials. Also, the highest tap density of the example compounds is still somewhat lower than that of typical commercial anode materials. This must be taken into account in the battery design. enerally an electrical conditioning step, involving at least the first recharge of the battery, is part of the assembly process. Again, the determination of an appropriate conditioning step along with the setting of the battery operating parameters (eg. voltage, current, and temperature limits) would be required of someone familiar with the field.

Other configurations or components are possible for the batteries of the invention (eg. prismatic format). A miniature embodiment, eg. coin cell, is also possible and the general construction of such cells is described in the laboratory coin cell examples to follow.

Without wishing to be bound by theory, adversely or otherwise, the inventors offer the following discussion regarding this type of hard carbonaceous host compound in order to explain how structural characteristics relate to the electrochemical characteristics and therefore what structural characteristics are desirable for electrochemical applications. For overall simplicity, the following discussion pertains to lithium insertion compounds. However, where appropriate, similar comments apply for other alkali metals.

The presence of substantial hydrogen in carbonaceous materials of the prior art prepared by pyrolysis at low temperatures (between 550° C. and 750° C.) correlates with very high specific capacity but also with large hysteresis between insertion and extraction voltage. These effects may involve a binding of the inserted lithium and the hydrogen.

Hard carbonaceous materials having little hydrogen can still exhibit specific capacities exceeding that of graphite however. The graphene sheets in the precursors for these hard carbonaceous materials are cross-linked and this prevents the ordered stacking of layers in the graphite structure as the precursors are pyrolyzed. When poorly stacked graphene layers are present, it may be possible to adsorb lithium onto the surfaces of each side of the layers. These surfaces are found within the carbon particles, on the atomic scale. In graphite, the layers are well stacked in a parallel fashion and intercalation of lithium to a composition of $LiC_6$ is possible (corresponding to about 370 mAh/g and one intercalated layer of lithium per graphene sheet). In materials with poorly stacked layers, unshared lithium layers might possibly be found on each side of the graphene sheets, resulting in compositions up to almost $Li_2C_6$ (corresponding to about 740 mAh/g). Thus, the number of single layer graphene sheets in the carbonaceous material may be important vis a vis specific capacity.

Information about the average number, N, of stacked graphene sheets in a carbon between serious stacking mistakes can be obtained by x-ray diffraction. This number N, multiplied by the average layer spacing is commonly given the name, $L_c$. It may therefore be desirable to make carbonaceous materials with N about 1 and with very small $L_c$ (eg. less than about 5 Å). The {002} Bragg peak measured in a powder x-ray diffraction experiment is normally used to determine $L_c$ and N. For N=1, there is no {002} peak since there are no stacked parallel graphene layers to create interferences. (Such a carbon sample might be thought of as having single graphene sheets arranged as in a 'house of cards'.) As N increases (beginning to stack the deck of cards), the {002} peak increases in height and decreases in width. Simultaneously, the background on the low angle side of the peak decreases, as N increases. Herein, the empirical parameter R is used for purposes of describing such structures and can be used to distinguish the stacking order in very disorganized materials. Materials having very small R values (about 1) would have N values near 1. Materials having R near 5 would have significantly larger N, possibly with N about 10. Thus, increases in R can be interpreted as increases in the average N in the sample.

The 'house of cards' structure of such disorganized carbons implicitly suggests the presence of significant voids or pores in the structure. The pore number, size, and shape (particularly of the openings) would be expected to relate to the ability of the single-layer sheets to absorb lithium on both sides and also to have an impact on the electrolyte accessible surface area. For instance, a relatively large number of single-layer sheets implies the existence of a relatively large number of 'pores' between sheets. The preferred pore size is large enough to allow lithium to adsorb on both sides yet not to allow access to non-aqueous electrolyte (a size in the nanometer scale).

Pores can be bottle shaped having neck openings that are small enough to exclude electrolyte from the interior. However, the same pores can still have interiors that are large enough to easily accomodate electrolyte. Samples having numerous such bottle shaped pores can therefore have either relatively large or small surface area depending on how it is measured. For example, if the pore opening is large enough to admit nitrogen but not methylene blue, then nitrogen can be adsorbed on the interior pore surfaces whereas methylene blue cannot. Additionally, minor differences in the size of the pore openings can result in dramatically different electrochemical results. Conceivably, a sample could have enormous internal pore surface area (>>300 m$^2$/g) as determined by BET that is inaccessible to the larger methylene blue molecules. If the effective size of the non-aqueous electrolyte is intermediate to that of nitrogen and methylene blue, such a sample might have either an enormous or a negligible electrolyte accessible surface area depending on minor differences in the size of the pore openings.

A possible means of gradually increasing pore size and openings thereof is by burning off small amounts by heating samples in an oxygen containing atmosphere. (Previous studies on active carbon (J. S. Mattson et al., *Activated Carbon*, Marcel Dekker Inc. N.Y, 1971 and F. Rodriguez-Reinoso et al., Chemistry and Physics of Carbon, Vol. 21, Edited by P. A. Thrower, p1) showed that both the sizes and shapes of pores can be manipulated by physical and chemical activation processes. Note however that most activated carbons are not acceptable host materials for electrochemical lithium insertion because the pore sizes are too large (on the micrometer scale)). Thus, oxidizing may be a means for incrementally increasing both the interior pore surface area and the critical size of pore openings. Some results pertaining to this subject are shown and discussed in the Illustrative Examples to follow.

Small angle x-ray scattering has been widely used for the study of pore structure in carbons (see for example, H. Peterlik et al., Carbon, 32 (1994) p.939). The presence of a substantial number of micropores results in substantial scattering of x-rays at small angle. Thus, carbonaceous hosts of the invention are expected to exhibit such scattering. Conversely, the absence of such scattering is indicative of the absence of micropores (as shown in an Illustrative Example to follow). Note that pores can be closed (ie. no openings) and materials comprising such pores will still show substantial x-ray scattering. Thus, carbonaceous hosts can be imagined that have more pore volume, lower R values, and more small angle scattering, yet less lithium capacity and less irreversible capacity than a comparable host if many pores are closed.

The Guinier theory and formulae (in A. Guinier, *Small-angle scattering of X-rays*, Wiley and Sons, N.Y, 1955) can be used to determine pore sizes from the small angle scattering intensity assuming homogeneous spherical pore sizes and randomly located pores. The radius $R_s$ of the pores is related to the radius of gyration, $R_g$, by:

$$R_g = (3/5)^{1/2} R_s$$

The intensity, $I_q$, at wavevector q is related to the radius of gyration by:

$$I_q \sim NV^2 \exp(-q^2 R_g^2/3)$$

where N is the number of pores and V is their volume. This theory therefore predicts a straight line relationship between ln ($I_q$) and $q^2$. Although the aforementioned assumptions do not generally hold, such a straight line relationship was observed in the case of the following Inventive examples. This suggests that these examples comprise pores of approximately uniform size. Generally speaking, uniform pore sizes are preferred since sizes at the small extreme (ie. in the range of the normal interatomic distances) would contribute less to reversible alkali metal capacity, while sizes at the larger extreme (ie. >30 Å) would be more accessible to electrolyte leading to irreversible capacity (as shown in an Illustrative Example to follow).

A. Mabuchi et al., J. Electrochem. Soc., Vol. 142, No. 4, April 1995, show radii of gyration values derived from small angle scattering data for mesocarbon microbeads containing substantial hydrogen. The effective pore sizes are relatively very large ($R_g$ of approximately 37 Å and up) and the compounds exhibit significant hysteresis in their voltage curve upon insertion/extraction of lithium.

BACKGROUND INFORMATION FOR THE EXAMPLES

The following examples are provided to illustrate certain aspects of the invention but should not be construed as limiting in any way.

In general, carbonaceous materials were prepared from hydrocarbon or polymer precursors by pyrolysis under inert gas. Unless otherwise indicated, weighed amounts of the precursors were placed directly in alumina boats and inserted within a stainless steel or quartz furnace tube. The tube was flushed with inert gas for about 30 minutes and then it was inserted into a tube furnace. The furnace and hence the sample temperature was raised to the final pyrolysis temperature and held there for one hour. The heating rate was sometimes deemed to be important, and in those cases the rate was carefully controlled using a programmable temperature controller.

Powder x-ray diffraction was used to characterize samples using a Seimens D5000 diffractometer equipped with a copper target x-ray tube and a diffracted beam monochromator. The diffractometer operates in the Bragg-Brentano pseudofocussing geometry. The samples were made by filling a 2 mm deep well in a stainless steel block with powder and levelling the surface. The incident slits used were selected so that none of the x-ray beam missed the sample in the angular range from 10° to 35° in scattering angle. The slit width was fixed during the measurement. This ensured reproducibility in the measured values of R. (Note: In certain Examples, R was determined slightly differently than mentioned in the preceding. In the Inventive Examples pertaining to Epoxy and Phenolic Resin Precursors, Prior art Examples 1 and 2, and the Illustrative Example re Activated Carbons, the position of the {002} peak was taken to be that of the peak position including the background rather than excluding the background. The effect on the determined values of R is small for all practical purposes and is negligible in the following Examples.)

Where indicated, small angle x-ray scattering data was collected using the preceding diffractometer operating in transmission geometry. Samples were prepared by filling a rectangular frame, having kapton windows, with powder. The prepared samples were about 1.5 mm thick. The incident, antiscatter, and receiving slits were all set to their minimum values of 0.1°, 0.1°, and 0.1 mm respectively. Minimum scattering angles of about 0.50 could be reached with this equipment, which corresponds to a wavevector q of about 0.035 Å$^{-1}$. The intensity scattered at 2θ=1° was measured and divided by the sample mass to get a relative measure of the number of pores times volume$^2$ in the samples. This value was denoted $I_1$. $R_g$ was determined using straight line fits to the small angle scattering data plotted as ln (intensity) versus $q_2$ and the aforementioned formula.

Carbon, hydrogen, and nitrogen content was determined on samples using a standard CHN analysis (gas chromatographic analysis after combustion of the samples in air). The weight percents so determined had a standard deviation of ±0.3%. In every case, the carbon content was greater than 90% of the sample weight and the hydrogen content was less than 3.3%. The H/C atomic ratio was estimated by taking the ratio of the hydrogen and carbon weight percentages and multiplying by 12 (the mass ratio of carbon to hydrogen). The nitrogen content of all the samples was low and was not always reported. The oxygen content of the samples was not analyzed.

Where indicated, the absorption capacity for methylene blue (MB) was determined using a modification of conventional methods (as in the aforementioned reference Active Carbon). Samples were dried prior to testing at 130° C. In most of the following Examples, about 0.1 grams of sample was placed in a flask along with 1–2 ml of 0.2% surfactant solution (prepared using Micro-Liquid Laboratory Cleaner (trademark), a standard laboratory detergent) plus about 5 ml of deionized water. A titration was then performed using a 1.5 g/L titrating solution of hydrated MB in discrete steps. An initial amount of solution was added followed by 5 minutes of vigorous shaking. (The initial amount was either a minimum 0.1 ml or 1.0 ml depending on the estimated adsorption capacity of the sample.) The resulting mixture was then visually compared to a 0.4 mg/L reference solution of MB. If the mixture was clearer than the reference, another 1.0 ml of titrating solution was added and the steps repeated. If the mixture was not clearer than the reference, adsorption was allowed to continue for a maximum of 3 days. If the mixture again became clearer than the reference, the discrete titrating continued. Otherwise, the measurement was finished and the adsorption capacity was taken to be that amount of MB titrated just before the last stepwise addition. For the samples tested, generally the titrated MB was adsorbed in the 5 minute interval periods with the exception of the last few stepwise additions. In the Carbohydrate Precursor Examples and the Illustrative Examples re burnoff and small angle scattering, the procedure was the same except that a 1 mM methylene blue titrating solution was used and the stepwise additions were not of constant magnitude.

Initially, conventional BET methods were tried in order to determine the surface area of some hard carbon products based on the adsorption of nitrogen. The surface area could not be determined reliably in this way however. During analysis, adsorption continued slowly over long periods of time (hours). It seemed that the samples had substantial surface area that was difficult, but possible, to access with nitrogen. Thus, the reliability of adsorption values was considered questionable using conventional BET methods. Instead, a modified procedure was employed. Herein, single point BET surface area measurements were made using a Micromeritics Flowsorb 2300 surface area analyzer. Carbon samples were outgassed under inert gas for several hours at 140° C. before each measurement. The adsorption of nitrogen (from a 30% nitrogen in helium mixture) at 77° K. on the samples was allowed to proceed for several hours. Adsorption was considered complete when the thermal conductivities of the gas stream before and after the sample were equal, indicating identical gas compositions. The amount of $N_2$ adsorbed was determined by that which desorbed when the sample temperature was increased to room temperature. Two measurements were made for each sample and the results reported represent the average of the two desorptions. The measurements usually can be duplicated satisfactorily with an accuracy within ±3%. Standard methods were then used to calculate the specific surface area of the sample accessible to $N_2$ molecules.

Where indicated, tap densities were measured using a Quantachrome Dual Autotap device. Samples were placed in a 10 ml graduated cylinder and subjected to 500 standard taps.

Figure 3:
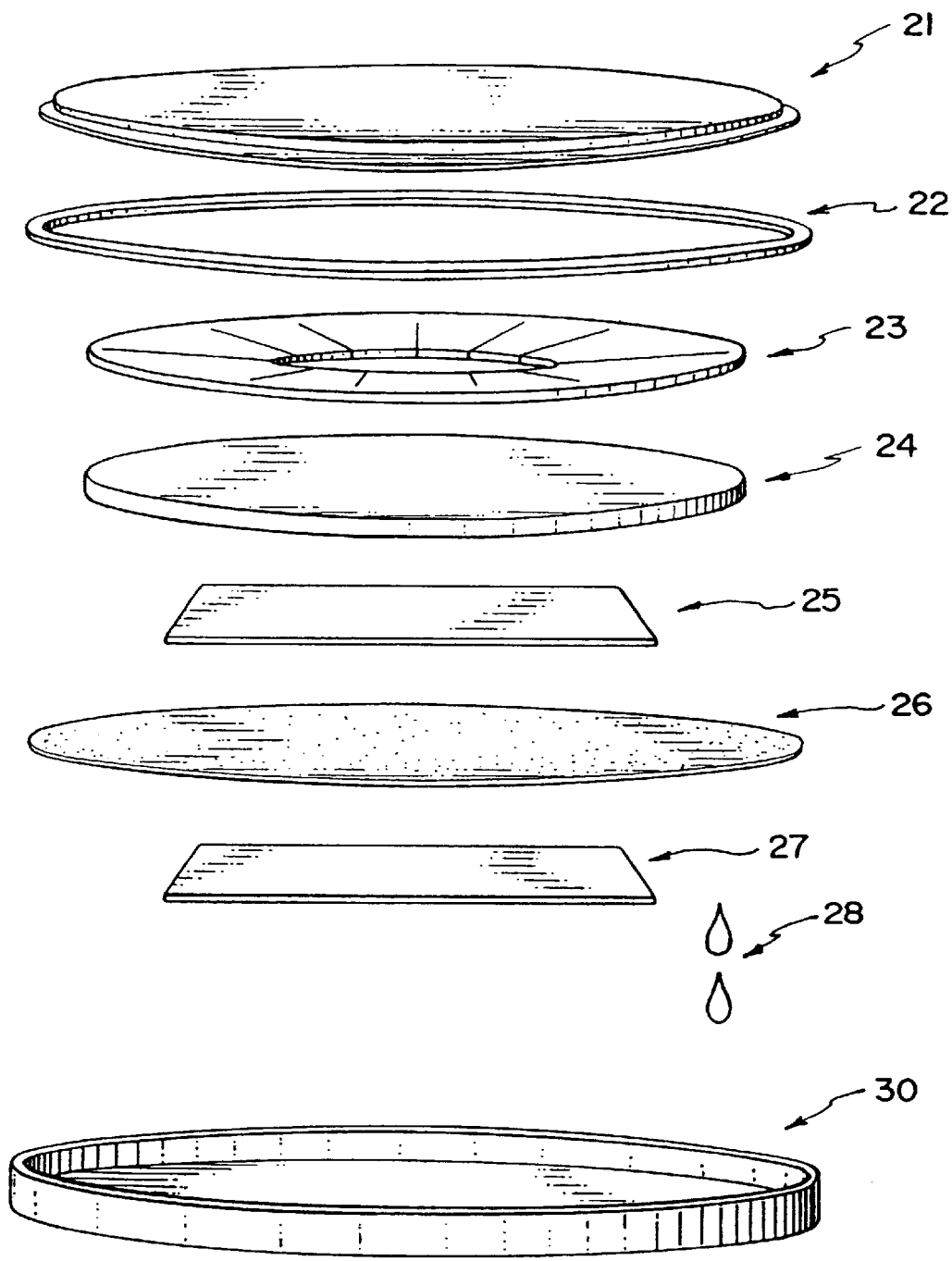
FIG. 3 depicts an exploded view of the laboratory coin cell battery used in the Examples.

Laboratory coin cell batteries were used to determine electrochemical characteristics of the samples including specific capacity for lithium. These were assembled using conventional 2325 hardware and with assembly taking place in an argon filled glove box as described in J. R. Dahn et al, Electrochimica Acta, 38, 1179 (1993). FIG. 3 shows an exploded view of the coin cell type battery. For purposes of analysis, the samples were used as cathodes in these batteries opposite a lithium metal anode. A stainless steel cap 21 and special oxidation resistant case 30 comprise the container and also serve as negative and positive terminals respectively. A gasket 22 is used as a seal and also serves to separate the two terminals. Mechanical pressure is applied to the stack comprising lithium anode 25, separator 26, and sample cathode 27 by means of mild steel disc spring 23 and stainless disc 24. The disc spring was selected such that a pressure of about 15 bar was applied following closure of the battery. 125 $\mu$m thick metal foil was used as the lithium anode 25. Celgard® 2502 microporous polypropylene film was used as the separator 26. The electrolyte 28 was a solution of 1M $LiPF_6$ salt dissolved in a solvent mixture of ethylene carbonate and diethyl carbonate in a volume ratio of 30/70.

Sample cathodes 27 were made using a mixture of powdered sample compound plus Super S (trademark of Ensagri) carbon black conductive dilutant and polyvinylidene fluoride (PVDF) binder (both in amounts of about 5% by weight to that of the sample) uniformly coated on thin copper foil. The powdered sample and the carbon black were initially added to a solution of 20% PVDF in N-methylpyrollidinone (NMP) to form a slurry such that 5% of the final electrode mass would be PVDF. Excess NMP was then added until the slurry reached a smooth syrupy viscosity. The slurry was then spread on small preweighed pieces of Cu foil (about 1.5 cm$^2$ in area) using a spreader, and the NMP was evaporated off at about 90° C. in air. Once the sample cathode stock was dried, it was compressed between flat plates at about 25 bar pressure. These electrodes were then weighed and the weight of the foil, the PVDF, and the carbon black were subtracted to obtain the active electrode mass. Typical electrodes were 100 micrometers thick and had an active mass of 15 mg.

After construction, the coin cell batteries were removed from the glove box, thermostatted at 30±1° C., and then charged and discharged using constant current cyclers with ±1% current stability. Data was logged whenever the cell voltage changed by more than 0.005 V. Unless otherwise indicated, currents were adjusted to be 18.5 mA/g of active material for the initial two cycles of the battery. Much of the discharge capacity of the example carbons is very close to the potential of lithium metal. Thus, special testing methods were required to determine the full reversible capacity. Coin cell batteries were therefore discharged at constant current for a fixed time, the time being chosen such that the battery voltage would fall below zero volts (versus Li) and such that lithium plating on the carbon electrode would occur. Note that the plating of lithium does not occur immediately after the battery voltage goes below zero volts due to the overvoltage caused by the finite constant current used. However, plating does begin shortly thereafter (usually around −0.02V) and is characterized by a region where the voltage of the battery rises slightly once plating is initiated followed by a constant or nearly constant voltage region. The onset of lithium plating is clearly and easily determined as shown in the following examples. The plating of lithium on the carbon electrode was continued for a few hours and then the current was reversed. First, the plated lithium is stripped, and then inserted lithium is removed from the carbon. The two processes are easily distinguished provided that the charge rates are small (ie. less than 37 mA/g of active material). The reversible capacity was calculated as being the average of the second discharge and second charge capacities of the battery, excluding lithium plating and stripping. The first discharge capacity was not used for this calculation because irreversible processes occur on the first discharge.

Illustrative Examples re prior art

Prior art Example 1.

Several samples were made by preparing a thermoset polymer from furfuryl alcohol in the presence of either phosphoric, oxalic, or boric acid followed by pyrolysis at various temperatures up to 1100° C. according to the methods of the aforementioned A. Omaru reference. R values for all these samples were determined as mentioned above and the results are listed in Table 1.

TABLE 1

Data for the samples of Prior Art Example 1.

| Precursor | Polymerizing Acid | Pyrolysis temperature (° C.) | R |
| --- | --- | --- | --- |
| Polyfurfuryl Alcohol | Phosphoric | 600 | 2.30 |
| Polyfurfuryl Alcohol | Phosphoric | 1100 | 2.45 |
| Polyfurfuryl Alcohol | Oxalic | 900 | 2.56 |
| Polyfurfuryl Alcohol | Phosphoric | 1000 | 2.74 |
| Polyfurfuryl Alcohol | Boric | 900 | 4.9 |

The high capacity, hard carbon samples of the prior art appear to have R values that exceed 2.2.

Prior art Example 2

Figure 4:
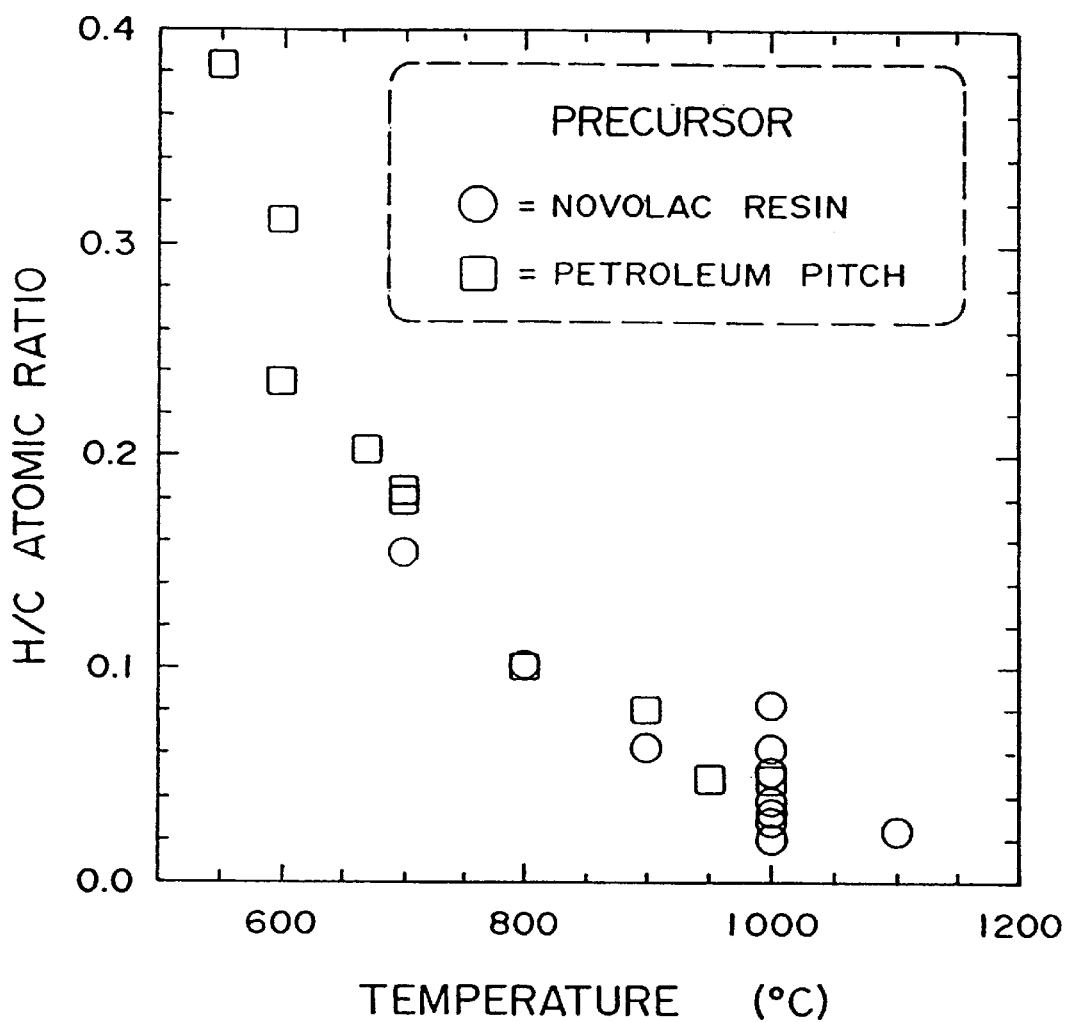
FIG. 4 shows the H/C atomic ratio versus pyrolysis temperature for the samples of Prior Art Example 2 and of Epoxy Example 1.
Figure 5:
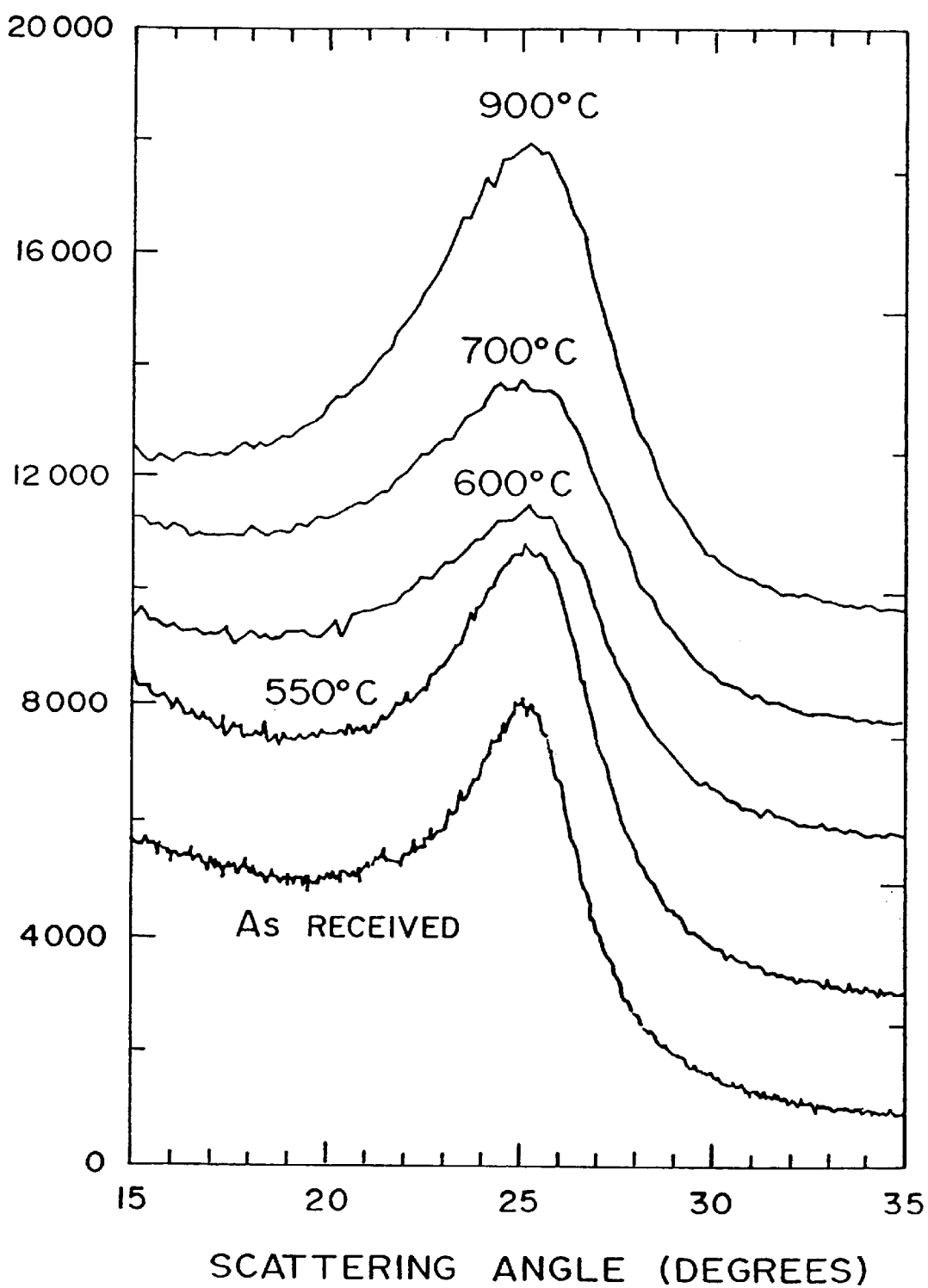
FIG. 5 shows the x-ray diffraction patterns in the vicinity of the {002} peak for some of the samples of Prior Art Example 2. The patterns have been offset vertically by 2000 counts for clarity.

KSRAW grade (trademark) petroleum pitch was obtained from Kureha Company of Japan in order to replicate the prior art material of Mabuchi et al. A series of soft carbon samples was made by pyrolysing said pitch at temperatures between 550° C. and 950° C. The H/C atomic ratios for this series was determined as mentioned above and are shown in FIG. 4 (also shown are H/C ratios for Inventive Example samples derived from epoxy precursors to follow). The x-ray diffraction pattern in the vicinity of the {002} peak is shown in FIG. 5 for some of these samples along with the pattern of the precursor itself. (Note that the patterns have been offset vertically by 2000 counts for clarity.) R values and H/C data for this series are presented in Table 2. None of the samples have both R<2.2 and H/C<0.1.

TABLE 2

Data for the samples of Prior Art Example 2.

| Pyrolysis Temperature (° C.) | H/C | R |
| --- | --- | --- |
| 550 | 0.38 | 2.67 |
| 600 | 0.235 | 2.14 |
| 700 | 0.183 | 2.33 |
| 900 | 0.080 | 3.33 |

Figure 6A:
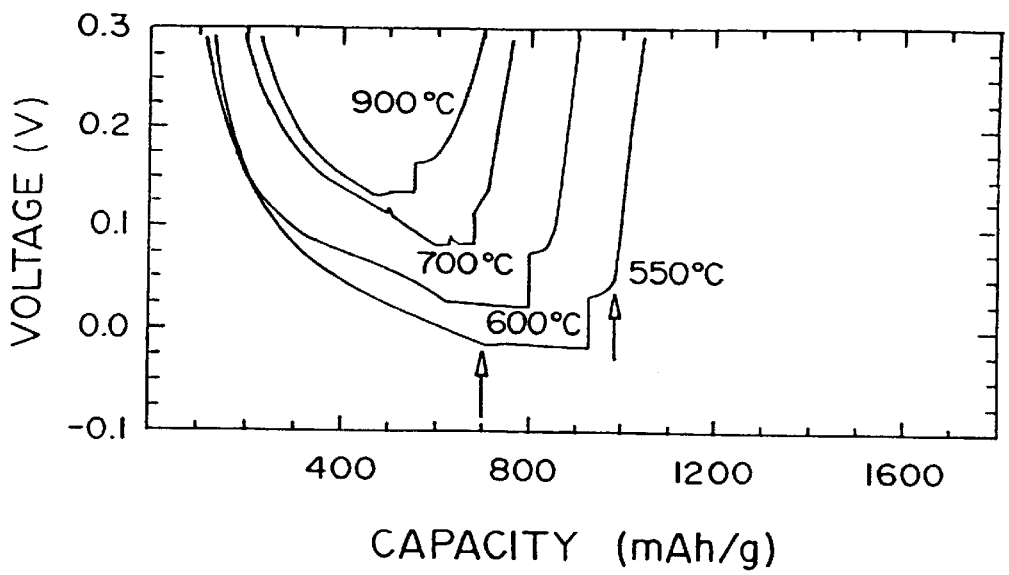
FIGS. 6a and 6b show the voltage versus capacity plots for some of the batteries of Prior Art Example 2.
Figure 6B:
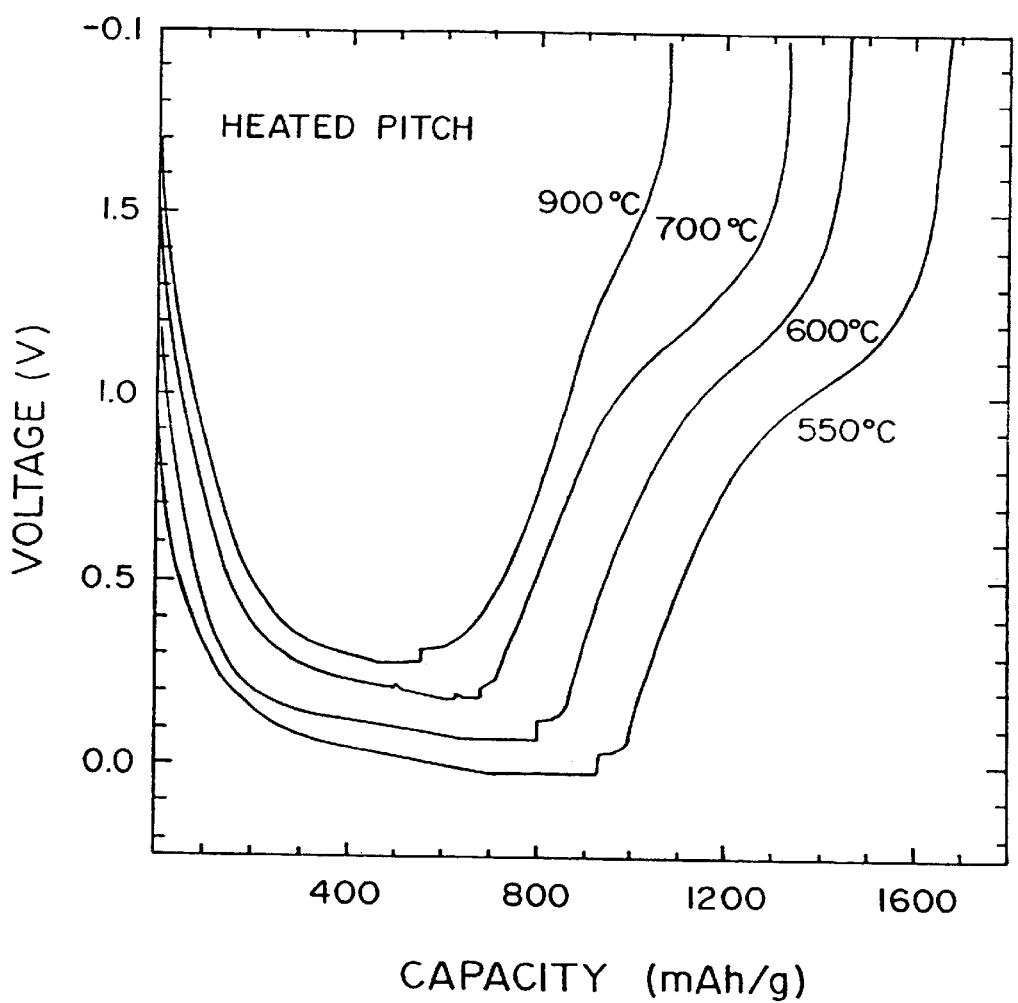

Laboratory coin cell batteries were prepared using some of these samples as described previously. FIG. 6b shows the voltage versus capacity plot for the second cycle of these batteries. (The plots have been shifted upwards sequentially by 0.05 V for clarity in FIG. 6b.) FIG. 6a shows an expanded version of FIG. 6b near 0 volts to better indicate the onset of lithium plating and completion of lithium stripping (indicated by arrows for the 550° C. data) during cycling. (The data have been shifted upwards sequentially by 0.1 V for clarity in FIG. 6a.)

Each of the samples pyrolyzed at 700° C. or less show a maximum specific capacity (calculated as described previously) of about 650 mAh/g. Samples pyrolyzed above 700° C. had significantly less capacity (down to about 400 mAh/g for the sample pyrolyzed at 900° C.). Substantial hysteresis in the voltage plots can be seen, especially for samples pyrolyzed at the lower temperatures.

The very high capacity carbon samples of the prior art appear to lose their very high capacity characteristics when pyrolyzed at temperatures above about 700° C. There seems to be a correlation between larger specific capacity and larger H/C ratio for these samples.

Illustrative Example re activated carbons

Figure 7:
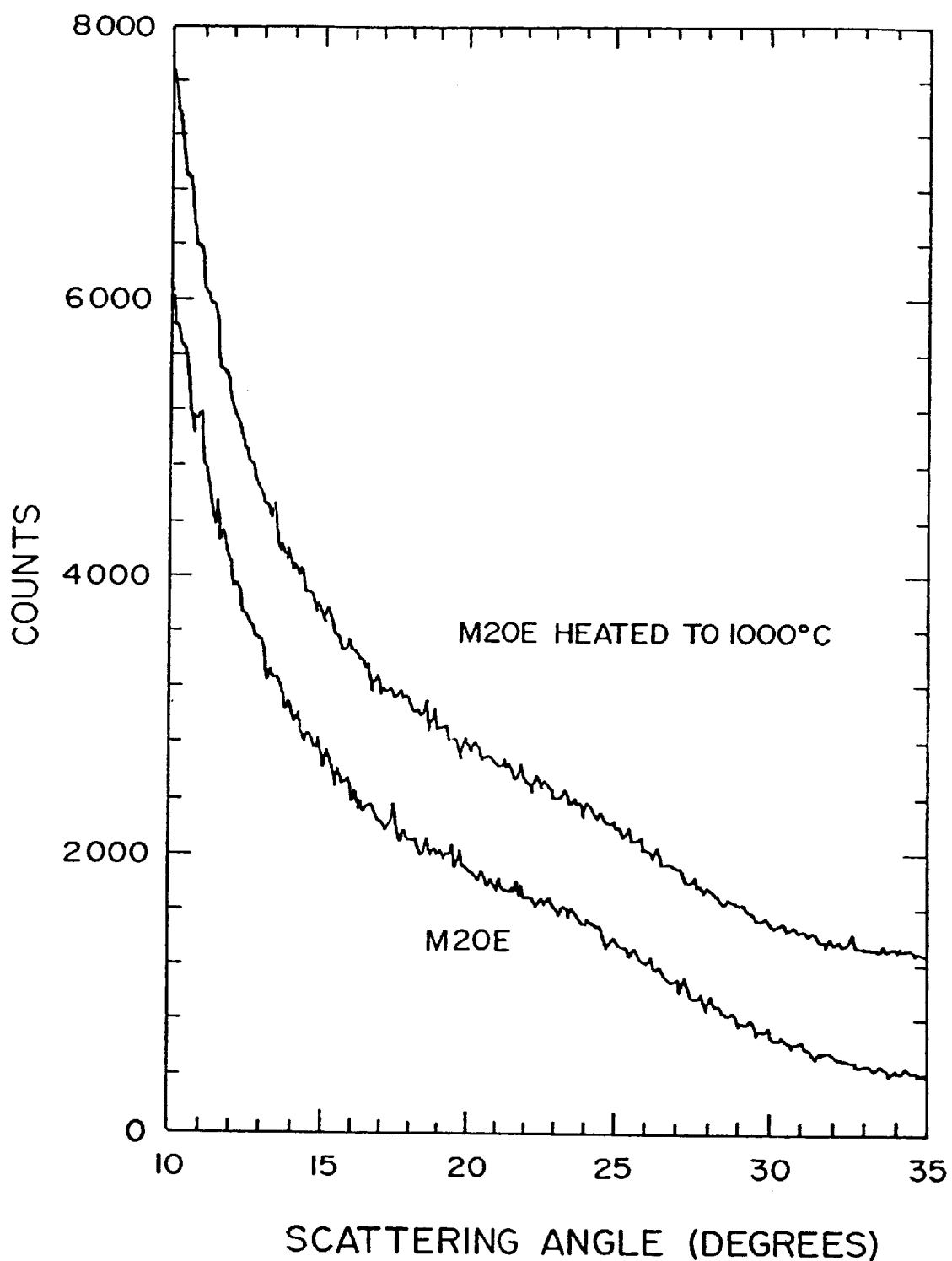
FIG. 7 shows the x-ray diffraction patterns in the vicinity of the {002} peak for the M20E activated carbon samples of the Illustrative Example re activated carbons.

M20E and M30 (trademarks) grade activated carbons were obtained from Spectracorp, Mass., U.S.A. Some of each activated carbon sample was analyzed as is and some was pyrolyzed at 1000° C. prior to analysis. Additionally, polyvinylidene fluoride (PVDF, obtained from Aldrich Chemical company, U.S.A.) was pyrolyzed at 1000° C. R, H/C, CHN, and specific capacity values were obtained as described in the preceding for each of these samples. For each activated carbon sample, R was about 1.1 and the H/C atomic ratio was very small (<0.03). FIG. 7 shows the x-ray diffraction pattern in the vicinity of the {002} peak for the M20 E sample as received and after pyrolysis to 1000° C. For the pyrolyzed PVDF sample, R was about 1.3 and the H/C atomic ratio was 0.053.

The conventional BET surface areas for all these samples are relatively high (>100 m²/g). Also, the adsorption capacity for MB is also relatively high. For M20E and M30 activated carbons as supplied, the MB adsorption capacity exceeded 400 micromoles/g. (It was deemed to be unnecessary to continue the titration.) The pyrolyzed PVDF carbon sample adsorbed about 200 micromoles of MB per gram.

Figure 8A:
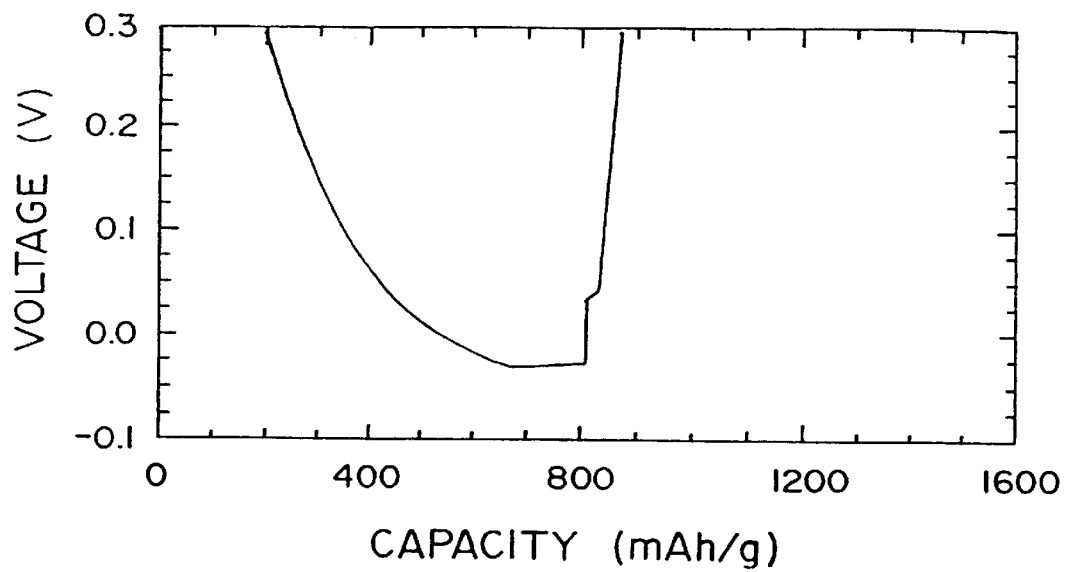
FIGS. 8a and 8b show the second cycle voltage verses capacity plot for the battery containing M30 activated carbon pyrolyzed at 1000° C of the Illustrative Example re activated carbons.
Figure 8B:
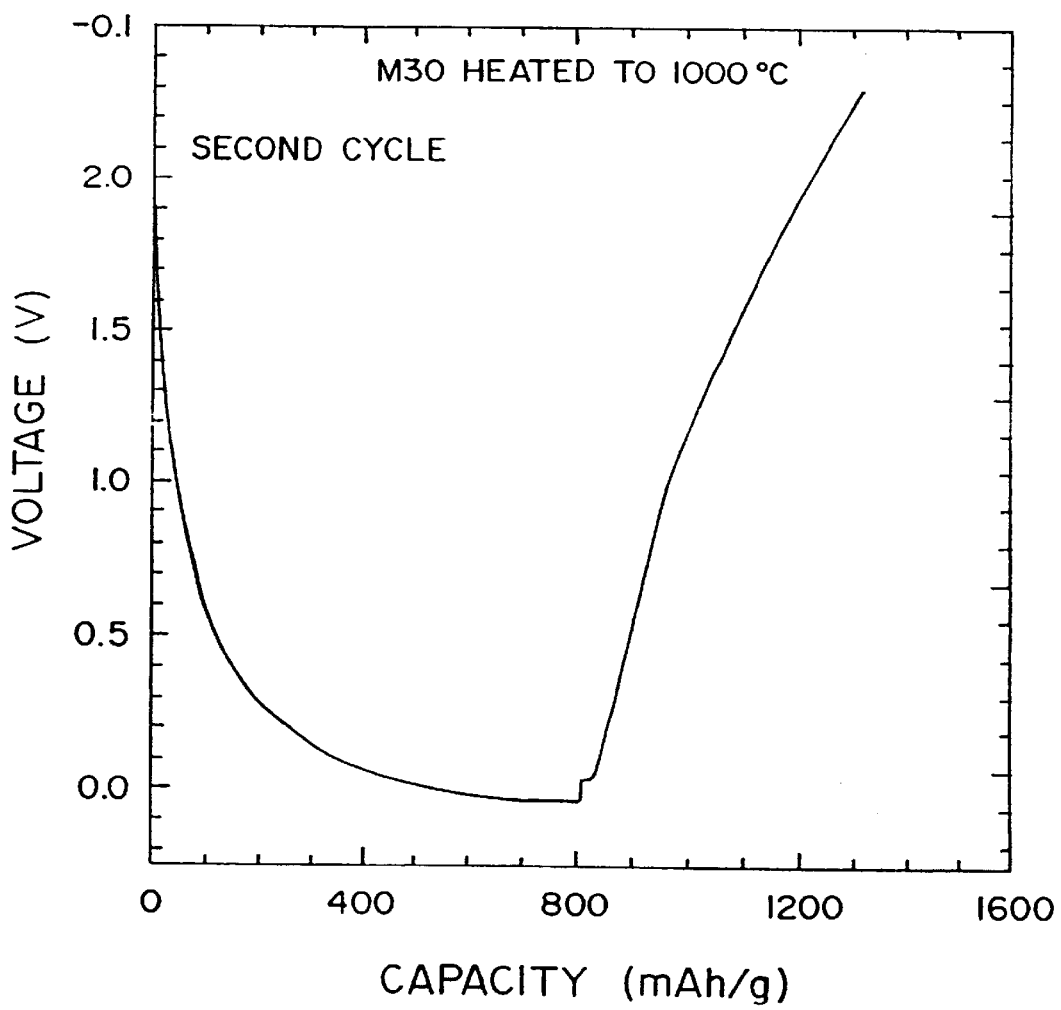
Figure 9A:
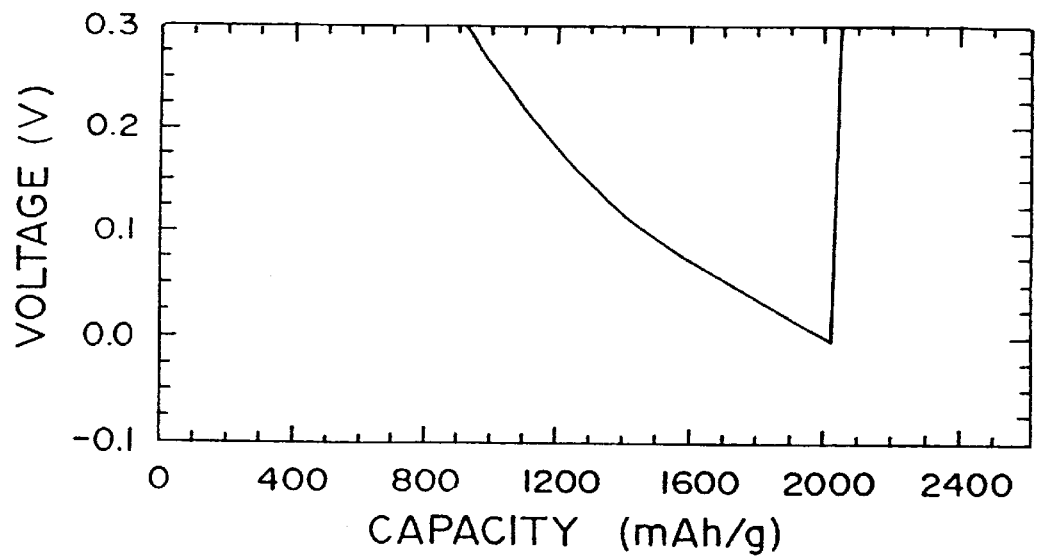
FIGS. 9a and 9b show the first cycle voltage versus capacity plot for the battery containing M30 activated carbon pyrolyzed at 1000° C of the Illustrative Example re activated carbons.
Figure 9B:
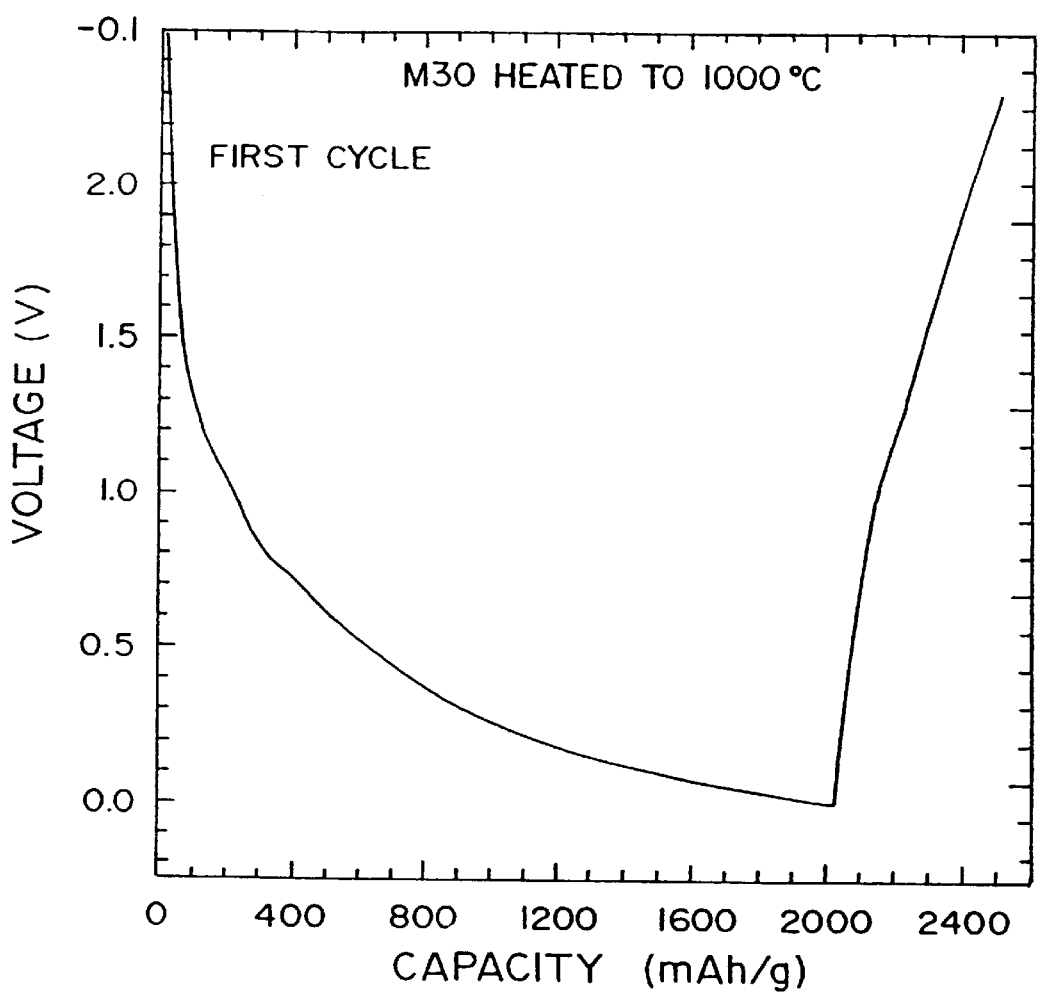

All samples exhibited high specific capacities but also substantial hysteresis in the voltage plot and substantial irreversible capacity on the first discharge. For example, FIGS. 8a and 8b show the second cycle voltage versus capacity plot for the battery containing M30 activated carbon pyrolyzed at 1000° C. The specific capacity is about 550 mAh/g and there is substantial hyteresis. FIGS. 9a and 9b show the first cycle voltage verses capacity plot for the same battery containing M30 activated carbon pyrolyzed at 1000° C. The first discharge capacity is enormous at about 2000 mAh/g and thus there is substantial irreversible capacity.

This example shows that some hard carbons, derived from precursors other than those of the invention, when pyrolyzed at temperatures above 700° C. can have R<2.2 and H/C<0.1 and yet not provide the low hysteresis and irreversible capacity advantages of the invention. Such hard carbons have high BET surface areas and also have relatively high adsorption capacities for MB (>>4 micromoles/g carbon).

Inventive Examples

Epoxy Precursors:

Epoxy Example 1

A series of samples was prepared using Dow 438 (trademark of Dow Chemical Co., U.S.A.) epoxy novolac resin as a precursor. The resin was usually mixed with different amounts of phthallic anhydride hardener which was cured at about 120° C. to a hard plastic state prior to pyrolysis. Pyrolysis was performed at temperatures varying from 700° C. to 1100° C. Afterwards, R, H/C, CHN, and specific capacity values were obtained for most samples in the series as described in the preceding. Currents were adjusted to be either 7.4 mA/g, 18.5 mA/g, or 37 mA/g of active material, depending on the desired test. Conventional BET and MB adsorption capacities were also obtained for some representative samples in the series. A summary of samples prepared with these corresponding values is shown in Table 3.

Furthermore, high specific capacity is maintained in samples no. III and V at pyrolysis temperatures of 900° C. to 1000° C., unlike that of the pyrolyzed pitch of Prior Art Example 2.

Figure 13A:
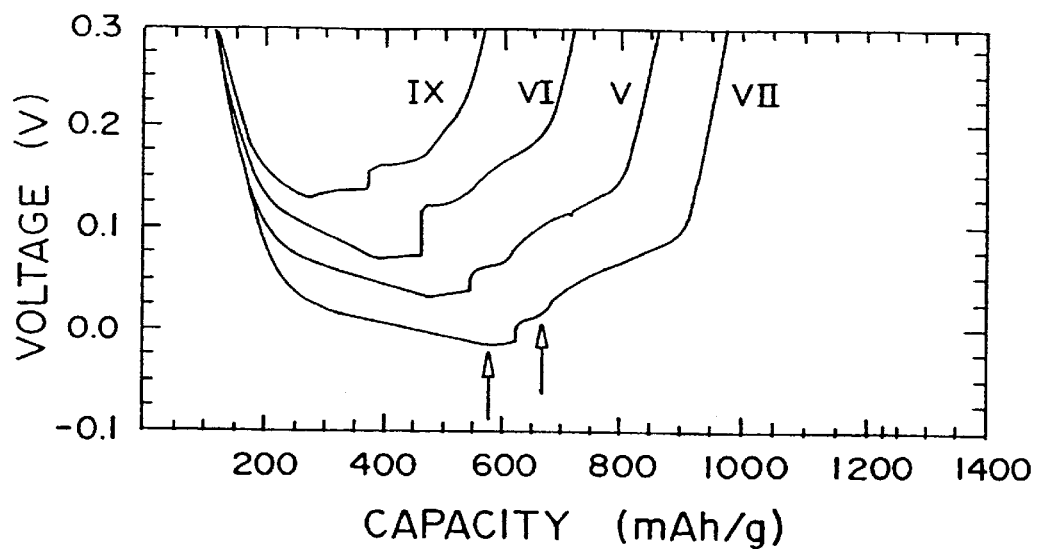
FIGS. 13a and 13b show the voltage versus capacity plots of samples V, VI, VII, and IX of Epoxy Example 1 and illustrates the relation between R and specific capacity for samples pyrolyzed at 1000° C. to 1100° C.
Figure 13B:
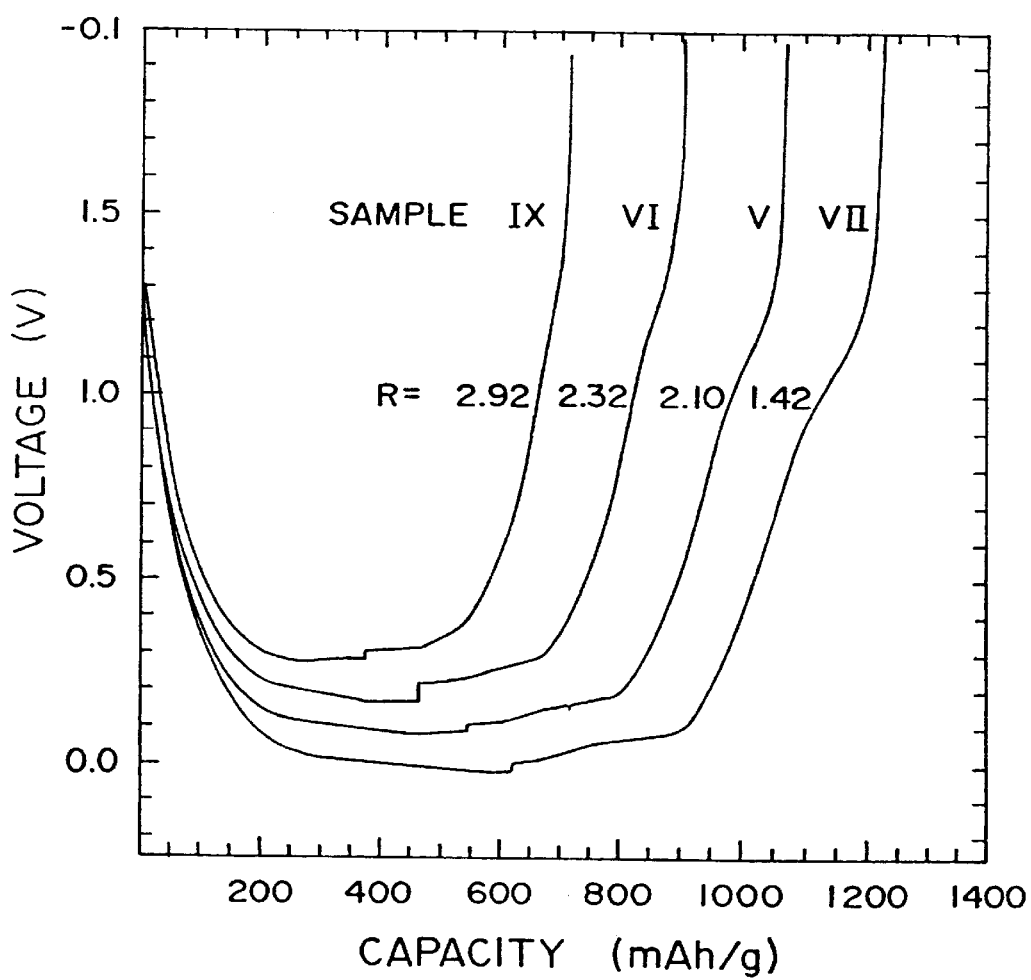
Figure 14:
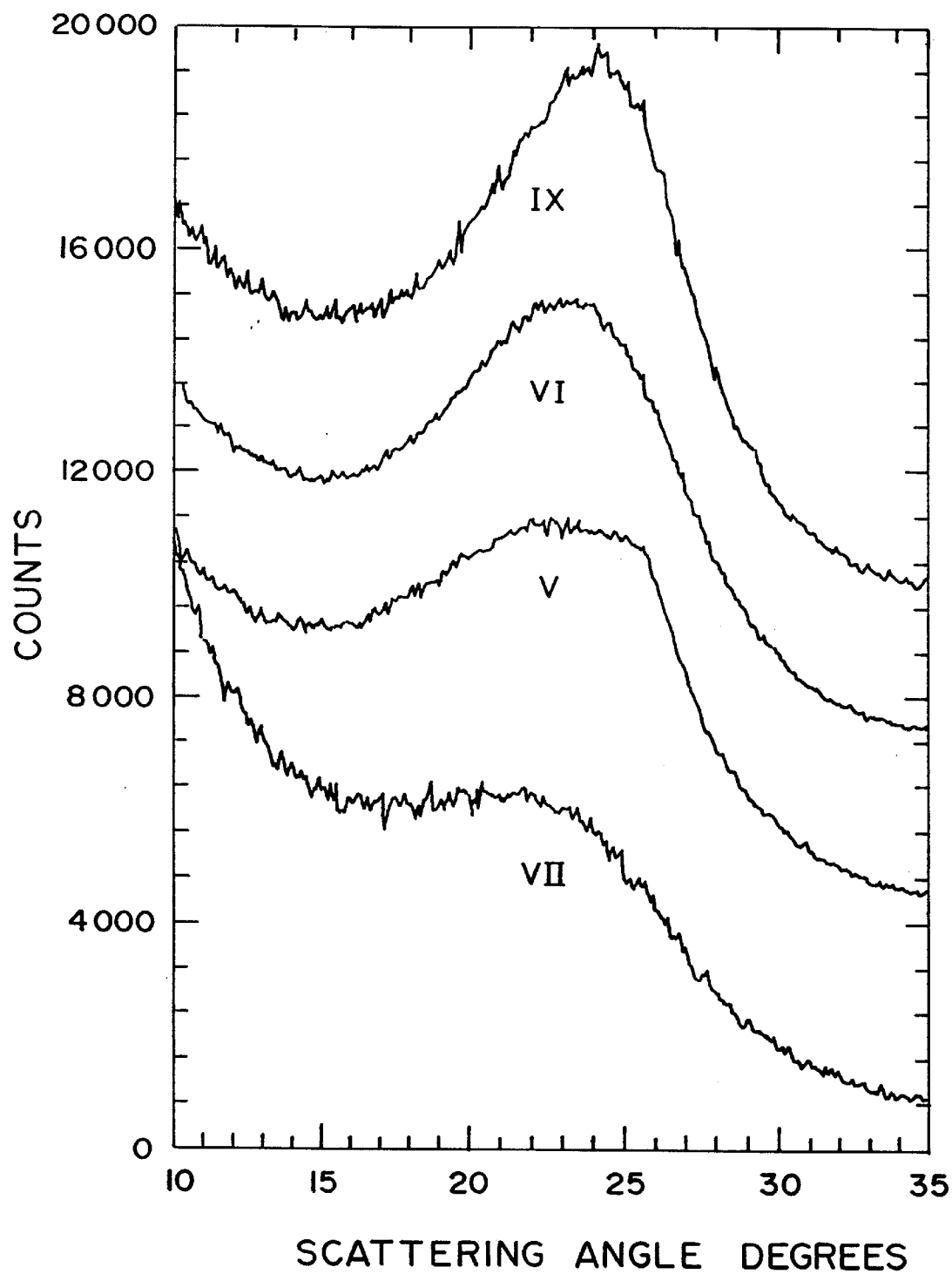
FIG. 14 shows the x-ray diffraction pattern in the vicinity of the {002} peak for the samples of FIGS. 13a and b. The patterns have been offset vertically by 3000 counts for clarity.
Figure 15:
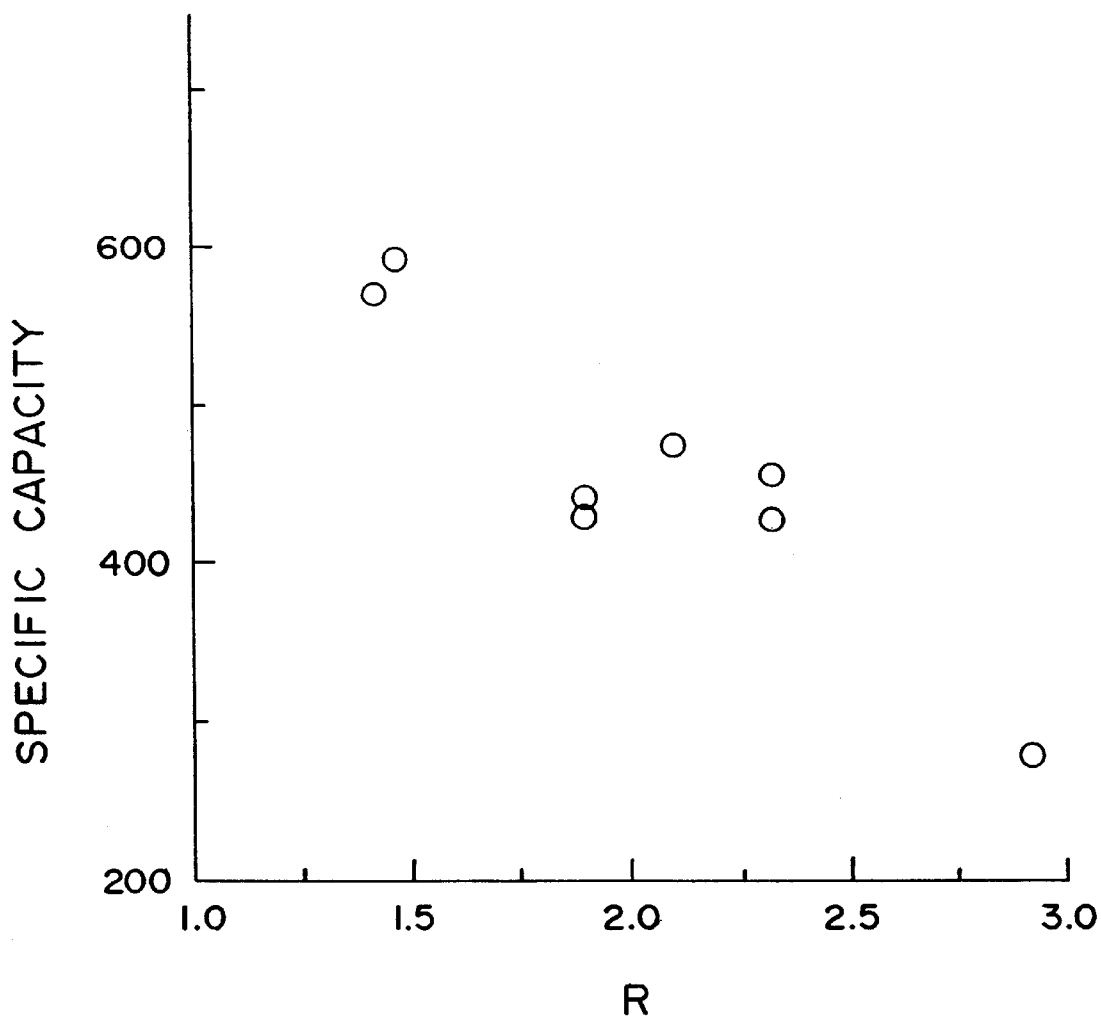
FIG. 15 shows a summary plot of specific capacity versus R for sample nos. III to IX inclusive of Epoxy Example 1.

FIGS. 13a and b show the voltage versus capacity plots for samples no. V, VI, VII, and IX (plots are offset by 0.05 and 0.1 volts in FIGS. a and b respectively). These Figures also illustrate the relation between R and specific capacity for samples pyrolyzed at 1000° C. to 1100° C. As R increases, the specific capacity decreases. FIG. 14 shows the x-ray diffraction patterns in the vicinity of the {002} peak for the samples of FIGS. 13a and b. (The patterns have been offset upwards sequentially by 3000 counts for clarity.) FIG. 15 is provided to show a summary plot of specific capacity versus R for samples III to IX inclusive which were all pyrolyzed between 900° C. and 1100° C. The samples therein all exhibited voltage curves with little hysteresis and all had H/C<0.1. Again, as R increases, the specific capacity decreases.

Figure 16A:
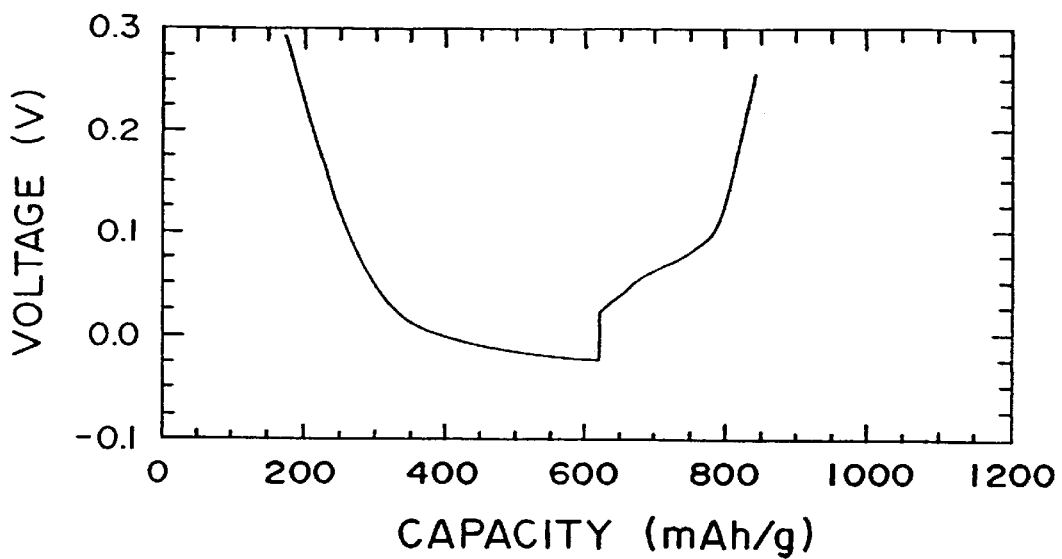
FIGS. 16a and 16b show the voltage versus capacity plot of the first discharge and charge of the battery comprising sample no. VII of Epozy Example 1.
Figure 16B:
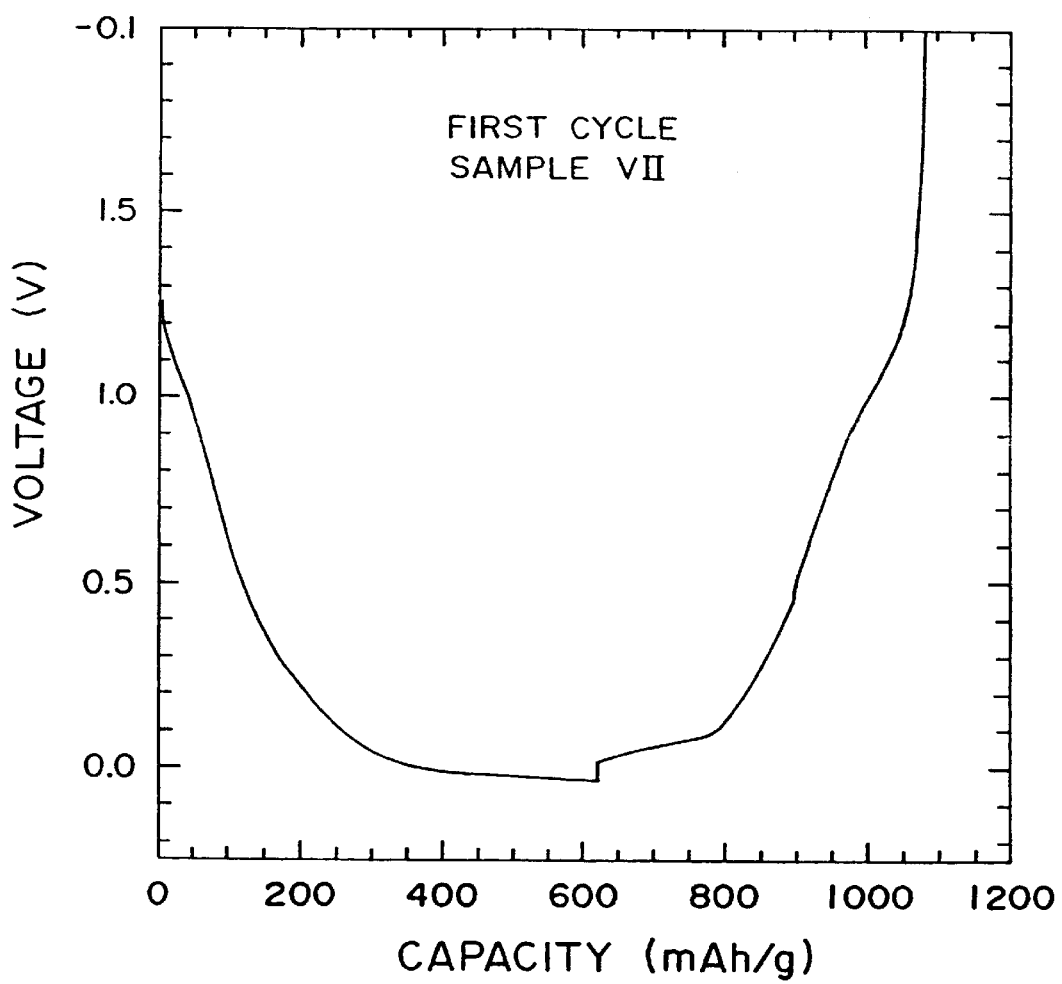

FIGS. 16a and 16b show the first discharge and charge of the laboratory coin cell battery employing sample no VII. The battery shows a first discharge capacity of about 625 mAh/g and the first recharge capacity of about 465mAh/g. The irreversible capacity of sample VII is therefore only about 160 mAh/g, which is considered to be in an acceptable range for practical lithium ion batteries. The surface area

TABLE 3

Data for the samples of Epoxy Example 1

| No. | Heating Rate (° C./min) | Pyrolysis Temperature (° C.) | Weight % hardener | Weight % C | Weight % H | Weight % N | H/C | BET ($m^2$/g) | MB ($\mu$moles per g) | R | Specific Capacity (mAh/g) |
|---|---|---|---|---|---|---|---|---|---|---|---|
| I | 20 | 700 | 23 | 93.3 | 1.3 | <0.1 | 0.17 | NA | NA | 1.39 | 650 |
| II | 20 | 800 | 23 | 91.7 | 0.85 | <0.1 | 0.11 | NA | <4 | 1.43 | 610 |
| III | 20 | 900 | 23 | 93.4 | 0.52 | <0.1 | 0.067 | NA | NA | 1.47 | 590 |
| IV | 20 | 1000 | 23 | 95.2 | 0.50 | 0.2 | 0.063 | NA | NA | 1.59 | NA |
| V | 1 | 1000 | 0 | 95.4 | 0.26 | 0.5 | 0.033 | >152 | <4 | 2.10 | 475 |
| VI | 1 | 1000 | 15 | 95.4 | 0.69 | 0.5 | 0.087 | NA | NA | 2.32 | 455, 430 |
| VII | 10 | 1000 | 38 | 93.1 | 0.23 | 0.6 | 0.030 | >217 | <4 | 1.42 | 570 |
| VIII | 1 | 1000 | 15 | 95.8 | 0.41 | 0.4 | 0.051 | NA | <4 | 1.90 | 430, 440 |
| IX | 5 | 1100 | 15 | 97.3 | 0.20 | 0.2 | 0.025 | NA | NA | 2.92 | 280 |

(If two batteries were tested for specific capacity, both values are given.)

Figure 10A:
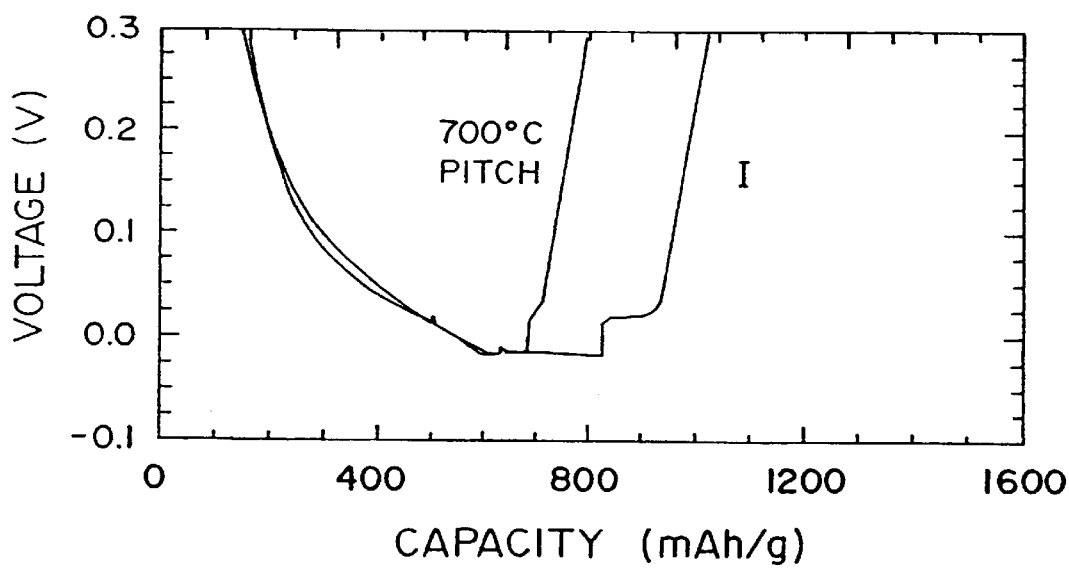
FIGS. 10a and 10b compare the second cycle voltage capacity plots of sample no. I Epoxy Example 1 to that of the 700° C pyrolyzed sample of Prior Art Example 2.
Figure 10B:
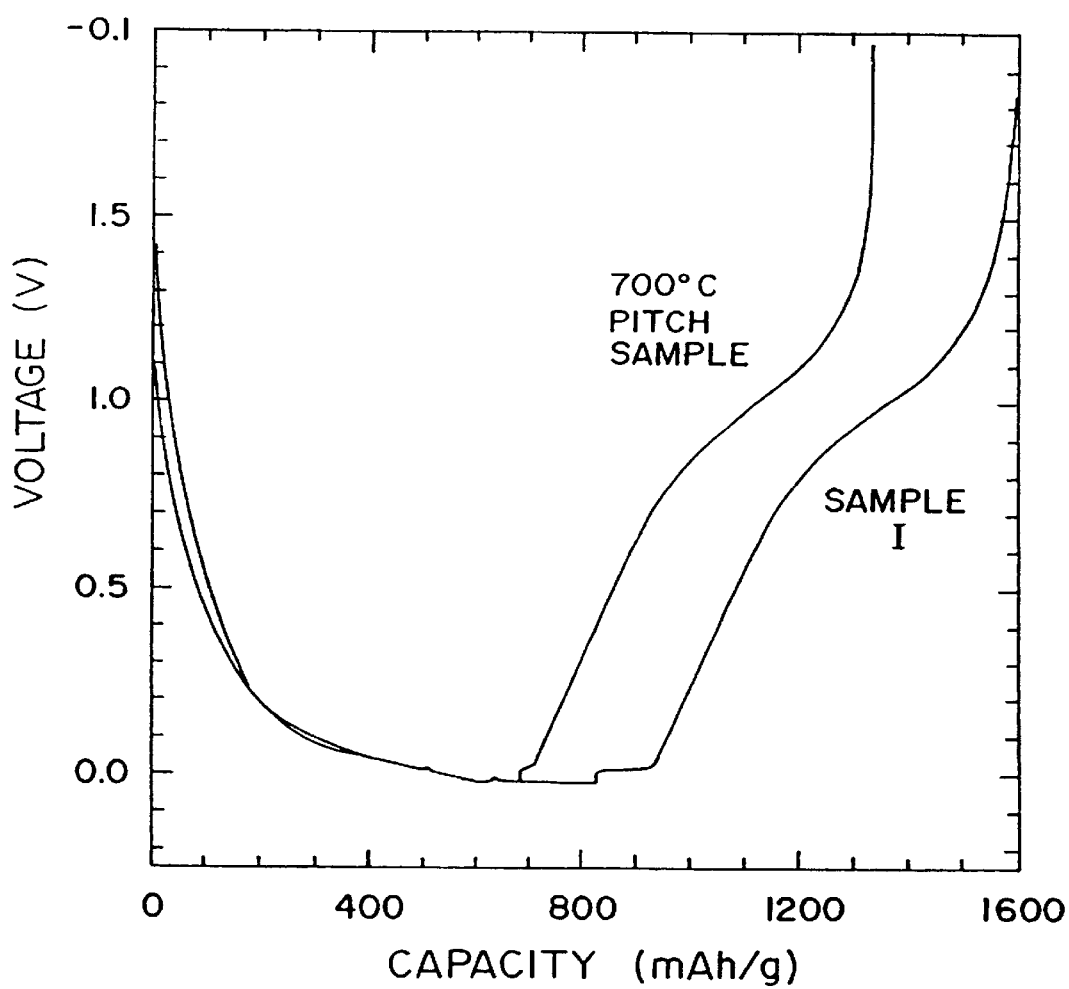

The voltage versus capacity plots for sample no. I pyrolyzed at 700° C is compared to that of the pitch sample of Prior Art Example 2 pyrolyzed at the same temperature in FIGS. 10a and 10b. These two plots show almost identical behaviour (although the battery using sample no. I was allowed to plate more lithium. FIG. 4 indicates that the two samples in FIGS. 10a and 10b have almost the same H/C ratio. FIG. 11 shows the x-ray diffraction patterns of samples no. I, II, and III (offset by 1600 counts). Therein, it can be seen that sample no. I has a substantially smaller R than the corresponding pitch sample in FIG. 5. There are very few stacked graphene layers in sample no. I as evidenced by the {002} peak amounting to only a shoulder on the low angle background. FIGS. 11 and 5 also show that these structural differences persist at highter pyrolysis temperatures.

Figure 12A:
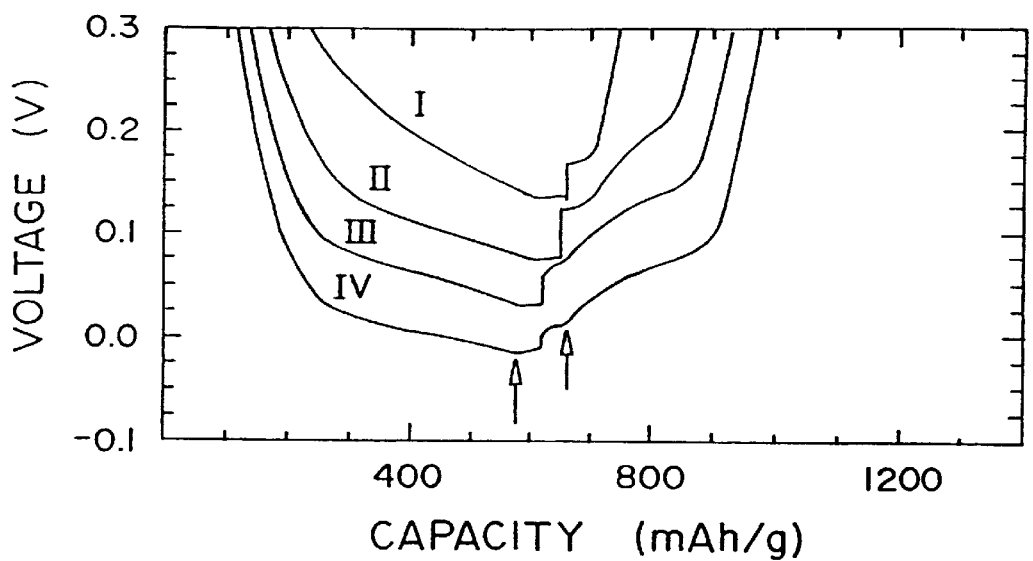
FIGS. 12a and 12b show the voltage versus capacity plots of samples I, II, III, and IV of Epoxy Example 1.
Figure 12B:
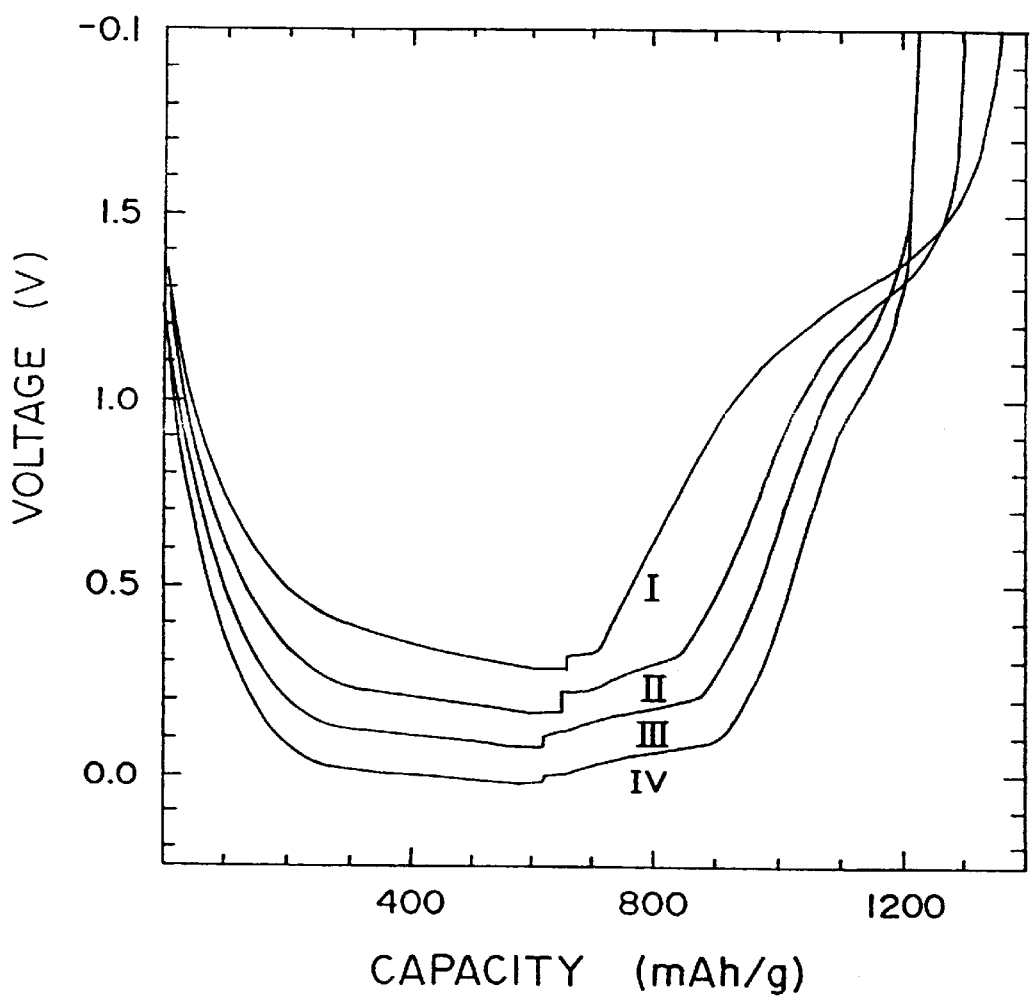

FIGS. 12a and b show the voltage versus capacity plots for samples no. I, II, III, and V (plots are offset by 0.05 and 0.1 volts in FIGS. a and b respectively). These samples all have R<2.2. Sample I shows considerable hysteresis in the voltage plot. At higher pyrolysis temperatures, the capacity available near 1.0 V during the charge of sample no. I is shifted down to near 0 V, so that around 900° C. to 1000° C. reversible cycling with little hysteresis is obtained.

measured by the conventional BET method for sample VII was 217 $m^2$/g. If this area were all accessible to electrolyte, such low values for the irreversible capacity would not be expected (for example, based on the disclosure of U.S. Pat. No. 5,028,500). However, the MB adsorption capacity is relatively low (<5 micromoles/g) for this and the other invention samples tested.

Insertion compounds of the invention can therefore have very high specific capacity coupled with acceptable associated hysteresis in voltage and acceptable associated irreversible capacity.

Epoxy Example 2

A sample was prepared using Dow D.E.R. 667 (trademark of Dow Chemical Co., U.S.A.) bisphenol A type epoxy resin as a precursor. No hardener was used in this preparation. Pyrolysis was performed by heating first at 250° C. for 2 hours followed by ramping at 30° C./min to 800° C. and thereafter holding for 2 hours. R for this sample was about 1.52. Laboratory coin cell batteries were then prepared and specific capacity values were obtained.

Figure 17A:
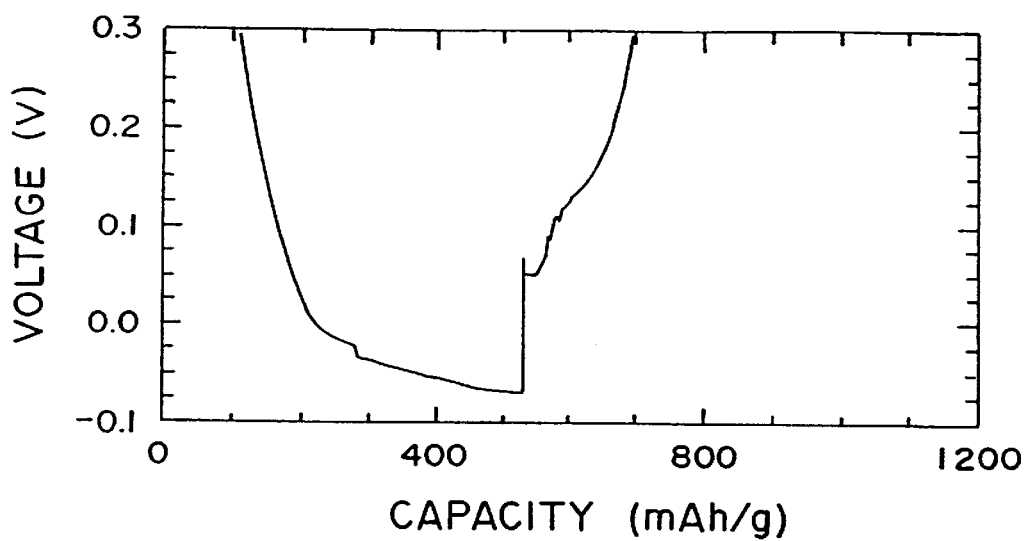
FIGS. 17a and 17b show the voltage versus capacity plots of a battery of Epoxy Example 2.
Figure 17B:
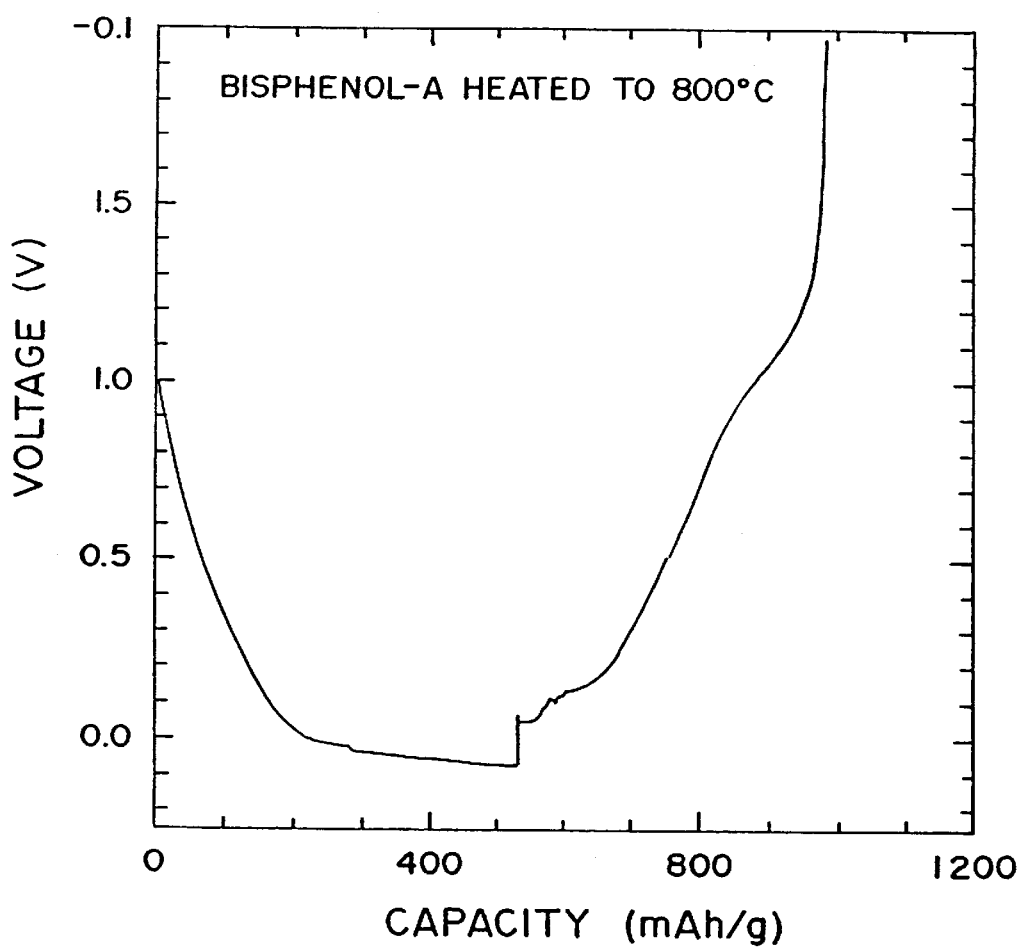

The voltage versus capacity plot for one of these atteries is shown in FIGS. 17a and b (plots are offset by 0.05 and 0.1 volts in FIGS. a and b respectively). Therein, the specific capacity was 410 mAh/g. The irreversible capacity is only about 160 mAh/g and the hysteresis in the voltage is considered acceptable.

It thus appears possible to make insertion compounds of the invention using bisphenol A type epoxy resin.

Phenolic Resin Precursors:

Phenolic Resin Example 1

A series of samples was prepared using three different phenolic resins as a precursor. Two are base-catalysed or resole types and one is an acid catalyzed or novolac type. The three different precursors used were:

A) resole type, product #11760 of Plenco, Plastics Engineering Company, Sheboygan, Wis., 53082-0758 U.S.A.;

B) resole type, product #29217 of Oxychem, Occidental Chemical Corp, Durez Engineering Materials, 5005 LBJ freeway, Dallas, Tex. 75244, U.S.A.; and C) novolac type, product #12116 of Plenco, supra.

The phenolic resin precursors were all supplied in powder form. In each case, the powder was cured at from about 150° C. to 160° C. for 30 minutes prior to pyrolysis. At the end of the curing step, a solid lump was obtained. The lump was next reduced to powder in an autogrinder. The powdered cured resin was then pyrolyzed in a tube furnace under flowing argon. The samples were ramped from room temperature to the desired pyrolysis temperature over 3 hours and held there for 1 hour. The furnace power was then turned off and the samples were cooled to near room temperature within the furnace tube under flowing argon. Cooling took several hours.

Pyrolysis was performed at temperatures varying from 700° C. to 1100° C. Afterwards, the samples were ground into a powder. R, H/C (by CHN analysis), and specific capacity values (by coin cell battery tests) were obtained for most samples in the series as described in the preceding. The MB adsorption capacity was also obtained for sample B1ooo and was found to be about 1.6 micromoles per gram of host. Yield was determined from the weights of the samples before and after pyrolysis. The results of these measurements is given in Table 4. (Two batteries of each sample were made and the results from each experiment were within 20 mAh/g. The values given in Table 4 represent the average values obtained.)

Figure 18A:
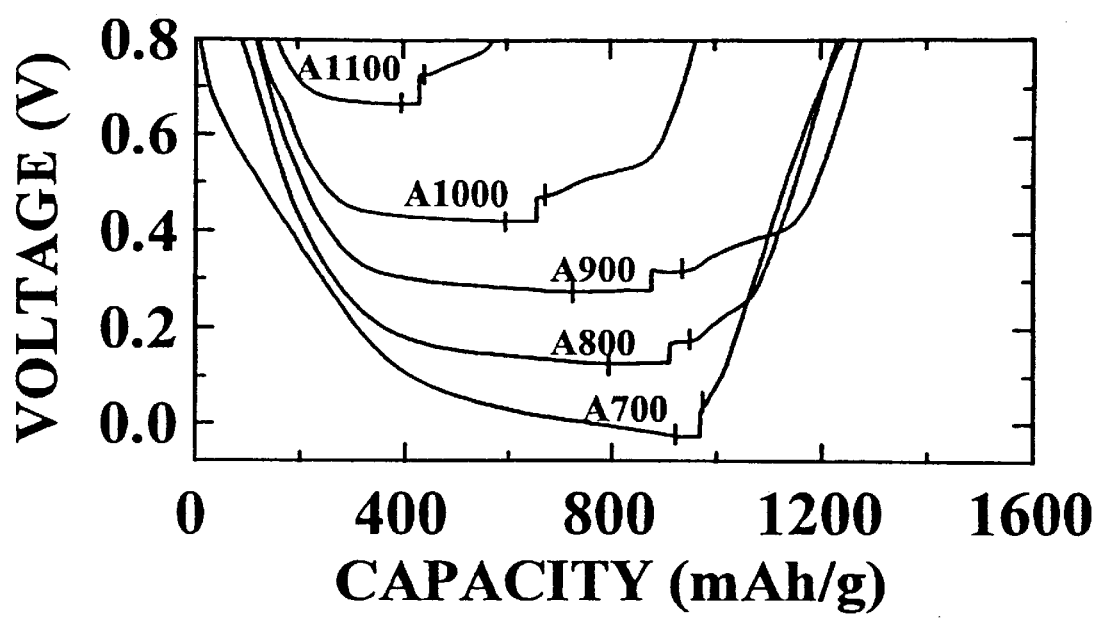
FIGS. 18a, 18b and 18c show the voltage versus capacity plots for the first and second cycles respectively for batteries comprising samples prepared from the A type precursor in Phenolin Resin Example 1. The curves have been offset sequentially for clarity. (In the Figures, the shifts are 0.0, 0.15, 0.3, 0.45, and 0.7 volts for samples A700, A800, A900, A1000, and A1100 respectively.)
Figure 18B:
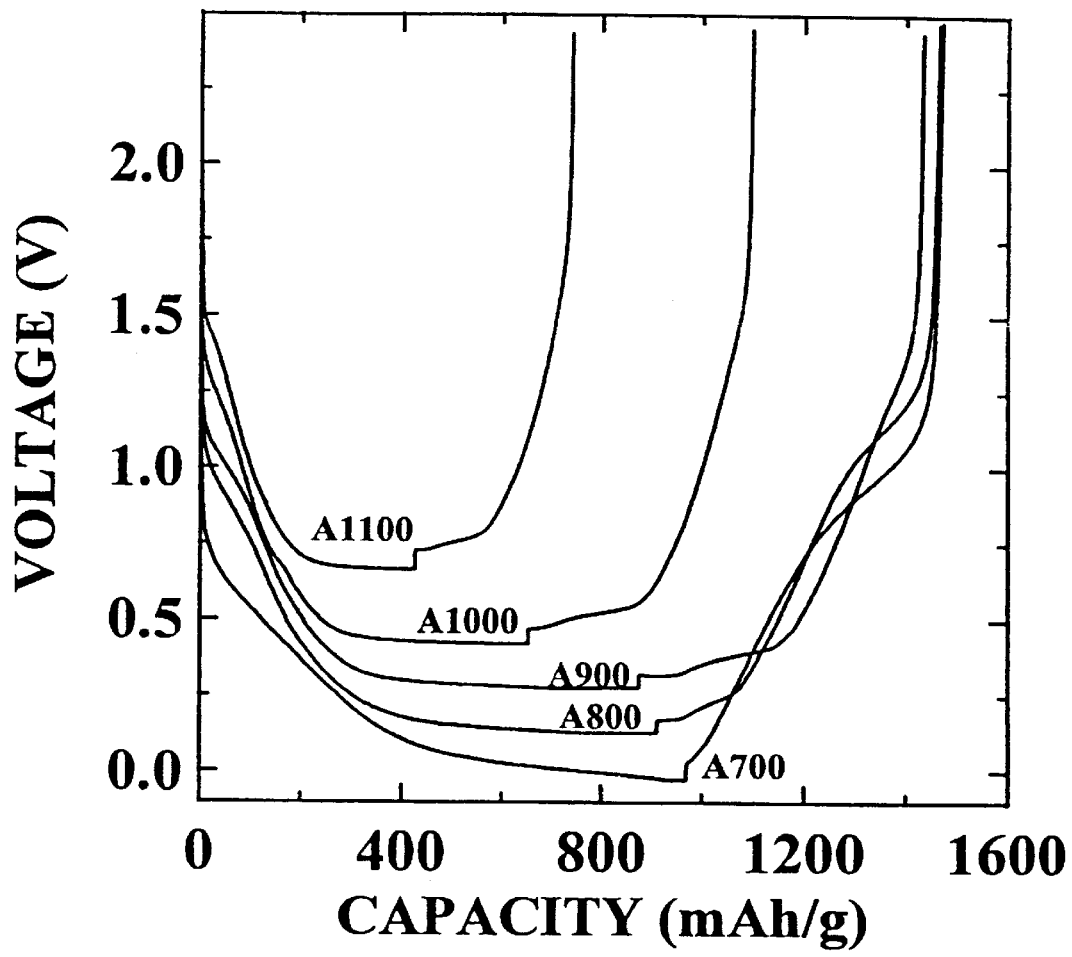
Figure 18C:
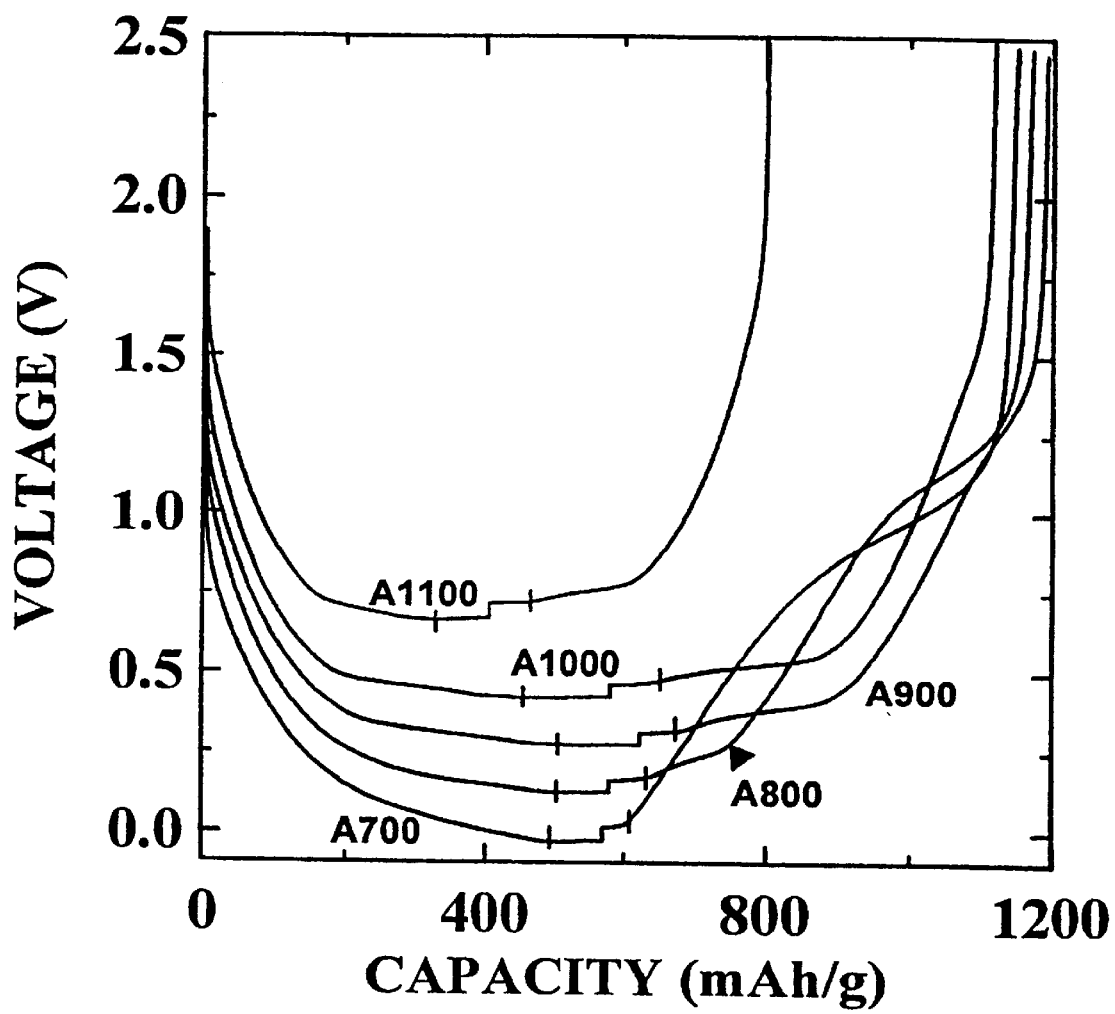

FIGS. 18a and 18b show the first discharge-charge cycle for the series of pyrolyzed A type precursors. The samples heated at 700° C and 800° C show significant hysteresis in the voltage profile (Li is inserted near 0V but is removed near 1.0V). This has been ascribed to the large hydrogen content in the samples. Upon heating to 900° C, the hysteresis is predominantly eliminated and the samples show substantial capacity at low voltage. 18c shows the second cycle of the same series. The vertical lines indicate the onset of lithium plating during discharge. The batteries prepared from material heated to 900° C and 1000° C appear most promising for this series. Their reversible capacities are about 510 and 450 mAh/g respectively.

Figure 19A:
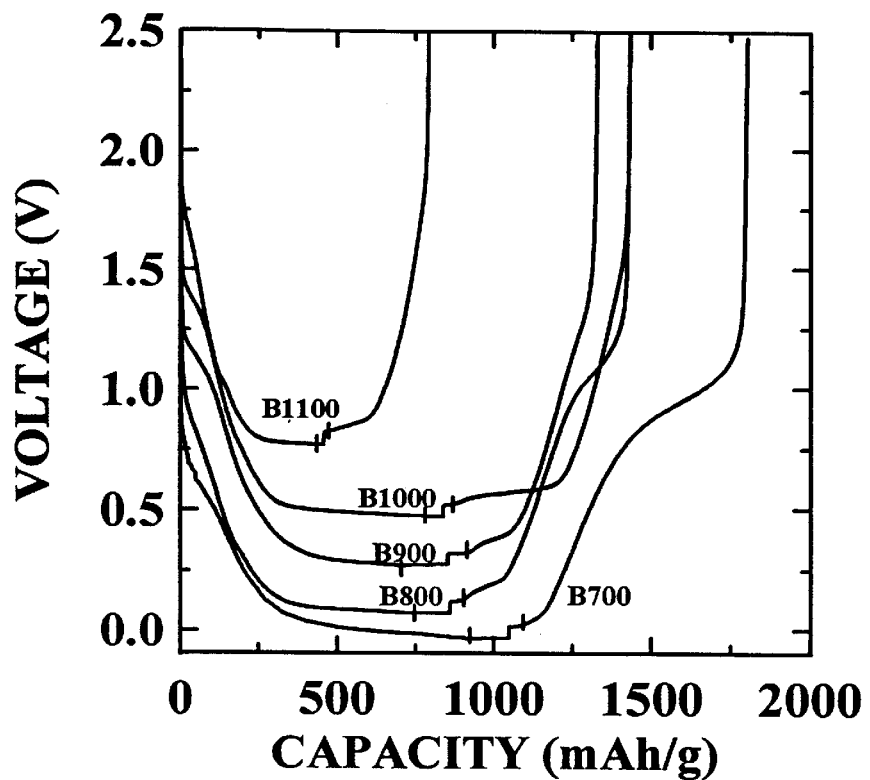
FIGS. 19a and 19b show the voltage versus capacity plots for the first and second cycles respectively for batteries comprising samples prepared from the B type precursor in Phenolic Resin Example 1. The curves have been offset sequentially for clarity.
Figure 19B:
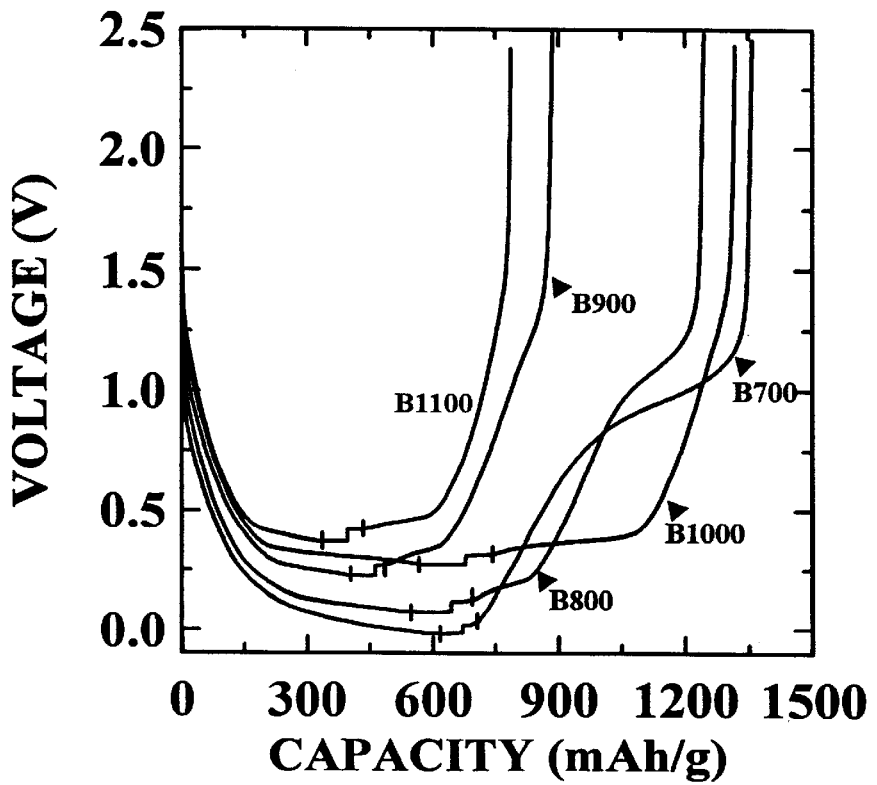
Figure 20A:
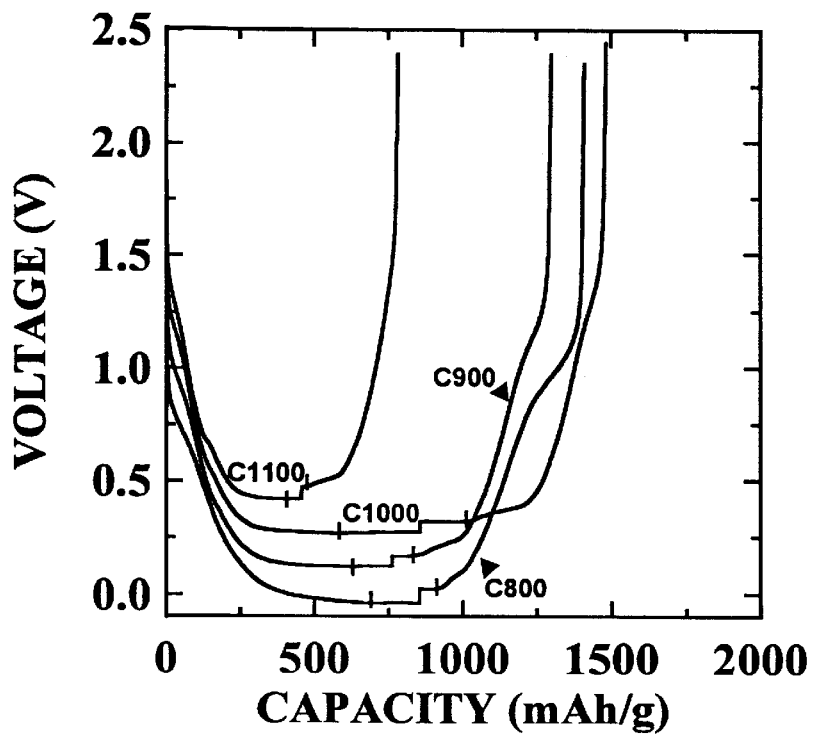
FIGS. 20a and 20b show the voltage versus capacity plots for the first and second cycles respectively for batteries comprising samples prepared from the C type precursor in Phenolic Resin Example 1. The curves have been offset sequentially for clarity. (In both Figures, the shifts are 0.0, 0.15, 0.3, and 0.45 volts for sample C800, C900, C1000, and C1100 respectively.)
Figure 20B:
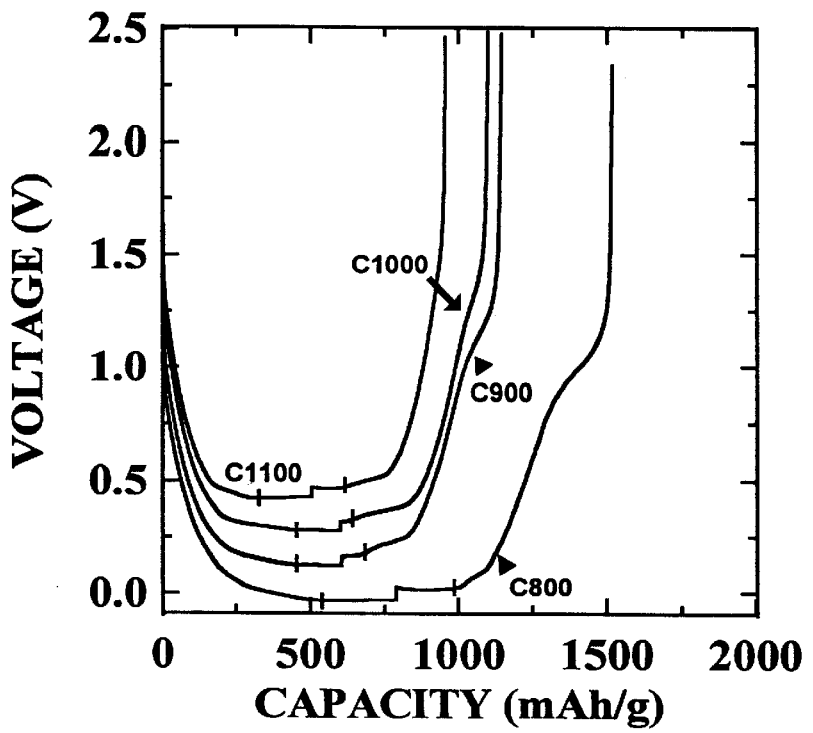

FIGS. 19a and 19b show the first and second cycle voltage profiles for the series of pyrolyzed B type precursors. The sample made at 1000° C. gives a reversible capacity of about 560 mAh/g and an irreversible capcity of only about 200 mAh/g. This is a very attractive material for use as a lithium ion battery anode. FIGS. 20a and 20b show the first and second cycle voltage profiles for the series of pyrolyzed C type precursors. The samples made at 900° C. and 1000° C. give reversible capacities near 450 mAh/g. The latter has an irreversible capacity of only 130 mAh/g.

Figure 21:
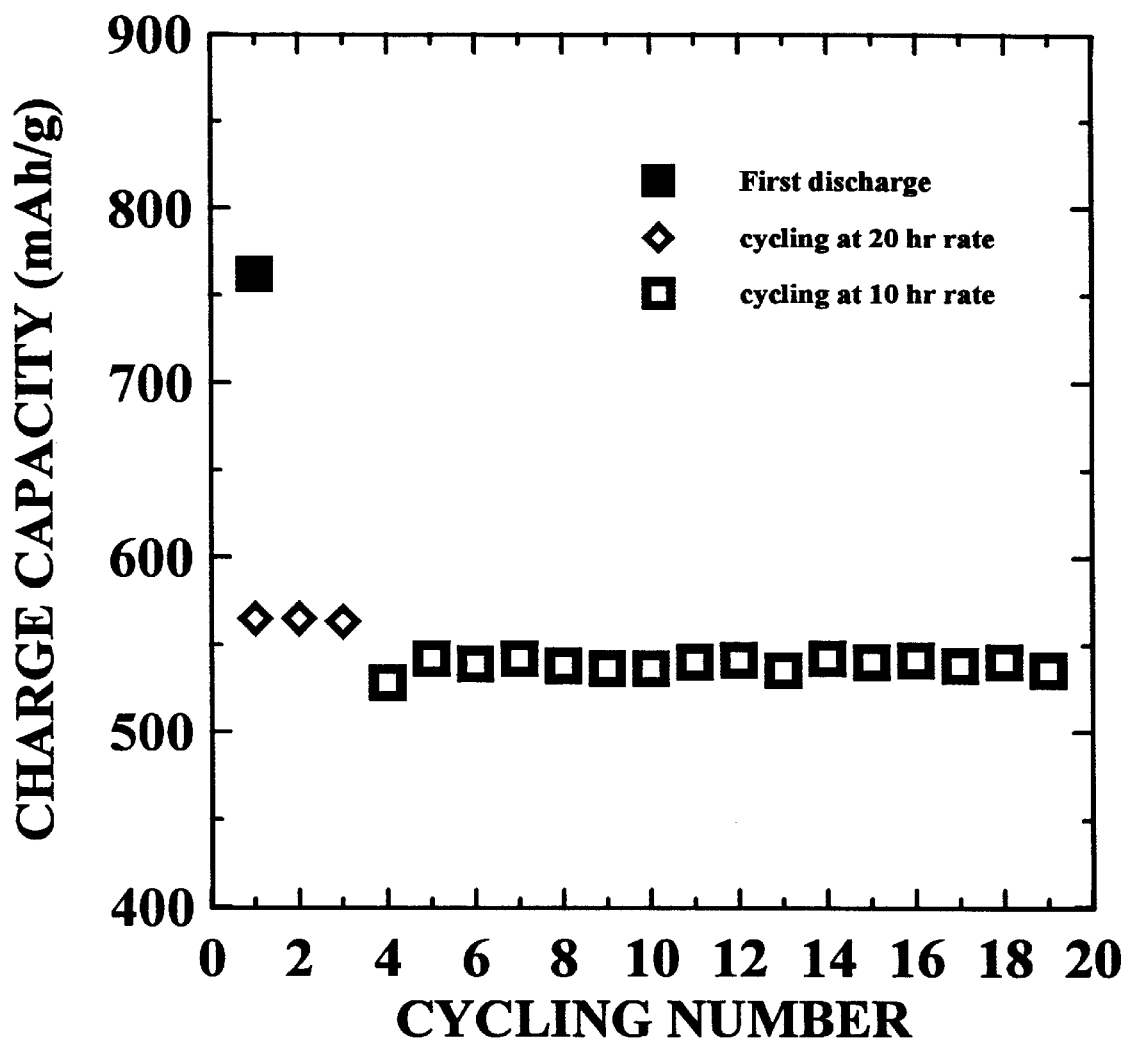
FIG. 21 shows the capacity versus cycle number for the battery comprising sample B1000 of Phenolic Resin Example 1.
Figure 22A:
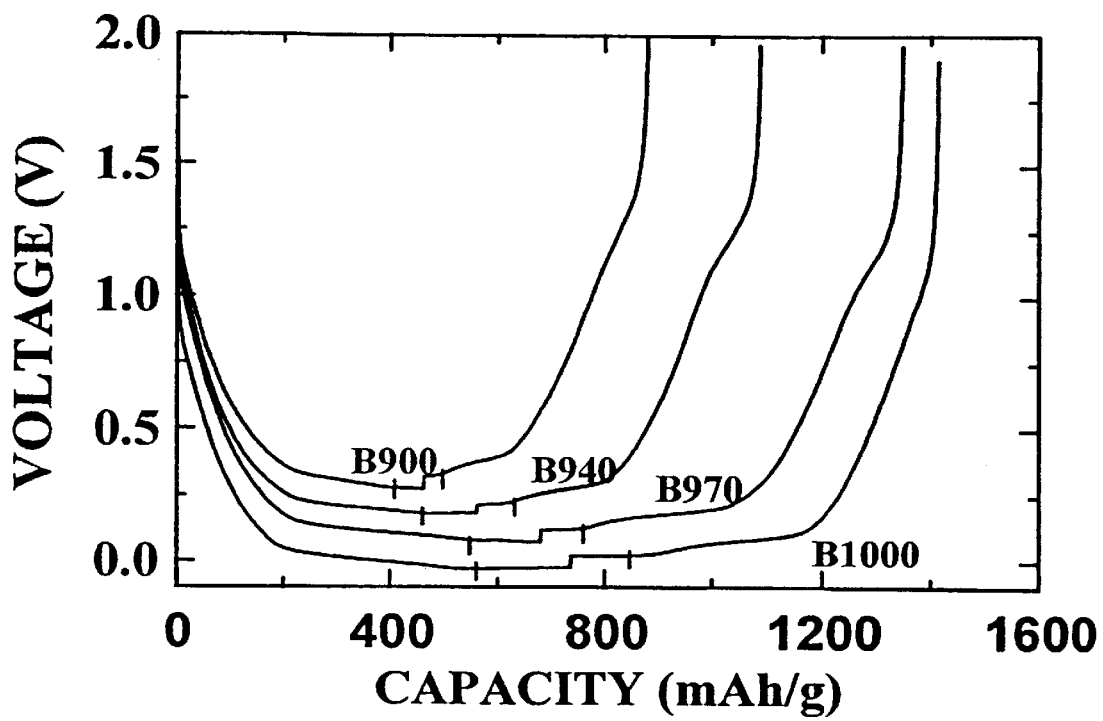
FIGS. 22a and 22b show the voltage versus capacity plots for the second cycle of batteries comprising samples prepared from the B type precursor in Phenolic Resin Example 2. The plots have been sequentially offset by 0.1V for clarity.
Figure 22B:
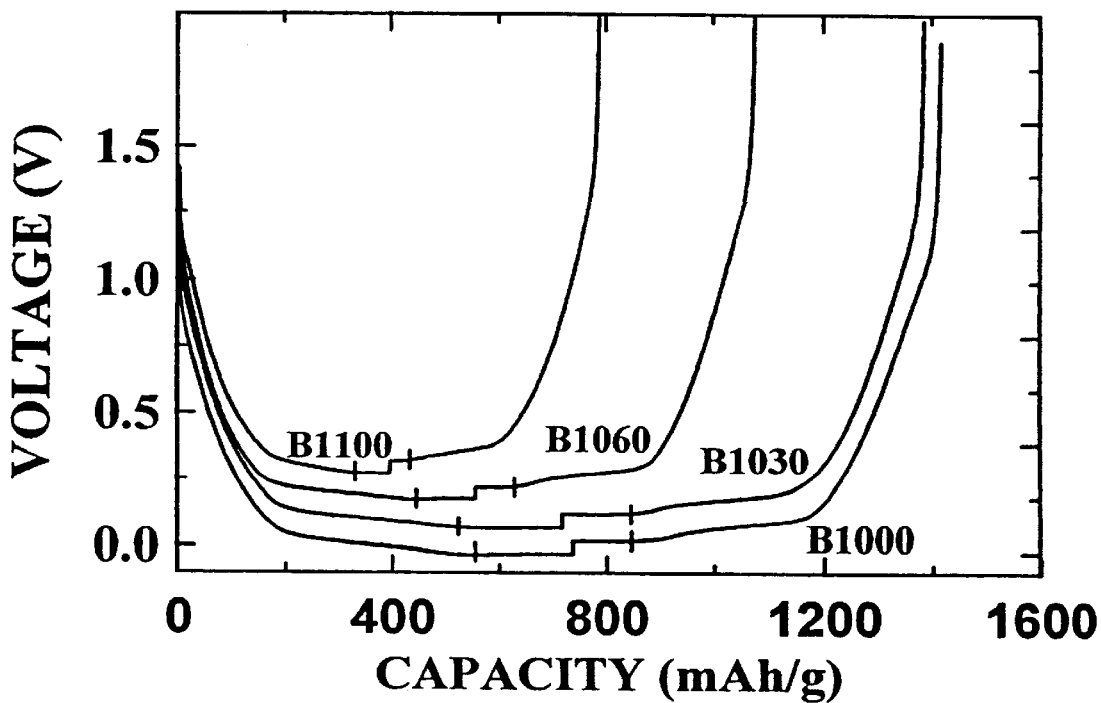

Extended cycling was carried out on a battery comprising sample B1000 at currents of 37 mA/g of active material. FIG. 21 shows the capacity versus cycle number for this battery. There is little capacity loss upon cycling.

Insertion compounds of the invention can therefore have high reversible specific capacity coupled with acceptable associated hysteresis in voltage and acceptable associated irreversible capacity.

Phenolic Resin Example 2

The series of samples made from the B type precursor were shown to have the highest reversible capacities in the preceding Example. In order to determine how the reversible and irreversible capacities varied in the narrower temperature range between 900° C. and 1100° C., an additional series of samples using this precursor was prepared. The samples were tested in coin cell batteries as described earlier and voltage profiles, irreversible capacities, and reversible capacities were measured. Two batteries of each were made and the results from each experiment were within 20 mAh/g.

Table 5 summarizes the average specific capacity results for all the samples prepared from the B type precursor. FIG. 7 shows representative second cycle voltage profiles for the batteries made with these samples.

TABLE 4

Data for the samples of Phenolic Resin Example 1

| Sample ID | Pyrolysis Temp. (° C.) | Weight % C | Weight % H | Weight % N | H/C | Yield (%) | R | Reversible Capacity (mAh/g) (±20) | Irreversible Capacity (mAh/g) (±20) |
|---|---|---|---|---|---|---|---|---|---|
| A700 | 700 | 91.2 | 1.5 | 1.2 | 0.19 | 57 | 1.37 | 500 | 440 |
| A800 | 800 | 93.1 | 1.0 | 1.3 | 0.13 | 55 | 1.56 | 510 | 280 |
| A900 | 900 | 92.3 | 0.6 | 1.2 | 0.07 | 55 | 1.63 | 510 | 210 |
| A1000 | 1000 | 94.2 | 0.4 | 1.9 | 0.05 | 54 | 1.68 | 450 | 160 |
| A1100 | 1100 | 96.7 | 0.3 | 0.8 | 0.04 | 52 | 1.79 | 330 | 70 |
| B700 | 700 | 94.7 | 1.8 | 0.4 | 0.22 | 58 | 1.33 | 630 | 260 |
| B800 | 800 | 95.8 | 0.9 | 0.7 | 0.11 | 57 | 1.39 | 540 | 210 |
| B900 | 900 | 94.8 | 0.5 | 0.5 | 0.06 | 57 | 1.32 | 410 | 300 |
| B1000 | 1000 | 95.6 | 0.3 | 0.6 | 0.04 | 56 | 1.34 | 560 | 200 |
| B1100 | 1100 | 97.4 | 0.4 | 1.4 | 0.05 | 56 | 1.64 | 340 | 110 |
| C800 | 800 | 95.7 | 0.9 | 0.6 | 0.11 | 64 | 1.53 | 530 | 210 |
| C900 | 900 | 95.1 | 0.4 | 0.7 | 0.05 | 57 | 1.63 | 450 | 180 |
| C1000 | 1000 | 96.5 | 0.3 | 0.8 | 0.04 | 58 | 1.54 | 450 | 130 |
| C1100 | 1100 | 97.0 | 0.3 | 1.3 | 0.03 | 56 | 1.64 | 330 | 120 |

TABLE 5

Data for the samples of Phenolic Resin Examples

| Sample ID | Reversible Capacity (mAh/g) (±20) | Irreversible Capacity (mAh/g) (±20) |
|---|---|---|
| B900 | 410 | 300 |
| B940 | 470 | 160 |
| B970 | 550 | 160 |
| B1000 | 560 | 200 |
| B1030 | 540 | 140 |
| B1060 | 450 | 200 |
| B1100 | 340 | 110 |

Appropriate selection of the pyrolysis temperature appears to be important in order to optimize the properties of these insertion compounds.

Carbohydrate and carbohydrate containing precursors:

Carbonaceous hosts of the invention were prepared using a variety of carbohydrate precursors. Table 6 lists the precursors used, along with their source and morphology.

TABLE 6

List of carbohydrate precursors

| Carbohydrate Material | Supplier | Morphology |
|---|---|---|
| Table Sugar (sucrose) | Canada Safeway | Powder |
| Sucrose | BDH Inc.(Toronto), Reagent grade | Powder |
| Starch | BDH Inc. (Toronto) Reagent grade | Powder |
| Walnut Shells | Canada Safeway | Small pieces of shell separated from the nut |
| Filbert Shells | Canada Safeway | Small pieces of shell separated from the nut |
| Almond Shells | Canada Safeway | Small pieces of shell separated from the nut |
| Red Oak | Reimer Hardwoods (Abbotsford, B.C.) | 1 cm³ chunks cut from furniture-grade lumber |
| Maple | Reimer Hardwoods (Abbotsford, B.C.) | 1 cm³ chunks cut from furniture-grade lumber |

Precursors (typically batches between 1 and 25 grams) were contained in nickel foil boats and placed within a stainless steel or quartz furnace tube. Prior to heating, the tube was flushed with argon (Ultra High Purity Grade—Linde) for 30 minutes to remove air. The samples were heated from room temperature to a desired pyrolysis temperature at a rate of 25° C./min. They were held at the pyrolysis temperature for 1 hour. The furnace power was then turned off and the samples were cooled to near room temperature within the furnace tube under flowing argon (a process which took several hours). The samples were weighed before and after pyrolysis, so that the yield could be determined. Certain samples were pyrolyzed at temperatures of 1200° C. and higher. These samples were first pyrolyzed to 1100° C. as in the preceding. Thereafter, pyrolysis was continued in a similar manner using a Centorr Series 10 furnace.

Some samples of table sugar (hereinafter denoted simply as 'sugar') were precarbonized by washing in excess concentrated sulfuric acid. About 50 grams of sugar was first mixed with about 100 cc of concentrated sulfuric acid, added slowly. The resulting char was briefly crushed, washed with boiling water, and filtered to recover the solids. Rinsing was repeated until the filtrate gave the same pH (about 6) as the tap water used for rinsing. The product was dried overnight at 110° C. overnight before pyrolysis. The carbon yield was calculated for these samples by the final carbon mass divided by the initial weight of sugar. These samples are denoted as 'a-sugar' samples.

The pyrolyzed samples were ground to powder and analyzed as described in the preceding. Results of these measurements are tabulated in Table 7.

TABLE 7

Summary of characteristics of pyrolyzed carbohydrate precursors

| No. | Precursor | Pyrolysis Temp. (° C.) | Yield % | C wt. % | H wt. % | N wt. % | H/C atomic | R | $R_g$ (Å) | $I_1$ (counts per mg) | Tap Density (g/cc) | MB (µmoles per g) | Surface area (m²/g) | Reversible Capacity** (±20 mAh/g) | Irreversible Capacity** (±20 mAh/g) |
|---|---|---|---|---|---|---|---|---|---|---|---|---|---|---|---|
| 1 | sugar | 1100 | 12* | 97.3 | 0.28 | 0.96 | 0.034 | 1.91 | 5.49 | 19.3 | 0.69 | — | 15 | 537, 534 | 130, 141 |
| 2 | sucrose | 1000 | 8* | 96.9 | 0.42 | 0.67 | 0.05 | 1.96 | 5.32 | 16.7 | 0.91 | <2.9 | 31 | 529, 534 | 138, 137 |
| 3 | sugar | 1000 | 11* | 97 | 0.51 | 0.72 | 0.063 | 1.95 | 5.49 | 18.4 | — | — | 220 | 442, 363 | 205, 222 |
| 4 | sugar | 900 | 12* | 95.5 | 0.59 | 0.39 | 0.074 | 1.75 | 4.82 | 11.9 | 0.78 | — | 58 | 590, 557 | 175, 184 |
| 5 | sugar | 800 | 17* | 95.2 | 0.94 | 0.27 | 0.12 | 1.76 | 4.74 | 10 | 0.8 | — | 120 | 624, 623 | 197, 212 |
| 6 | sugar | 700 | 12* | 93.8 | 1.41 | 0.21 | 0.18 | 1.58 | 4 | 13.3 | 0.62 | — | 250 | 690, 740 | 274, 266 |
| 7 | sugar | 600 | 14* | 92.5 | 2.28 | 0.1 | 0.3 | 1.46 | 3.13 | 6.8 | 0.67 | — | 460 | 764, 790 | 455, 313 |
| 8 | a-sugar | 1100 | 27 | 97.2 | — | 0.25 | — | 1.63 | 5.01 | 15.8 | — | <1.5 | 1.8 | 564, 567 | 34, 75 |
| 9 | a-sugar | 1000 | 30 | 97 | 0.49 | 0.36 | 0.061 | 1.78 | 5.27 | 16.2 | — | — | 180 | 477, 460 | 130, 147 |
| 10 | a-sugar | 900 | 29 | 95.4 | 0.55 | 0.42 | 0.069 | 1.69 | 4.8 | 11.3 | — | — | 68 | 591, 605 | 182, 188 |
| 11 | a-sugar | 800 | 29 | 94.3 | 0.93 | 0.28 | 0.12 | 1.64 | 4.71 | 10.5 | — | — | 490 | 577, 566 | 225, 220 |
| 12 | a-sugar | 700 | 30 | 91.4 | 1.51 | 0.26 | 0.2 | 1.47 | 4.37 | 8.6 | — | — | 430 | 577, 575 | 375, 378 |
| 13 | a-sugar | 600 | 30 | 92.9 | 2.41 | 0.21 | 0.31 | 1.3 | 3.08 | 6.5 | — | — | 370 | 665, 706 | 521, 466 |
| 14 | starch | 1000 | 11 | 91.7 | 0.52 | 0.84 | 0.068 | 1.88 | 5.7 | 23.2 | 0.76 | <2.5 | 30 | 493, 496 | 196, 199 |
| 15 | filbert | 1000 | 23 | — | — | — | — | 1.92 | 5.72 | 22.7 | 0.63 | — | 180 | 412, 400 | 183, 198 |
| 16 | walnut | 1000 | 23 | — | — | — | — | 1.85 | 5.97 | 16 | 0.63 | — | 60 | 490, 490 | 157, 126 |
| 17 | almond | 1000 | 23 | — | — | — | — | 2 | 5.93 | 17 | 0.6 | — | 46 | 395, 371 | 167, 185 |
| 18 | oak | 1000 | 18 | — | — | — | — | 1.85 | 5.53 | 19.1 | 0.54 | <3.5 | 13 | 518, 515 | 145, 159 |
| 19 | maple | 1000 | 18 | — | — | — | — | 1.98 | 5.58 | 28.2 | 0.56 | — | 63 | 497, 503 | 140, 127 |
| 20 | maple | 1100 | 18 | — | — | — | — | 1.86 | 5.54 | 20.0 | 0.56 | — | 11 | 547, 524 | —, 104 |
| 21 | sugar | 1200 | 11* | — | — | — | — | 1.98 | 5.66 | 22.5 | 0.60 | — | 5.5 | 374, 379 | 71, 59 |

TABLE 7-continued

Summary of characteristics of pyrolyzed carbohydrate precursors

| No. | Precursor | Pyrolysis Temp. (° C.) | Yield % | C wt. % | H wt. % | N wt. % | H/C atomic | R | $R_g$ (Å) | $I_1$ (counts per mg) | Tap Density (g/cc) | MB ($\mu$moles per g) | Surface area (m²/g) | Reversible Capacity** (±20 mAh/g) | Irreversible Capacity** (±20 mAh/g) |
|---|---|---|---|---|---|---|---|---|---|---|---|---|---|---|---|
| 22 | sugar | 1400 | 11* | — | — | — | — | 2.37 | 6.08 | 31.5 | 0.63 | — | 7.9 | 284, 296 | 35, 38 |
| 23 | sugar | 1600 | 11* | — | — | — | — | 3.09 | 6.53 | 46.7 | 0.58 | — | 6.3 | 208, 210 | 31, 34 |
| 24 | a-sugar | 1200 | 28 | — | — | — | — | 1.83 | 5.78 | 17.3 | 0.77 | — | 1.3 | 367, 368 | 38, 45 |
| 25 | a-sugar | 1400 | 28 | — | — | — | — | 2.02 | 5.95 | 21.8 | 0.76 | — | 1.2 | 280, 274 | 25, 25 |
| 26 | a-sugar | 1600 | 28 | — | — | — | — | 2.48 | 6.46 | 33.2 | 0.73 | — | 1.2 | 198, 202 | 24, 25 |
| 27 | starch | 1100 | 11 | — | — | — | — | 1.88 | 5.59 | 29.6 | 0.71 | — | 4.9 | 523, 526 | 154, 150 |
| 28 | starch | 1200 | 10 | — | — | — | — | 2.13 | 6.06 | 42.6 | 0.65 | — | 3.1 | 337, 389 | 58, 54 |
| 29 | starch | 1400 | 10 | — | — | — | — | 2.40 | 6.21 | 42.8 | 0.58 | — | 3.8 | 277, 286 | 32, 30 |
| 30 | starch | 1600 | 10 | — | — | — | — | 2.89 | 6.66 | 65.4 | 0.55 | — | 3.3 | 212, 207 | 35, 32 |
| 31 | oak | 1100 | 19 | — | — | — | — | 1.78 | 5.47 | 19.5 | 0.59 | — | 12.1 | 587, 538 | 115, 120 |
| 32 | oak | 1200 | 18 | — | — | — | — | 2.02 | 5.94 | 30.9 | 0.55 | — | 4.8 | 334, 330 | 38, 60 |
| 33 | oak | 1400 | 18 | — | — | — | — | 2.26 | 6.11 | 35.5 | 0.55 | — | 4.7 | 261, 270 | 33, 35 |
| 34 | oak | 1600 | 18 | — | — | — | — | 2.66 | 6.58 | 46.8 | 0.53 | — | 4.6 | 192, 193 | 30, 29 |

*The yield for these samples was difficult to estimate due to boiling of the samples with associated expansion outside the sample boat.
**The capacities for both (2) batteries tested are reported.

Yields near 20% were readily achieved using this simple pyrolysis method. The H/C ratio was less than 0.1 for heating temperatures above 800° C. Tap densities up to 0.9 g/cc were obtained.

Figure 23:
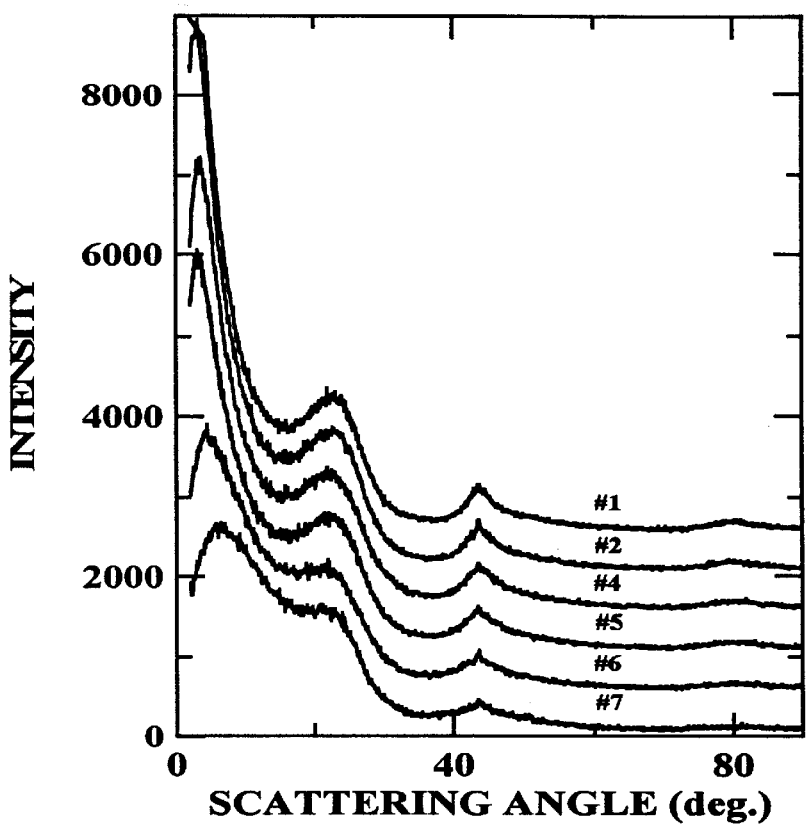
FIG. 23 shows the powder x-ray diffraction profiles for the directly pyrolyzed sucrose samples (numbers 1, 2, 4, 5, 6, and 7) of the carbohydrate and carbohydrate containing precursors examples. The data presented has been offset sequentially by 500 counts for clarity.

FIG. 23 shows the powder x-ray diffraction profiles of some pyrolyzed sucrose samples (numbers 1, 2 (BDH source), 4, 5, 6, and 7) as a function of pyrolysis temperature. The {002} Bragg peak near 220 is poorly formed in all these samples, indicating materials made up predominantly of single carbon layers arranged somewhat like a 'house of cards'. The {100} and {110} Bragg peaks near 44° and 80° respectively can be used to estimate the lateral extent of the graphene sheets (this is the distance over which the sheets are more or less flat). The lateral dimension ranges from near 10 Å for the sample pyrolyzed at 600° C. to near 25 Å for the sample pyrolyzed at 1100° C. The diffraction patterns for the samples made from acid-washed sugar (numbers 8–13) show similar features.

Figure 24:
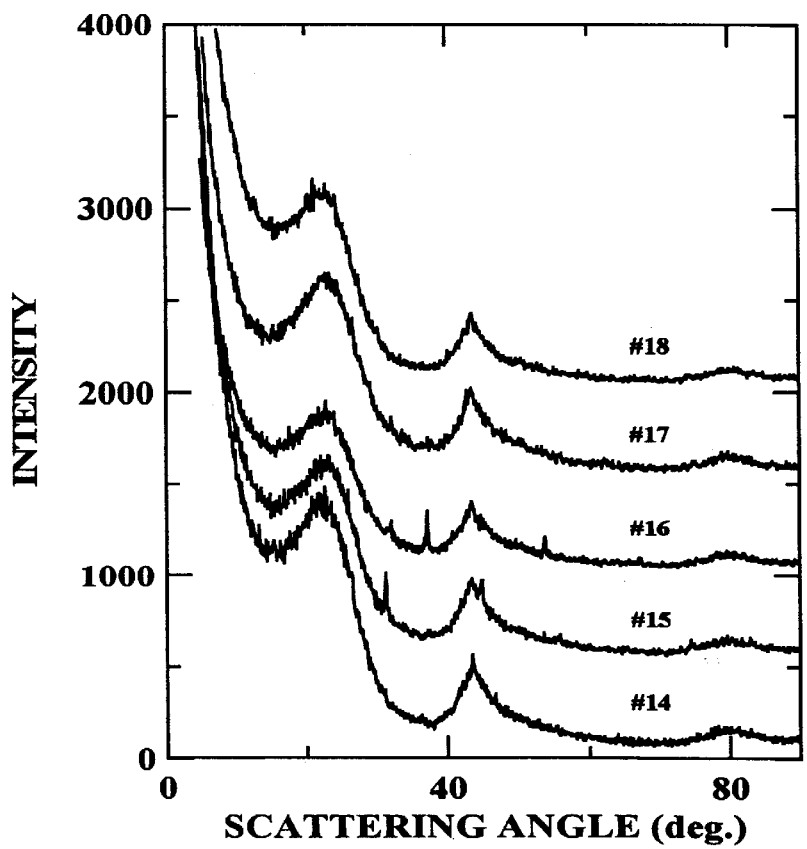
FIG. 24 shows the powder x-ray diffraction profiles for samples pyrolyzed at 1000° C. from starch and cellulose precursors (numbers 14, 15, 16, 17, and 18). The data have been offset sequentially by 500 counts for clarity.

FIG. 24 shows the x-ray diffraction profiles for the samples pyrolyzed at 1000° C. from starch and cellulose precursors. The patterns shown are for samples number 18, 17, 16, 15, and 14 from top to bottom in FIG. 24. These patterns resemble one another and additionally resemble the pattern of sample number 2 in FIG. 23, suggesting similar structural arrangements.

Higher pyrolysis temperature tends to produce smaller BET surface area. (However, samples number 3 and 9 have anomolously high surface areas.) During pyrolysis, the samples emit water, $CO_2$, and other gases. If the argon flow rate is too small, these gases remain in the tube and oxidize the samples leading to high surface areas.

Figure 25A:
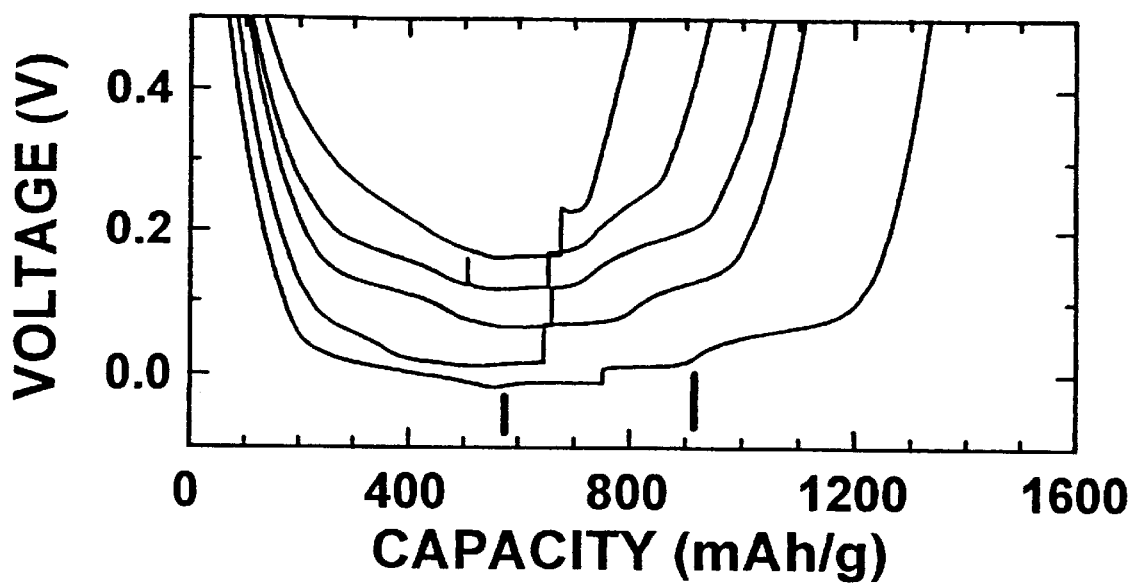
FIGS. 25a and b show the voltage versus capacity plots for the second cycle for representative batteries comprising sample numbers 8, 2, 10, 11, and 12 pyrolyzed between 700° C. and 1100° C.
Figure 25B:
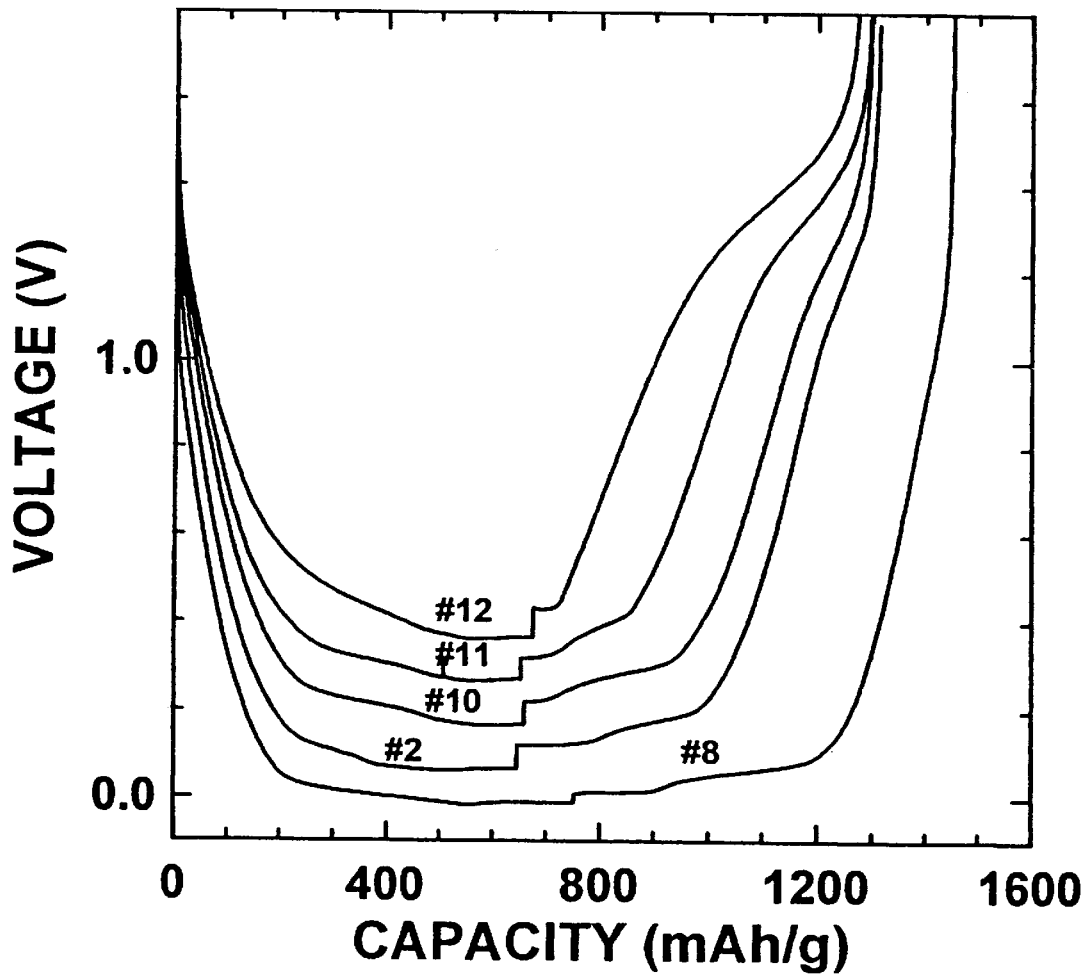

Laboratory coin cell batteries were constructed using these pyrolyzed samples as described in the preceding. FIGS. 25a and b show the voltage versus capacity plots for the second cycle for representative batteries comprising samples number 8, 2, 10, 11, and 12 prepared between 700° C. and 1100° C. Samples number 8, 2, and 10 show large reversible capacities and little voltage hysteresis. (Materials prepared at 800° C. and below can contain substantial hydrogen leading to significant hysteresis in the voltage plateaus. Nevertheless, such carbons, if prepared cheaply enough, might be useful for some battery applications.)

From the data in Table 7, irreversible capacities are seen to decrease as the pyrolysis temperature increases. Samples number 3 and 9 have significantly less reversible capacity than does sample 2, prepared at the same temperature. This might be attributed to differences in the samples as evidenced by the larger surface area of samples 3 and 9 compared to sample 2.

Figure 26A:
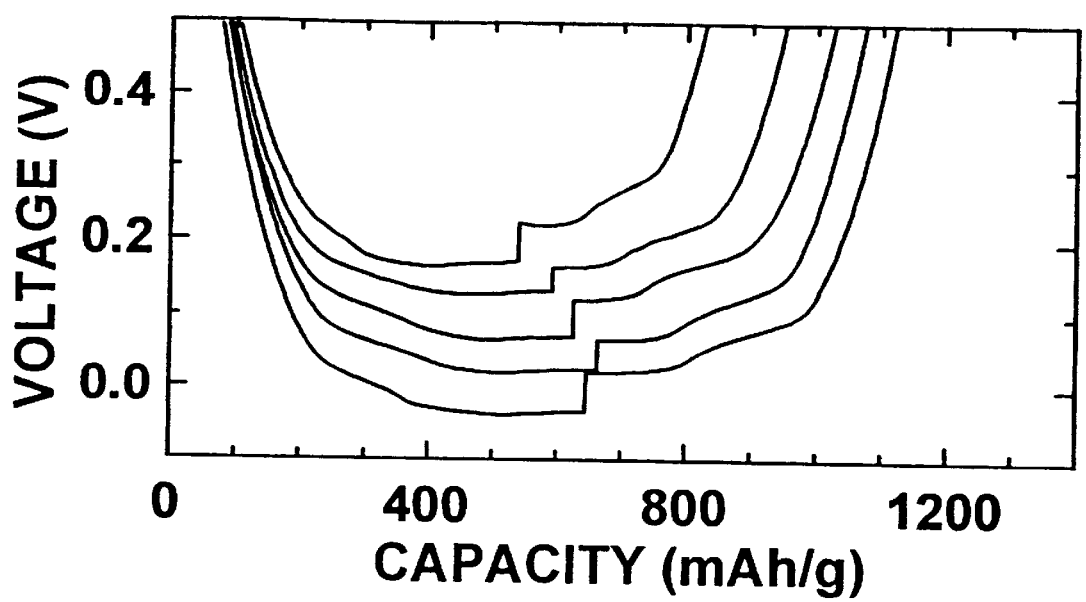
FIGS. 26a and b show the voltage versus capacity plots for the second cycle for representative batteries comprising sample numbers 2, 18, 14, 16, and 15 pyrolyzed at 1000° C.
Figure 26B:
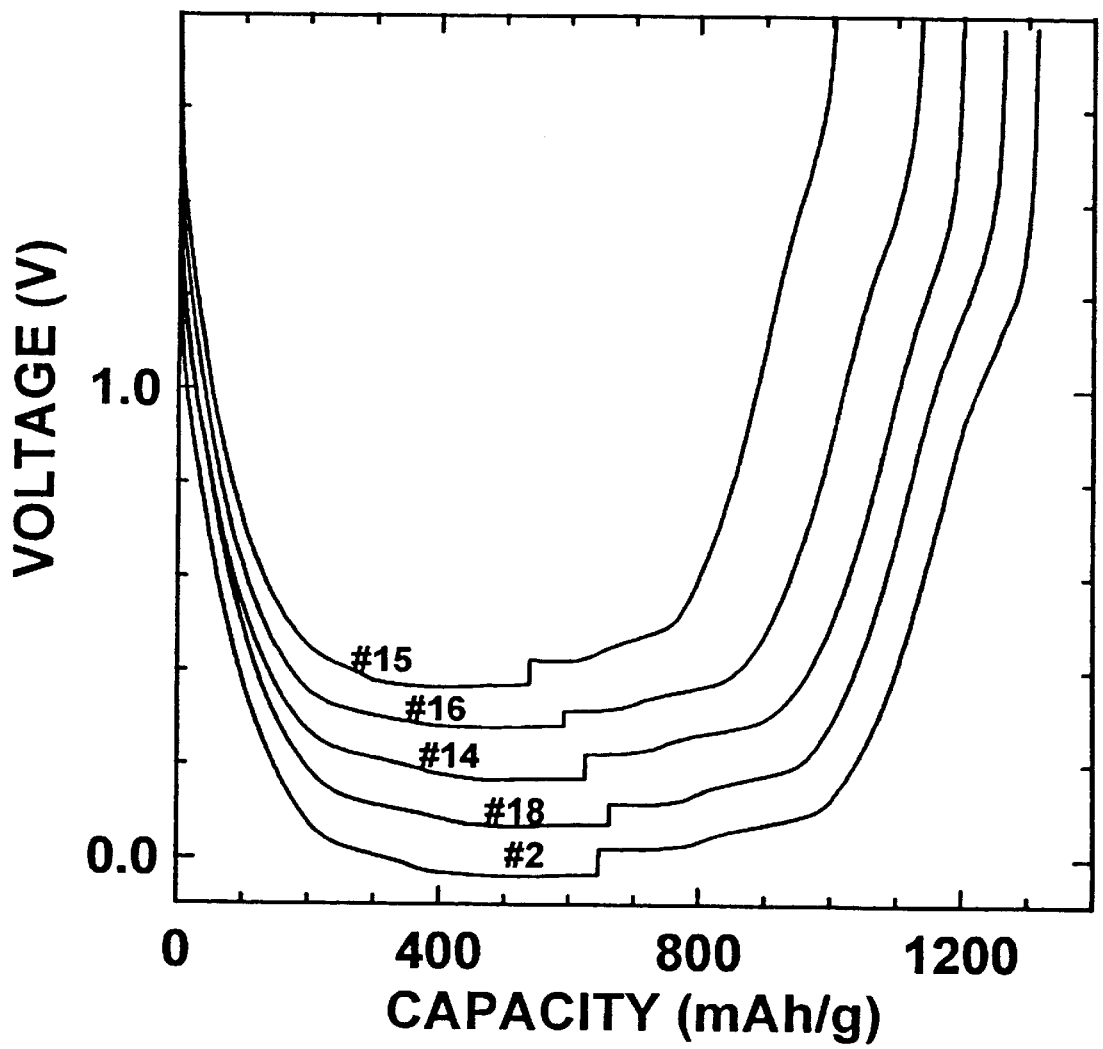

FIGS. 26a and b show the voltage versus capacity plots for the second cycle for representative batteries made with sucrose, cellulose, and starch precursors pyrolyzed at 1000° C. Data is shown for sample number 2 (for comparison), 18 (oak), 14 (starch), 16 (walnut shells) and 15 (filbert shells). Samples 2, 18, and 14 show excellent behavior, and it is likely that the performance of the other samples could be improved through changes to the pyrolysis process. Thus, pyrolyzed products made from oak, starch, and walnut shells gave similar behavior to that made from sucrose.

Figure 27:
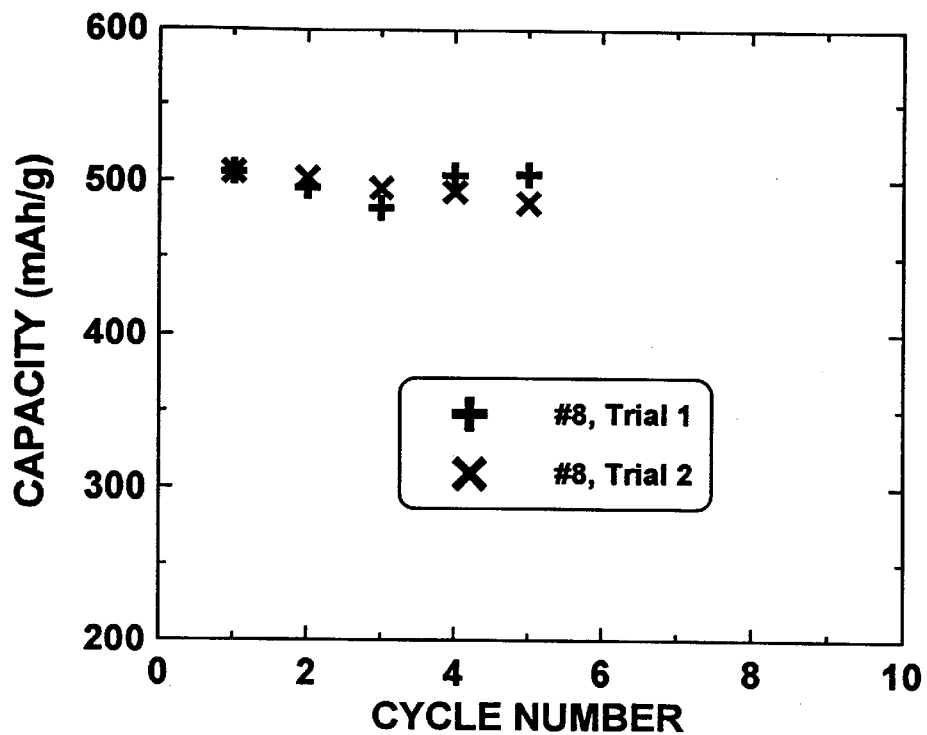
FIG. 27 shows the capacity versus cycle number for the two batteries containing electrodes made from sample number 8.
Figure 28:
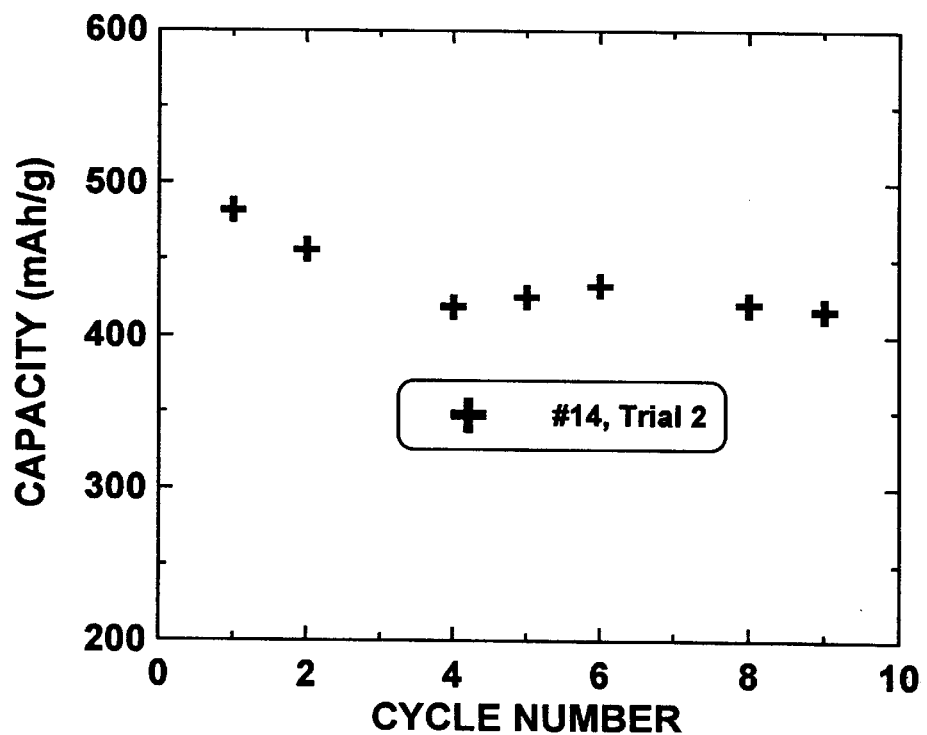
FIG. 28 shows the capacity versus cycle number for one of the two batteries containing electrodes made from sample number 14.
Figure 29:
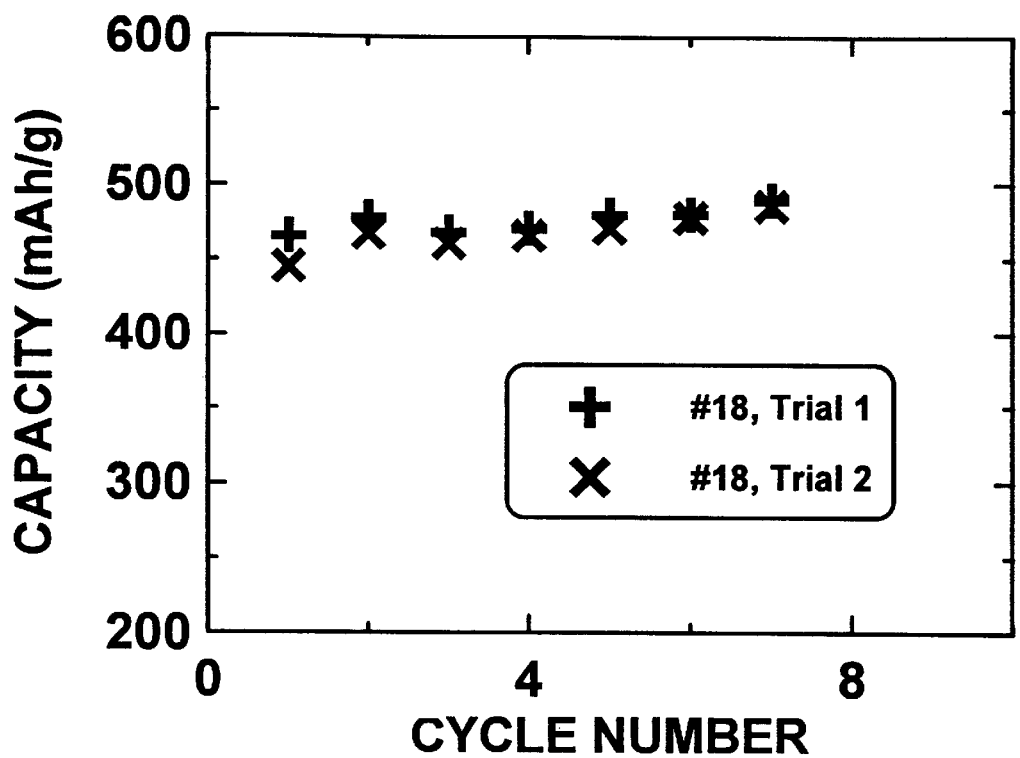
FIG. 29 shows the capacity versus cycle number for the two batteries containing electrodes made from sample number 18.

Some of the batteries underwent extended cycling as described in the preceding. Discharge and charge currents of 74 mA/g and 37 mA/g respectively were used for the extended cycle testing between 2.0 V and the onset of lithium plating. FIGS. 27, 28, and 29 show the capacity versus cycle number for batteries containing electrodes of samples 8, 14, and 18 respectively. These batteries show little capacity loss upon cycling and retain cycling capacities near 500 mAh/g. The battery containing sample 14 (FIG. 28) shows the poorest performance. This may be due to the large impurity content in the sample (as per Table 7, this sample is only 91.7% carbon by weight).

Thus, carbohydrates in general can be used to prepare insertion compounds having excellent electrochemical characteristics by pyrolyzing at temperatures between about 800° C. and about 1200° C. Some differences were noticed between the samples prepared from different carbohydrate precursors, but these may be due in part to the differing amounts of impurities in the naturally occurring sources. For example, the wood and shell samples comprise significant, varied amounts of lignin and/or oil.

Comparative Example

For purposes of comparison, the characteristics of sample number VII from Epoxy Resin Example 1 and sample B1000 from Phenolic Resin Example 1 are reported in Table 8 below.

TABLE 8

Characteristics of Comparative Examples

| Sample Number | H/C | R | $R_g$ | $I_1$ (counts per mg) | MB ($\mu$moles per g) | Surface area ($m^2$/g) | Reversible Capacity (mAh/g) | Irreversible Capacity (mAh/g) |
|---|---|---|---|---|---|---|---|---|
| VII (epoxy) | 0.03 | 1.58 | 5.7* | 14* | <4 | 217 | 570 | 150 |
| B1000 (phenolic resin) | 0.04 | 1.37 | 5.5 | 10 | — | 235 | 560 | 200 |

*Obtained from another sample similar to VII.

Figure 30:
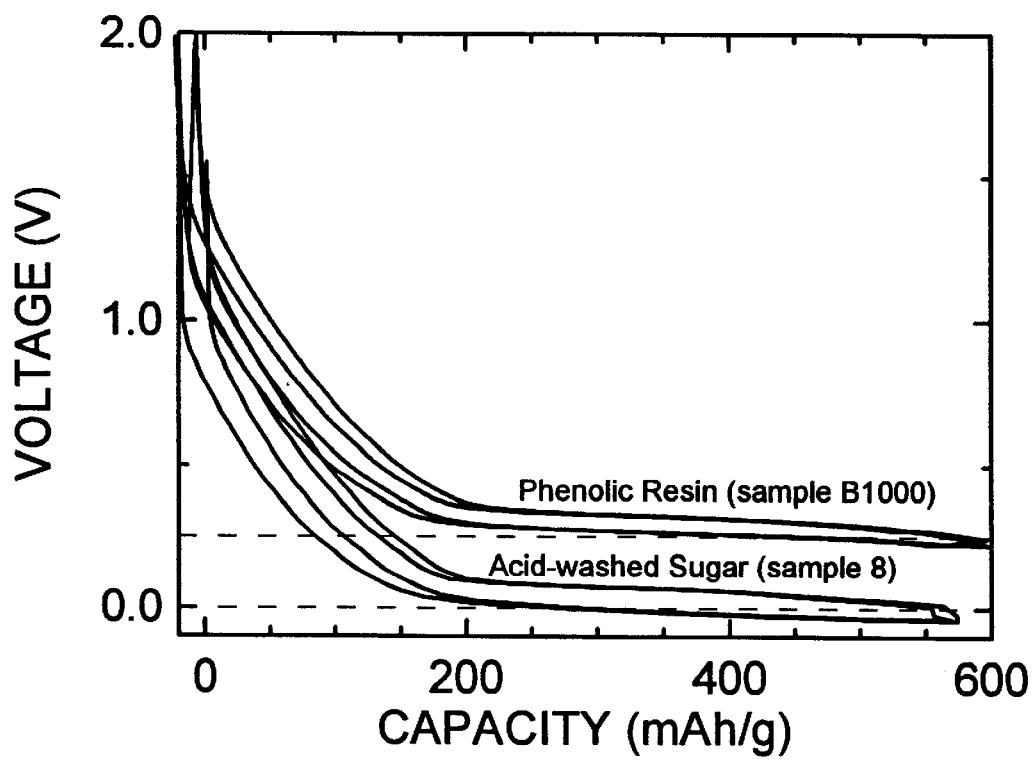
FIG. 30 compares the voltage profiles of cycles 5 and 6 of the batteries comprising carbohydrate precursor sample number 8 and phenolic resole resin precursor sample B1000.
Figure 31:
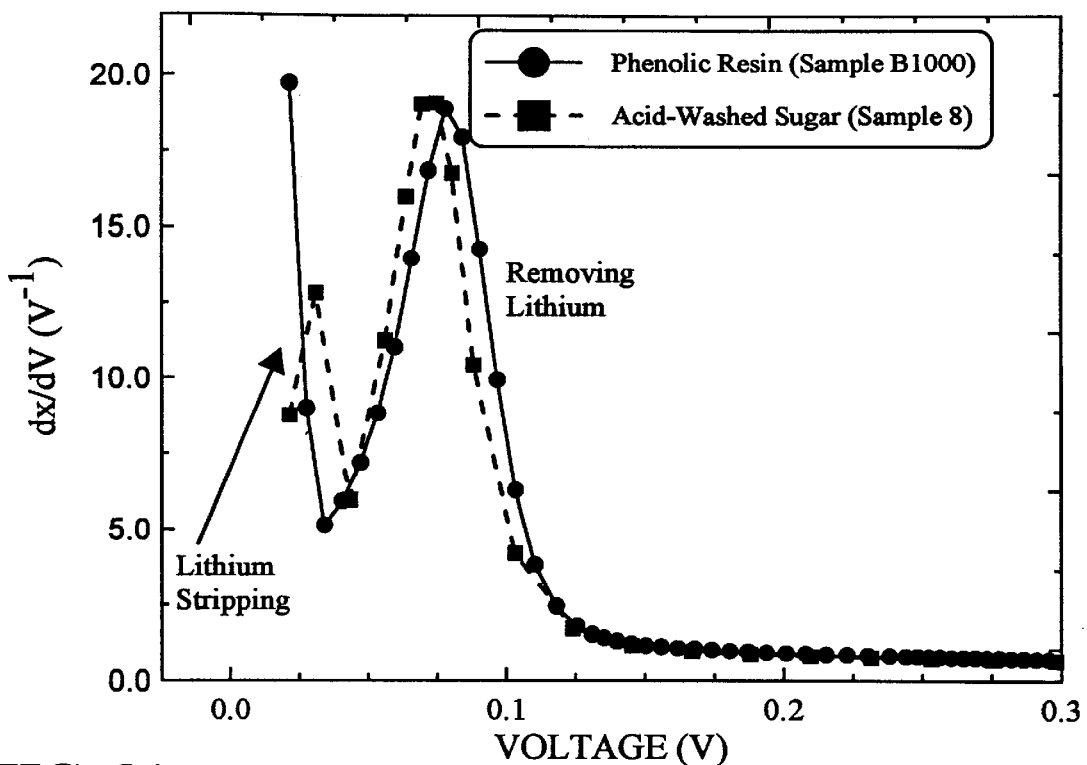
FIG. 31 shows the differential capacity versus voltage during 5th cycle charging of the two batteries of FIG. 30.

Voltage curves of cycles 5 and 6 of the batteries comprising carbohydrate precursor sample 8 and phenolic resin precursor sample B1000 are shown in FIG. 30. (The B1000 sample was discharged and charged at 37 mA/g.) The curves are similar. FIG. 31 compares the differential capacity, measured during the 5th cycle charging, of the two batteries of FIG. 30. Within error, these are identical.

The insertion compounds prepared from pyrolyzed epoxy resins, phenolic resins, and/or carbohydrates can have the same physical and electrochemical characteristics.

Illustrative Examples re Burnoff

A first amount of DEN 438 epoxy novolac resin (from DOW Chemical) was cured with 20 weight % 4-aminobenzoic acid at 170° C. and pyrolyzed at 1000° C. to produce carbonaceous material similar to sample number VII of the Epoxy Examples. Samples (about 1 gram each) were then oxidized to varying degrees in a furnace tube under a flow of extra dry air. This was accomplished by heating the samples at a rate of 10° C./minute to different specific maximum temperatures ($T_{max}$). The amount of carbon burned off was obtained by calculating the difference between the initial and final mass (accurate to ±0.1%).

Figure 32:
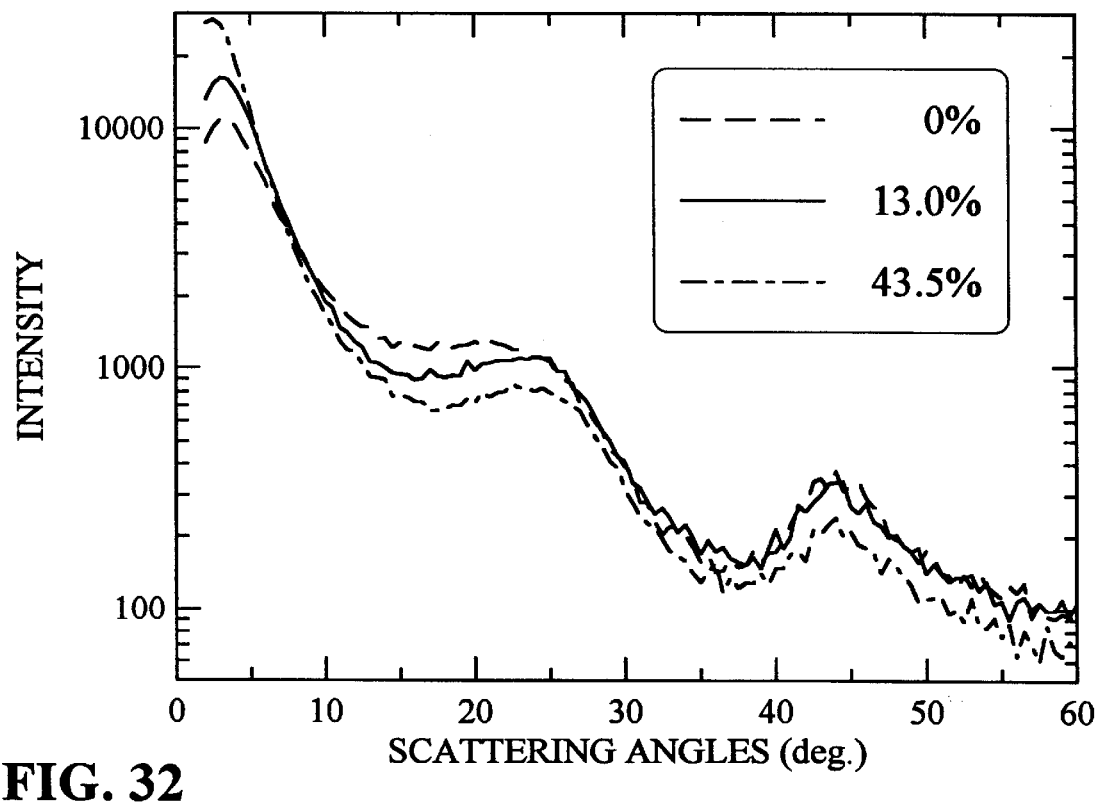
FIG. 32 shows the x-ray diffraction patterns of several oxidized samples from the Illustrative Examples re burnoff.

FIG. 32 shows the x-ray diffraction patterns of three of the preceding oxidized samples with varying weight % burned off. The intensity of the diffraction peaks decreases with % burnoff while the intensity at small scattering angles increases with % burnoff. The diffraction peaks may be expected to decrease as the number of x-ray scatterers decreases. The increase in intensity at small angles is consistent with an increase in porosity of the sample. The ln (intensity) versus $q^2$ relationship was roughly linear in each case, and the derived values of $R_g$ also suggest a small increase in pore size with % burnoff.

A second amount of DEN 438 epoxy novolac resin (from DOW Chemical) was cured with 20 weight % phthalic anhydride at 170° C. and then pyrolyzed at 1000° C. to produce carbonaceous material similar to sample number VII of the Epoxy Examples. Samples (about 1 gram each) were then oxidized to varying degrees in a furnace tube under a flow of extra dry air. This was accomplished by heating the samples at a rate of 10° C./minute to different specific maximum temperatures ($T_{max}$). The amount of carbon burned off was obtained by calculating the difference between the initial and final mass (accurate to ±0.1%). Physical and electrochemical characteristics were determined as in the preceding Inventive Examples. Table 9 shows a summary of the values obtained. (The specific reversible and irreversible capacities represent the average value determined from two test batteries.)

This second set of pyrolyzed samples was then reheated at 1000° C. under argon to remove surface oxides. The weight loss after this reheating is also shown in Table 9. Where indicated, the specific capacities of the reheated samples were also determined.

The surface area as determined by BET increased markedly with burnoffs of only a few weight %. Also, there were significant differences noticed in the nitrogen adsorption kinetics. It took progressively less time for samples to fully adsorb nitrogen (from about 4 hours for sample I-1 down to less than 1 hour for sample I-8). By contrast, the MB absorption values did not increase significantly until after about 5% by weight was burned off. As pore openings enlarge or as new openings are created, the rate and total amount of nitrogen adsorbed may be expected to increase. A corresponding increase in the amount of MB absorbed may be delayed until pore openings enlarge enough to admit the larger MB molecules.

Figure 33A:
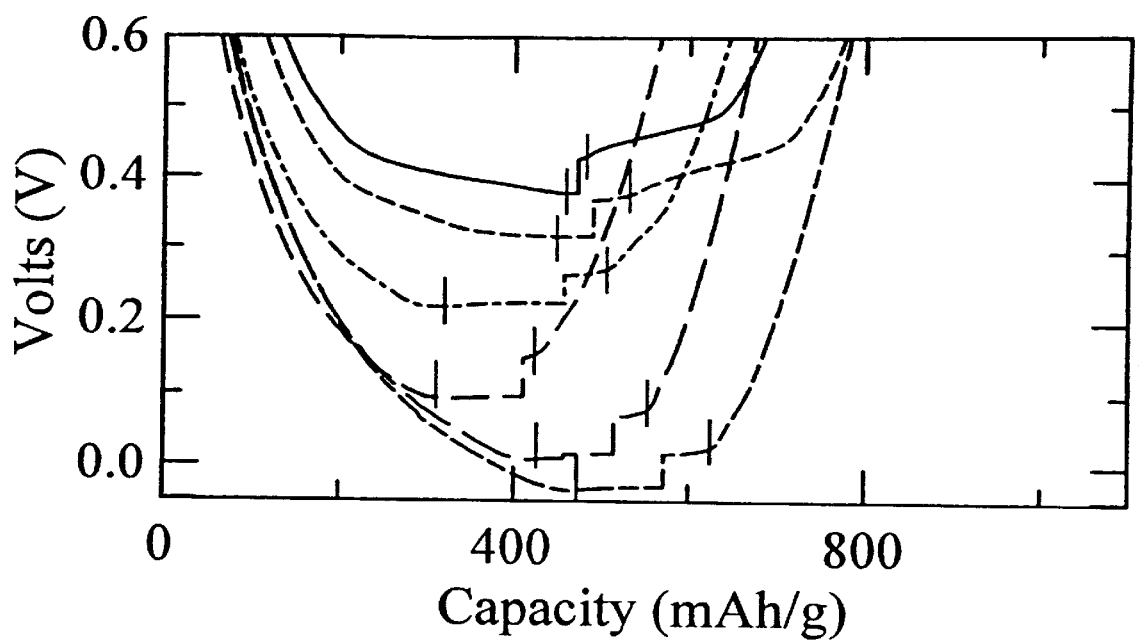
FIGS. 33a (magnified view) and b show the voltage versus capacity plots for the second cycle of representative batteries from the Illustrative Examples reburnoff.
Figure 33B:
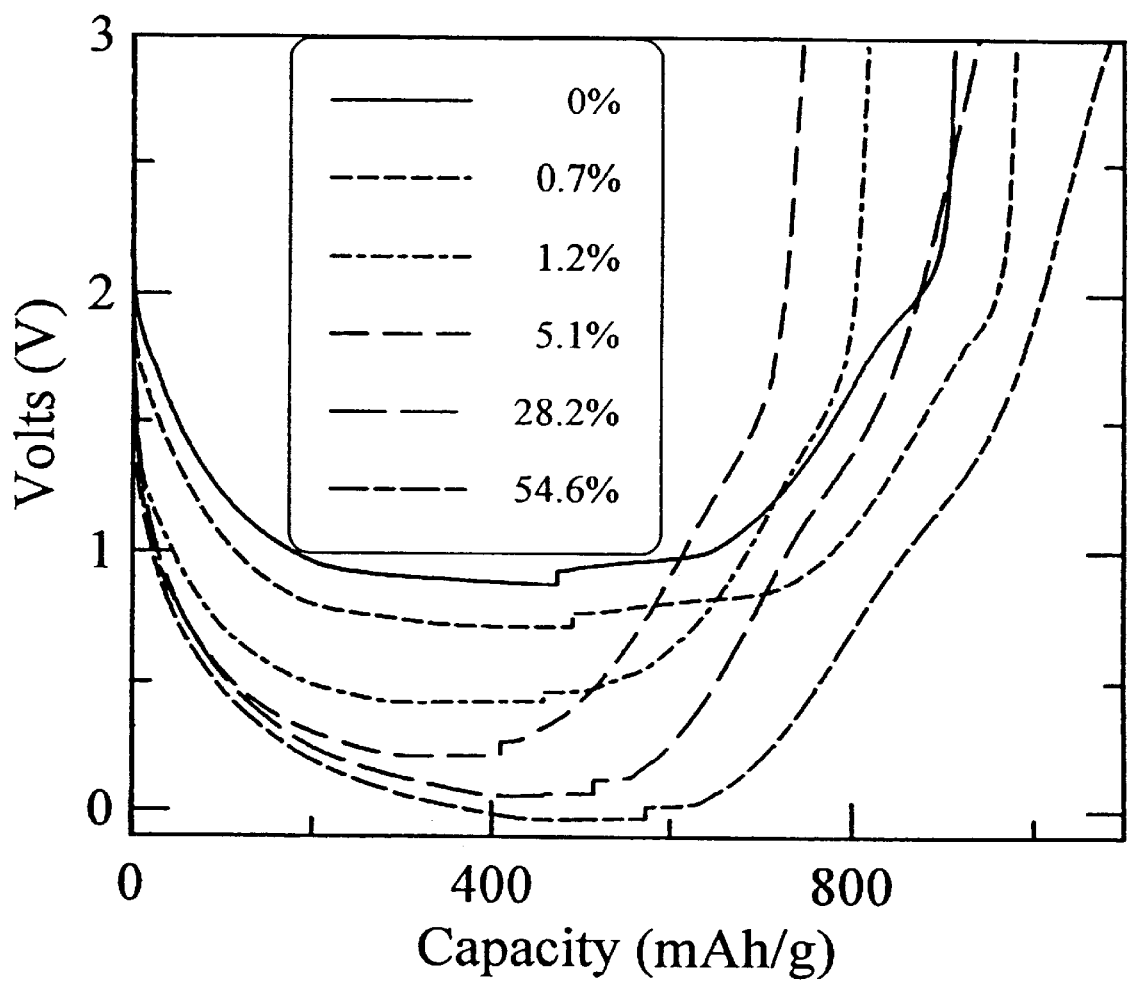

FIG. 33a (magnified view) and b show the voltage versus capacity plots for the second cycle of representative batteries comprising the preceding samples. Samples I-1 and I-2 exhibit a low voltage plateau having substantial capacity (about 200 mAh/g). The capacity of this plateau decreases quickly with % burnoff and is virtually eliminated by about 5% burnoff. As shown in Table 9, the reversible capacity decreases initially with % burnoff, and then increases above about 10% burnoff. Surface oxide complexes formed during the oxidation process may account for this subsequent increase in capacity. Close examination of the voltage plots for samples I-6 and I-8 in FIG. 33b shows that this subsequent increase is associated with lithium insertion near zero volts and extraction above one volt (ie. with substantial hysteresis in the voltage curve). Such high hysteresis capacity is generally unsuitable for lithium ion battery applications.

The irreversible capacity increases with burnoff % approximately linearly with the BET surface area and beginning well before the MB absorption values start to increase. This suggests that the electrolyte molecules are accessing pore surfaces before the MB do (ie. electrolyte molecules are smaller than MB molecules).

The weight loss for the reheated samples is greatest for sample I-6 indicating that the amount of surface oxides is greatest for this sample. Qualitatively, this agrees with previous work in the literature wherein higher temperature oxidation results in fewer surface oxides. Upon reheating, both the reversible and irreversible capacity of the samples are reduced up to about 100 mAh/g, suggesting that the surface oxides play a role in both. The low voltage plateau, present in sample I-1, is not recovered after reheating, even for sample I-3 having only 1.2% burned off by weight. Thus, even minimal oxidation can seriously, and irreversibly, degrade the performance of the compounds of the invention. The presence of surface oxides can indicate that such oxidation occurred. In turn, an observed weight loss upon heating a carbon sample under inert gas can indicate the presence of such surface oxides.

Additionally, the preceding illustrates the difficulties in quantifying electrolyte accessible surface areas using nitrogen or methylene blue molecules as substitutes for the electrolyte itself. If the latter is intermediate in size to the former, a sample can have an acceptable MB absorption value but still not exhibit the advantages of the invention (eg. sample I-3). Conversely, an acceptable limit for the BET surface area is difficult to define since a sample can conceivably have an enormous internal surface area that is accessible by nitrogen but not electrolyte (Note that carbons having the advantages of the invention with BET surface areas as high as 212 $m^2/g$ were made in the preceding Epoxy Examples. Sample I-3, with a 316 $m^2/g$ surface area, on the other hand does not have the advantages of the invention.)

TABLE 9

Summary of characteristics of oxidized samples

| Sample No. | $T_{max}$ (° C.) | Burnoff Amount (%) | R | $R_g$ (Å) | $I_1$ (counts per mg) | MB ($\mu$moles per g) | Surface area ($m^2/g$) | Reversible Capacity (mAh/g) | Irreversible Capacity (mAh/g) | Weight Loss % after reheating | Reversible Capacity after reheating (mAh/g) | Irreversible Capacity after reheating (mAh/g) |
|---|---|---|---|---|---|---|---|---|---|---|---|---|
| I-1 | 25  | 0.0  | 1.97 | 5.7 | 14.0 | 2.3  | 63 ± 5  | 461 | 122 | 1.5  | —   | —   |
| I-2 | 300 | 0.7  | 2.00 | 5.9 | 15.2 | 2.3  | 104 ± 15| 459 | 171 | 2.8  | —   | —   |
| I-3 | 400 | 1.2  | 2.00 | 6.1 | 19.2 | 1.9  | 316 ± 8 | 331 | 365 | 7.0  | 305 | 240 |
| I-4 | 452 | 5.1  | 2.26 | 6.0 | 16.9 | 5.2  | 384 ± 2 | 316 | 487 | 10.6 | —   | —   |
| I-5 | 484 | 12.5 | 2.23 | 6.3 | 22.6 | 16.6 | 553 ± 3 | 370 | 456 | 12.5 | —   | —   |
| I-6 | 525 | 28.2 | 2.10 | 6.8 | 43.3 | 27.1 | 579 ± 2 | 404 | 529 | 13.4 | 305 | 484 |
| I-7 | 550 | 34.0 | 2.13 | 6.7 | 35.8 | 28.1 | 591 ± 2 | 397 | 526 | 10.7 | —   | —   |
| I-8 | 600 | 54.6 | 2.07 | 6.8 | 41.6 | 39.5 | 797 ± 5 | 456 | 546 | 7.1  | —   | —   |

Illustrative Example re small angle scattering

Figure 34A:
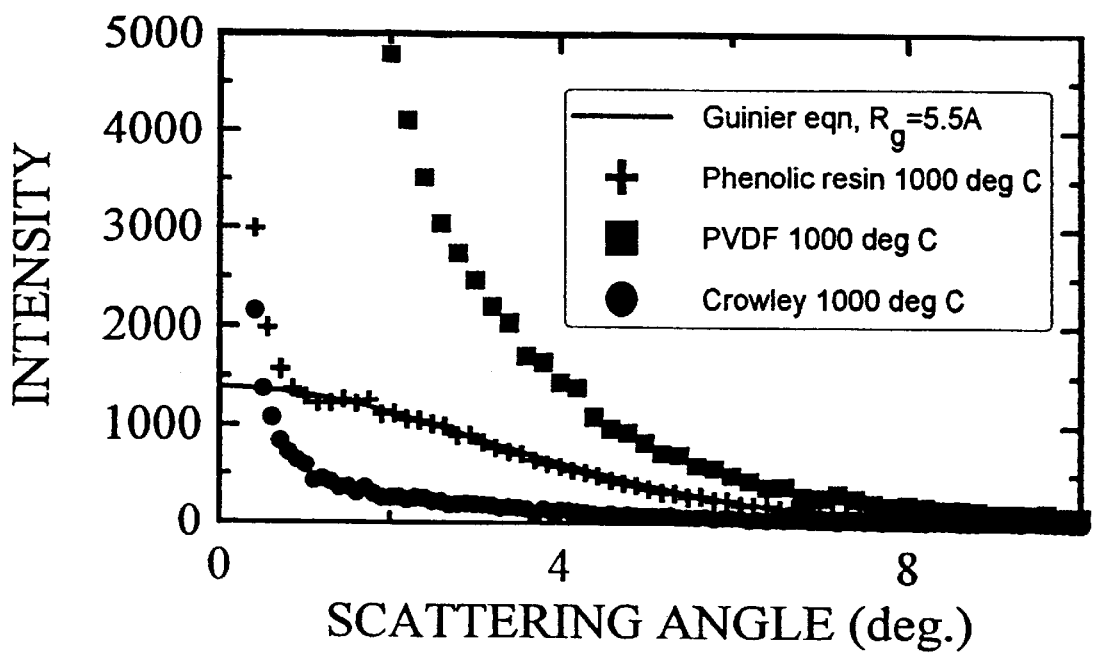
FIGS. 34a and b show plots of the intensity versus scattering angle and ln (intensity) versus $q^2$ respectively for the samples from the Illustrative Examples re small angle scattering.
Figure 34B:
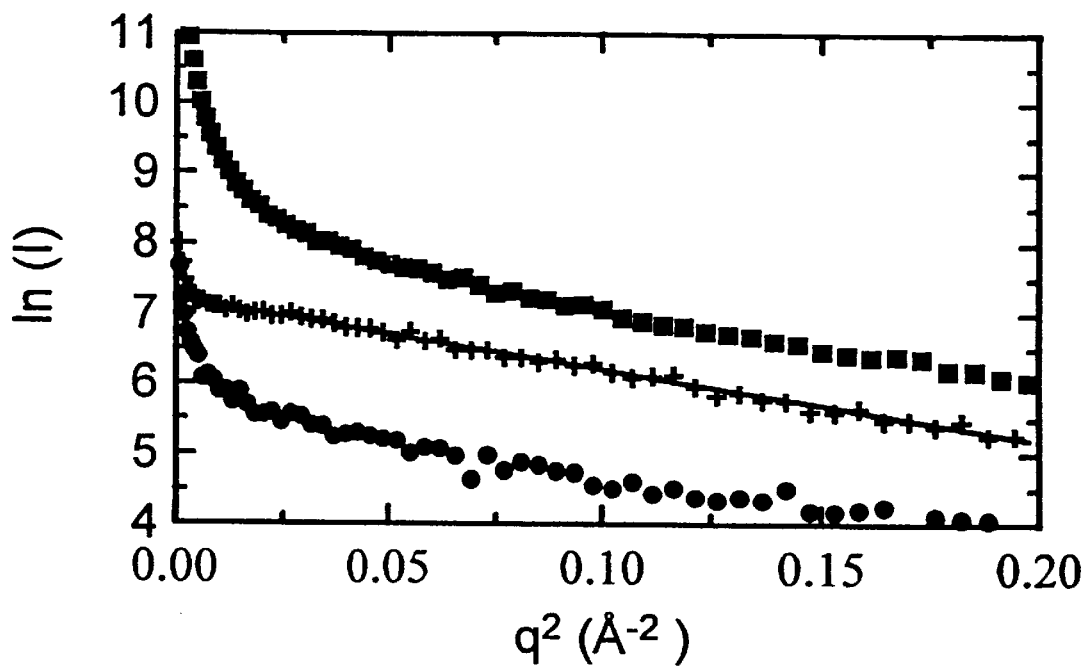

Three precursor materials, i) polyvinylidene fluoride (PVDF), ii) Crowley pitch (tradename), and iii) phenolic resole resin (product no. 29217 from Occidental Chemical Corp.), were pyrolyzed at 1000° C. and small angle x-ray scattering data was obtained on each as described above. FIGS. 34a and b show plots of the intensity versus scattering angle and ln (intensity) versus $q^2$ respectively for each sample. The resole resin sample shows significant scattering (intensity) at small angles and the data in FIG. 34b is linear, suggesting that the internal pores are predominantly uniform in size. The data can thus be fit to the Guinier formula giving $R_g$=5.5 Å. The resole resin sample is similar to the B1000 sample from the Phenolic Resin Examples which shows all the desirable electrochemical characteristics of the instant invention.

The pyrolyzed PVDF sample also shows significant scattering at small angles but the data in FIG. 34b is non-linear, suggesting the presence of a variety of pore sizes including pores larger than those of the pyrolyzed phenolic resole resin. The H/C atomic ratio for this sample was 0.053, R was 1.23, and the amount of methylene blue absorbed was greater than 40 micromoles per gram. The reversible and irreversible lithium capacities were 380 mAh/g and 710 mAh/g respectively. This sample has an unacceptably large electrolyte accessible surface area.

The Crowley pitch (tradename) sample shows minimal small angle scattering indicating that this sample has minimal porosity. The physical and electrochemical characteristics of this sample are similar to those of other pyrolyzed cokes. (The H/C atomic ratio for this sample was 0.04 and R was 8.79. The reversible and irreversible lithium capacities were 340 mAh/g and 100 mAh/g respectively.) As will be apparent to those skilled in the art in the light of the foregoing disclosure, many alterations and modifications are possible in the practice of this invention without departing from the spirit or scope thereof. For example, mixtures of more than one precursor may be used to prepare compounds. Additionally, carbohydrate precursors might contain significant matter that is not a carbohydrate, as in the case of wood, shells, cotton or straw. Accordingly, the scope of the invention is to be construed in accordance with the substance defined by the following claims.

What is claimed is:

1. A carbonaceous insertion compound comprising:
   (a) a pre-graphitic carbonaceous host having a reversible capacity for lithium insertion, an irreversible capacity for lithium insertion, and a surface area accessible to a non-aqueous electrolyte wherein
   (i) the empirical parameter R for said carbonaceous insertion compound:
      (A) is, determined by X-ray diffraction using a diffractometer equipped with a copper target X-ray tube and a diffracted beam monochronometer, with the X-ray beam of said diffractometer being confined to the sample in the angular range from 10° to 35° in scattering angle,
      (B) is defined as the height of the centre of the {002} peak divided by the background level, and
      (C) is less than about 2.2;
   (ii) the H/C atomic ratio is less than about 0.1; and
   (iii) the electrolyte accessible surface area is sufficiently small such that the irreversible capacity is less than about a half that of the reversible capacity;
   (b) and alkali metal atoms reversibly inserted into the carbonaceous host in an amount greater than that which can be reversibly inserted into graphite.

2. A carbonaceous insertion compound as claimed in claim 1 wherein the alkali metal is lithium.

3. A carbonaceous insertion compound as claimed in claim 1 wherein the accessible surface area is sufficiently small such that the irreversible capacity is less than about a third that of the reversible capacity.

4. A carbonaceous insertion compound as claimed in claim 1 wherein the methylene blue absorption capacity of the carbonaceous host is less than about 4 micromoles per gram of host.

5. A carbonaceous insertion compound as claimed in claim 1 wherein the surface area of the carbonaceous host as determined by BET is less than about 300 $m^2$/gram.

6. A carbonaceous insertion compound as claimed in claim 1 wherein less than about 5% by weight of the carbonaceous host is lost after pyrolyzing at about 1000° C. under inert gas.

7. A carbonaceous insertion compound as claimed in claim 1 wherein the non-aqueous electrolyte comprises ethylene carbonate and diethyl carbonate.

8. A carbonaceous insertion compound as claimed in claim 1 wherein R is less than about 2.

9. A carbonaceous insertion compound as claimed in claim 1 wherein R is less than about 1.5.

10. A carbonaceous insertion compound comprising:
   (a) a pre-graphitic carbonaceous host prepared by pyrolyzing an epoxy precursor, a phenolic resin precursor, a carbohydrate precursor or a carbohydrate containing precursor at a temperature above 800° C. and within a temperature range effective to produce an H/C atomic ratio less than about 0.1 and an empirical parameter R for said host, wherein R:
      (i) is determined by X-ray diffraction using a diffractometer equiped with a copper target X-ray tube and a diffractive beam monochronometer, with the X-ray beam of said diffractometer being confined to the sample in the angular range from 10° to 35° in scattering angle,
      (ii) is defined as the {002} peak height divided by the background level, and
      (iii) is less than about 2.2; and
   (b) alkali metal atoms reversibly inserted into the carbonaceous host in an amount greater than that which can be reversibly inserted in graphite.

11. A carbonaceous insertion compound as claimed in claim 10 wherein said temperature range is effective to produce an H/C atomic ratio in the pre-graphitic carbonaceous host less than about 0.1.

12. A carbonaceous insertion compound as claimed in claim 10 wherein the surface area of the carbonaceous host as determined by BET is less than about 300 m$^2$/gram.

13. A carbonaceous insertion compound as claimed in claim 10 wherein the alkali metal is lithium.

14. A carbonaceous insertion compound as claimed in claim 13 wherein the pre-graphitic carbonaceous host has a reversible capacity for lithium insertion, an irreversible capacity for lithium insertion, and a surface area accessible to a non-aqueous electrolyte.

15. A carbonaceous insertion compound as claimed in claim 14 wherein said temperature range is effective to produce an accessible surface area sufficiently small such that the irreversible capacity of said insertion compound is less than about half that of the reversible capacity.

16. A carbonaceous insertion compound as claimed in claim 10 wherein the pre-graphitic carbonaceous host is prepared by pyrolyzing an epoxy precursor comprising an epoxy novolac resin.

17. A carbonaceous insertion compound as claimed in claim 16 wherein the epoxy precursor comprises a hardener in a range from zero to about 40% by weight.

18. A carbonaceous insertion compound as claimed in claim 17 wherein the hardener is phthallic anhydride.

19. A carbonaceous insertion compound as claimed in claim 18 wherein the epoxy precursor is cured at about 120° C. before pyrolysis.

20. A carbonaceous insertion compound as claimed in claim 16 wherein the pyrolysis temperature is attained by ramping at from about 1° C./min to about 20° C./min.

21. A carbonaceous insertion compound as claimed in claim 10 wherein the pre-graphitic carbonaceous host is prepared by pyrolyzing an epoxy precursor comprising a bisphenol A epoxy resin.

22. A carbonaceous insertion compound as claimed in claim 21 wherein the pyrolysis temperature is attained by ramping at about 30° C./min.

23. A carbonaceous insertion compound as claimed in claim 10 wherein the pre-graphitic carbonaceous host is prepared by pyrolyzing a phenolic resin precursor.

24. A carbonaceous insertion compound as claimed in claim 23 wherein R is less than about 1.6.

25. A carbonaceous insertion compound as claimed in claim 23 wherein the phenolic resin precursor is cured at about 150° C. before pyrolysis.

26. A carbonaceous insertion compound as claimed in claim 23 wherein the pyrolysis temperature is maintained for about an hour.

27. A carbonaceous insertion compound as claimed in claim 23 wherein the phenolic resin precursor is of the novolac type.

28. A carbonaceous insertion compound as claimed in claim 23 wherein the phenolic resin precursor is of the resole type.

29. A carbonaceous insertion compound as claimed in claim 28 wherein the phenolic resin precursor is pyrolyzed at a temperature in the range from about 900° C. to about 1100° C.

30. A carbonaceous insertion compound as claimed in claim 10 wherein the pre-graphitic carbonaceous host is prepared by pyrolyzing a carbohydrate or carbohydrate containing precursor.

31. A carbonaceous insertion compound as claimed in claim 30 wherein the tap density of the carbonaceous host is greater than about 0.7 g/ml.

32. A carbonaceous insertion compound as claimed in claim 30 wherein R is less than about 2.

33. A carbonaceous insertion compound as claimed in claim 30 wherein the carbohydrate precursor is pyrolyzed at a temperature in the range from about 900° C. to about 1100° C.

34. A carbonaceous insertion compound as claimed in claim 33 wherein the pyrolysis temperature is maintained for about an hour.

35. A carbonaceous insertion compound as claimed in claim 33 wherein the pyrolysis temperature is attained by ramping at a rate of about 25° C. per minute.

36. A carbonaceous insertion compound as claimed in claim 30 wherein the carbohydrate precursor is a sugar.

37. A carbonaceous insertion compound as claimed in claim 36 wherein the sugar is sucrose.

38. A carbonaceous insertion compound as claimed in claim 30 wherein the carbohydrate precursor is a starch.

39. A carbonaceous insertion compound as claimed in claim 30 wherein the carbohydrate precursor is a cellulose.

40. A carbonaceous insertion compound as claimed in claim 39 wherein the cellulose is selected from the group consisting of red oak, maple, walnut shell, filbert shell, almond shell, cotton and straw.

41. A carbonaceous insertion compound comprising:
   a pre-graphitic carbonaceous host prepared by pyrolyzing an epoxy novolac resin having the formula:

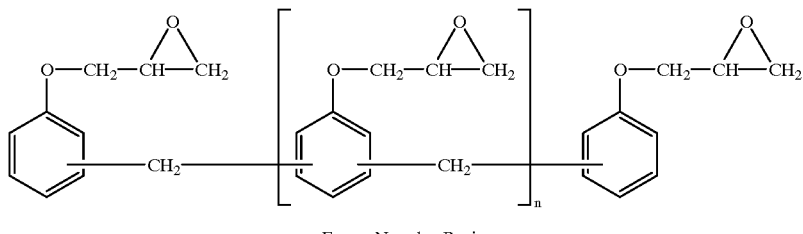

Epoxy Novolac Resin n = 1.6 at a temperature above about 700° C. and below about 1100° C.; and lithium atoms reveiby inserted into the carbonaceous host in an amount greater than that which can be reversibly inserted into graphite.

42. A carbonaceous insertion compound comprising:

a pre-graphitic carbonaceous host prepared by pyrolyzing a bisphenol A epoxy resin having the formula:

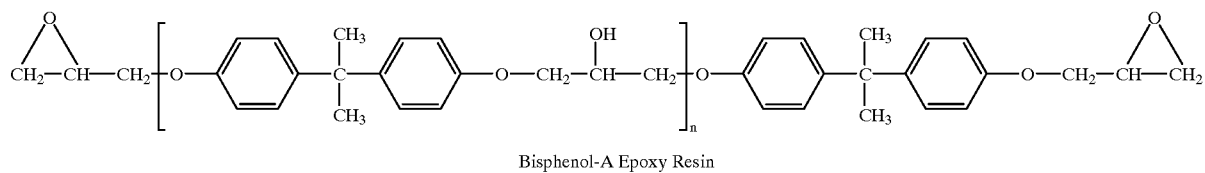

Bisphenol-A Epoxy Resin n = 12 at a temperature above about 800° C., and lithium atoms reversibly inserted into the carbonaceous host in an amount greater than that which can be reversibly inserted into graphite.

* * * * *

UNITED STATES PATENT AND TRADEMARK OFFICE
CERTIFICATE OF CORRECTION

PATENT NO. : 6,316,144 B1
DATED : November 13, 2001
INVENTOR(S) : Jiayu Simon Xue It is certified that error appears in the above-identified patent and that said Letters Patent is hereby corrected as shown below:

<u>Title page,</u>
Item [56], Foreign Patent Documents insert -- 0328131A2  8/89  (EP) --
"7-288136" should read -- 7-288126 --
OTHER PUBLICATIONS
Paper "2805" should read -- 2B05 --
Paper "2809" should read -- 2B09 --

<u>Column 35,</u>
Line 17, "reveiby" should read -- reversibly --

Signed and Sealed this

Twenty-fifth Day of June, 2002

Attest:

JAMES E. ROGAN
*Attesting Officer*  *Director of the United States Patent and Trademark Office*